United States Patent [19]

Gagnier et al.

[11] 4,213,201
[45] Jul. 15, 1980

[54] MODULAR TIME DIVISION SWITCHING SYSTEM

[75] Inventors: Real Gagnier, Hull; Ernst A. Munter; John B. Bourne, both of Ottawa; Ceasar Cesaratto, Alymer; Conrad W. Lewis, Ottawa; Brian T. Paley, Munster; Robert G. Wood; John J. den Otter, both of Ottawa, all of Canada

[73] Assignee: Northern Telecom Limited, Montreal, Canada

[21] Appl. No.: 919,901

[22] Filed: Jun. 28, 1978

[30] Foreign Application Priority Data

Jun. 5, 1978 [CA] Canada .................................. 304726

[51] Int. Cl.² ............................................ H04Q 11/04
[52] U.S. Cl. ........................................ 370/62; 370/13; 370/66
[58] Field of Search ......... 179/15 AT, 15 BY, 18 ES, 179/15 AE

[56] References Cited

U.S. PATENT DOCUMENTS

| B 327,612 | 1/1975 | Edström et al. ................ | 179/15 AT |
|---|---|---|---|
| 4,007,334 | 2/1977 | McDonald ...................... | 179/15 AT |
| 4,020,290 | 4/1977 | Perna et al. .................... | 179/15 AT |
| 4,069,399 | 1/1978 | Barrett et al. ................... | 179/15 AL |
| 4,074,077 | 2/1978 | Charransol et al. ............ | 179/15 AT |
| 4,081,611 | 3/1978 | Bovo et al. ..................... | 179/15 AT |

OTHER PUBLICATIONS

"CITEDIS Production PCM Telephone Switching System," by Pierre Fritz, *IEEE Trans. on Comm'n's*, vol. COM-22, No. 9, Sep. 1974.

"A PCM Switching System for all Uses," by Pickett and Skaperda, *Telephony*, Jul. 19, 1976, p. 36.

*Primary Examiner*—Thomas W. Brown
*Attorney, Agent, or Firm*—Frishauf, Holtz, Goodman & Woodward

[57] ABSTRACT

The time-switch stages of a switching network are organized in identical multistage modules connected to peripheral modules by two-way time division digital multiplex links, and each containing a network message controller which connects to a central processing unit through two-way control signal links passing serial digital data at the same rate of transmission at which the multiplex links operate. The central processing unit communicates with the peripheral modules only through network message controllers which operate on a store and forward basis. The network modules, central processing unit, control signal links and network links are duplicated and the central processing units connect to the control signal links through central message controllers which are also duplicated and each of which can operate with either of the central processing units. Under high load conditions, the origination of low-priority messages to central processing is inhibited by the central message controllers by substituting a special repeated code signal instead of the normal repeated code transmitted to indicate an idle condition, causing the network message controllers to do likewise, so that the peripheral modules can respond by inhibiting, for example, the recognition of new calls for service.

40 Claims, 23 Drawing Figures

MODULAR TIME DIVISION SWITCHING SYSTEM

This invention relates to an internal control signal system for a time-division communication switching system, such as a telephone exchange. In particular, it relates to such a control signal system that is economical in connection facilities required, makes use of backup facilities provided for the switched traffic and, furthermore during periods of heavy traffic will cause accumulation of low-priority requests for service by the central equipment to accumulate in the peripheral portion of the switching system. For the implementation of its objectives it distributes extensive automatic internal message handling functions to network modules without risk of excessive scanning time delays for picking up messages destined for central control equipment.

Time-division communication switching systems operating on digitally encoded, time-separated and time-multiplexed telephone signals enable great reduction of the bulk of telephone central office equipment. They are proving themselves economic even for switching of telephone traffic that is presented to the exchange entirely in analog signals that must be digitized at the entrance of the system and reconstituted in analog form at the exit. The introduction of time-division multiplexing in the telephone transmission plant, which has been proceeding apace for some years now, makes time-division switching even more economic.

It is not practical at the present time to do multistage switching entirely on a time-division basis, with the result that time-division switching systems for exchanges of any practical size involve a switching network that must be able to connect a particular time-division channel of one multiplex link to another time-divison channel of the same or of another multiplex link; in other words, they must be hybrid time-and-space-division systems. In the present specification and claims, accordingly, such a hybrid switching system is meant by the expression "time-division switching system".

Electronic telephone exchange switching systems in general and time-division telephone switching systems (which are necessarily electronic), in particular, have generally been designed on common control principles, by which connections are set up and taken down by a common control equipment, and especially by common control equipment of the stored program type. At periods of peak load, a priority classification is necessary for demands upon the common control equipment to prevent excessive degradation of service. In general, processing of calls under way has priority over entering a new call in the system.

The stored program of the central control equipment is normally relied on to provide recognition of the appropriate priorities among the various kinds of demands for action by the central control. When all parts of the switching system needing attention of the central control are connected directly to the central control equipment for requesting and obtaining attention, the stored program of the central control itself can provide all the necessary protection of the priority processes against the concurrent demands of processes of lower priority. Provision of control signal connections between central control and all peripheral modules is expensive, however, and is complicated to do economically for very large systems. Thus, for example, one method of providing these connections is to provide a parallel data bus—actually two such busses, one going from the central control and one to it—on which all the units or modules of the switching system are connected to receive orders or report events, each unit recognizing its address on communications to it and giving its address to identify communications from it. This arrangement is difficult to handle in large systems because of the time required to get a reply from a more remote unit, and also because keeping track of events requires looking at frequent intervals at a large number of units, so that with a large number of units, either very high speed data transmission is necessary for the intervals, or else delays have to be lengthened. With the increasing availability of processor components suitable for filtering out the significant events at the peripheral module, the amount of data to be observed by the central control equipment can be reduced, thereby reducing the requirements of transmission speed. Although the parallel data bus connection system for control signals is thereby made feasible for a large number of units in a system, the arrangement still leaves much to be desired from the point of view of economy.

The use of the network modules, which implement the network switching, for routing control signals passing between the peripheral modules and central control offers the possibility of using time-division channels of network links as control signal channels, but the extension of these channels to central control on a nonblocking basis is still expensive compared to making use of the network modules for "concentration" of the requests for central control attention which, however, practically requires some provision for buffer storage of messages headed for central control. Such concentration and buffering isolates the first step of onward transmission from the priority discriminating capabilities of the central controller, however, and raises the problem of providing means for establishing and observing priorities in the network modules and in the peripheral modules, which is not feasible without reference to information available only in the central control equipment. Such routing of control signals, moreover, brings up the question of where the high speed parallel data input and output commonly provided for a central processing unit can most economically be converted from and to serial data such as is needed for use over the time-division channels of the network links between the switch modules and the peripheral modules (i.e. whether this should be done in part of the central control equipment or perhaps in the network switch modules).

THE PRESENT INVENTION

It is an object of the present invention to reduce the expense and complications of the internal automatic signaling system of a time-division telephone exchange by which the central control equipment is alerted to events within the system possibly requiring attention and response thereto, and particularly provide a system in which the difficulties which have stood in the way of such economy and simplification are overcome by improved internal automatic communication facilities having improved modes of operation. It is a further object of the invention to delegate to peripheral units larger amounts, to a greater extent than has heretofore been found practical in communication switching practice, of the preliminary response to incoming requests for service and similar events detected in peripheral units of switching systems in order to relieve more central units of some detail operations, and to by-pass the central control equipment for passing and acknowledging receipt of some supervisory signals between terminals connected through the switching network.

It is also an object of the present invention to provide for the handling of priority internal messages practically exclusively by the central control of a time-division telephone switching systems during periods of peak load, without substantial delay from the presence of nonpriority service requests in the system. It is a further object of the invention to provide for economical connection of central control equipment to units of the system requesting attention of central control, and at the same time to provide a switching system of modular constitution to which peripheral circuit modules and network modules can be added as an exchange grows, by connecting all requests from peripheral modules for attention of central control through the network modules, for concentration, checking and buffering therein, and by also routing order messages from central control to the network modules even when they are destined for other units of the system. It is a still further object of the invention to reduce to a minimum the time spent in scanning the messages awaiting transmission at peripheral modules by elements of the network modules and in scanning by central control for messages awaiting transmission by the network modules. It is still another object of the invention to provide a system which achieves the objects above mentioned without the provision of extensive control signal buffer capacity in the network modules. It is also an object of the invention to make the conversion from parallel to serial data for control signals in a way that will enhance rather than reduce the reliability provided by duplication of control equipment and of time-switch facilities.

SUMMARY OF THE INVENTION

Basically, the time-division switching network of the switching system is constituted as a modular network of "folded" configuration and all operating communication between the central control equipment and the peripheral modules of the system are routed through a network message controller (NMC) in a network module (NM), so as to enable internal signals and coded orders between peripheral modules (PMs) and central control efficiently to utilize time-division multiplex links provided for traffic purposes between NMs and PMS, and to facilitate the integration, into the system, of supervisory operations by processors in the PMs by making particular and advantageous use there of the time slots assigned to internal signals and orders. Such an arrangement makes it possible to standardize all working interfaces between PMs, NMs and central control equipment to an extremely large extent, regardless whether internal signals or traffic handled by the system is passing through them, and facilitates the engineering of rearrangements of the system and additions to the system by not requiring substantially different operations or components for addition, on the one hand of internal signaling circuits and for addition, on the other hand, of traffic terminals links and switches. The further advantage is obtained that the internal automatic signaling system benefits to a greater degree from the duplication of the switching network, of the communication links between NMs and PMs and of the central control equipment than would be otherwise possible, but, significantly, difficulties that would be expected from use of such duplication are avoided by a difference in the manner of utilization of the duplicate networks and links, which consists in transmitting traffic always over both of the duplicate networks and selecting the one signal path actually used at the receiving end of the duplicated portions, while internal signals and orders are transmitted on only one of the duplicate facilities and a repetitive "idle" signal is transmitted in the corresponding channel (time slot) of the other, and provision is made for determination at the sending end when the message or order is to be transmitted over the other of the duplicate facilities and the "idle" code periodically sent over the facility previously utilized.

The central control equipment, however, in addition to being able to send a message to a particular network message controller (NMC) in the fashion just described, is made able to send the same message simultaneously to a particular NMC and to its duplicate. This is essential in order to keep the respective states of the identical networks the same (in setting up NM time-switch connections for example). The identical portions of a duplicte switching network are conveniently referred to as two "planes" of a network, but the term thus used does not mean that the physical structures are planes.

In order that these features can be economically provided, internal communication between PMs and central control must go through the NMs on a "store and forward" basis and is therefore essential for effective implementation of the above described features to provide a reliable and quick-acting system for handling such internal communications automatically and efficiently without accumulation of delays and without any significant loss of the power of the central control equipment to impose priorities in periods of heavy load which will be effective on the behavior of the peripheral units of the system.

As already mentioned, all internal messages between the PMs and the somewhat autonomous central control equipment in both directions are routed through a NMC in a NM; at least one time-division signaling channel is provided in each time-multiplex group of channels between a PM and a NM; control signal links (CSLs) respectively connect each of the NMs with the central control equipment, which preferably has a central message controller (CMC) for such connections to provide conversion and buffering between serial and parallel data transmission; requests for attention originating in the NMs, as well as messages relayed through the NMs (and checked by them) from or to a PM, are handled by the NMC of the particular NM which includes buffer storage both for messages destined for the central control equipment and for messages destined for peripheral modules. The term "central processing unit" (CPS) is used to refer to the central control equipment other than the CMC. The CPU, like the switching network, is preferably duplicated.

All PMs, all NMC and CMCs (actually two of the latter in the preferred system) are arranged to transmit "idle" code signals repetitively when ready to receive, and to transmit a "may I send?" code (MIS) repetitively while any message is awaiting transmission. In the case of PMs only, however, when the idle signal from the destination module is not the normal idle signal but a "priority only" idle (POIDI) code the generation of further low-priority messages is inhibited although those already loaded in a message buffer may nevertheless still be transmitted. The CMC scans its control signal links (CSLs) with the NMs whenever its incoming buffer is empty and takes any waiting message it finds, as there is no priority sorting in the message buffer of any NMC. The selection between these two idle state codes that may be sent to PMs by NMCs is controlled by the sending by the CMC and reception by NMCs of POIDL code signals instead of ordinary IDLE code signals.

The sending of a message is always performed at once when the unit at the other end (PM, NMC or CMC, as the case may be), being able to accept a message, sends a "sends" order code in response to the MIS. The recipient unit checks the message for transmission errors when received and returns either a positive acknowledgement code or a negative acknowledgement code, the former of which permits the sending unit to clear the message and the latter causes the sending unit to repeat transmission of the message, after which another acknowledgement is sent. If the second acknowledgement is negative, a reaction is produced that includes at least making a record or transmitting a notification of an error.

In the case of the duplicated network and control equipment (the PMs are not duplicated) all messages go over one of the two physical paths between PMs and NMs over which voice signals are concurrently sent. Second retries in case of repeated error are routed over the alternate path and at the same time the unsuccessful path is marked as "closed" to prevent its being used again until the active CPU has tried to clear the trouble. As already noted, control over which of the two voice signal paths will be used at the receiving end is independent of the choice of physical path for messages and conversely does not affect message path routing.

Of course, once a send order has been transmitted in response to reception of "may I send?" code signals, the transmission of "idle" signals is interrupted until the message sending and acknowledgment procedure has been completed. The "send" signal is preferably transmitted repetitively during message reception, but this repetition is not a necessary feature.

Preferably, as a positive check on the operativeness of the system at all times, code signals designating an idle state are sent out over the signaling channels and signaling links by the unit of the system on the sending end thereof so long as the latter unit has no messages available for transmission and is not engaged in a message reception procedure over the corresponding link in the other direction. This, like other codes mentioned above, is preferably a one byte code. As such it can be sent in every complete time-division cycle of a PM-NM link (typically every 125 $\mu$s).

Provision is preferably also made for an error reaction (i.e. transmission over alternate path, etc.) in the event neither a positive nor a negative acknowledgment signal code is received within a predetermined time period after the sending of a message.

The CMCs preferably operate "full duplex", which is to say that they can send to one NMC while receiving from another. They cannot send and receive simultaneously to the same NMCs, because the NMCs, and the PMs too, operate "half duplex"—cannot send and receive data messages (as distinguished from control codes) at the same time. Accordingly, each CMC must have circuits ("port contention control") to prevent it from attempting to send to and receive from the same NMC. Therefore, when a CMC and a NMC send MIS to each other, "contention" memories are called in to instruct one of them (the NMC) normally to "back down" and accpet a message. Since CMC messages often generate immediate reply messages to CMC, the NMC is instructed not to back down if its buffer for inward messages is full. In such a case the NMC transmits "I will send" (IWS), thereby requiring the CWU to back down. The resulting message transfer clears a space in the NMC's inward buffer, enabling the NMC to accept a message from the CMC.

The repetitive sending of "may I send?" code signals by units having messages awaiting transmission greatly shortens the scanning process necessary for messages directed towards the central control, since it is then not necessary to send an interrogation and receive a reply over a link circuit for each of the scanned units. The use of the repetitive "may I send?" code is also useful for messages going out from central control since message buffering and storage requirements in the NMs and PMs, which if considerable would be relatively little used on the average, are thereby held to a minimum.

The checking of messages for transmissions errors in the NMCs of the NMs reduces the error-catching load on the central control equipment and helps to determine the location of faults without unduly complicating the constitution of NMs.

Preferably the checking of messages is done by transmitting a checksum as the last byte of the message, the content of which is compared with the checksum computed at the receiving end, whereas the data words containing PCM speech samples include a parity bit for checking each word.

The chief purpose of parity-checking each speech sample is to detect hardware failures. Checksums in messages are used to prevent erroneous messages from being accepted.

Preferably the inhibition of low priority messages at the PMs is produced by an overload condition that is triggered not only by the reception of a POIDL code from the network, but also when the report buffer of the PM, as the outgoing message buffer of the PM is called, is filled to a certain threshold, and the overloaded condition is not cleared until the report buffer is empty and at the same time a normal IDLE code is being received from the network.

In a particular preferred form of construction, a PM has a one message input/output buffer between the network links and the multi-message report (outgoing) and message (incoming) buffers. The input side of this buffer can be used as a one message overflow for the incoming message buffer. If another message comes in, the overflow message must be "killed", but when there is an overflow message, and the report buffer of the module is full, the PM will send IWS, instead of backing down and sending IDLE as it normally does in the case of MIS contentions. Preferably the event will be noted by appropriate error code in the message header, because the error codes, so called, are intended to indicate the occurrence of overload conditions as well as malfunctions.

The refinement just described illustrates the sophistication with which it is possible to apply the benefits of a message-driven internal signalling system in a digital time-division switching system to distribute centrally generated orders through the network switching module to the peripheral modules and to gather reports of significant events through the same paths in the opposite direction.

The CMC provides the necessary interface between the central processor (CP) (the CP and its memories constitute the CPU) and the internal message system of the telephone exchange. The interchange of information between CMC and CP is quite different from the internal message system, and more like conventional computer organization, in order to meet the requirements of the processor, even though the data passed back and forth consists essentially of the same message bytes sent to or received from the NMCs. Briefly stated, the CMP-CP data interchange uses parallel multibit transfer and "interrupt" logic, the CMC posting an interrupt bit whenever it has a message to pass or buffer capacity to receive a message, which the CP recognizes as may be permitted by its program.

Nevertheless, a CMC is not permanently associated with any one of the CPs and it is a feature of the present invention that these are duplicated in such a context that each one has access and is accessible to both CPs, on the one hand, and to both "planes" of the duplicated network on the other hand.

A great advantage of the present invention is that the internal control signal system has the desirable effect of enabling the central processing units to operate entirely on priority requests during even very short load peaks at the expense of having non-priority requests for service accumulate almost entirely in the peripheral circuit modules, where in many cases the effect can produce a delay in the acceptance of new calls to an extent which, though usually small, provides a substantial relief to the operation of the switching system. By the present invention, this result is achieved with the economy and flexibility (for central office growth) of considerable decentralization of the automatic "decision-making", in addition to the economy involved in the use of time-division channels of PM-NM links for internal control signals and the simplification of system rearrangement and growth thereby provided.

BRIEF DESCRIPTION OF THE DRAWINGS

The invention is further described by way of illustrative particulars with reference to the annexed drawings, in which.

DESCRIPTION OF THE PREFERRED EMBODIMENT

Figure 1:
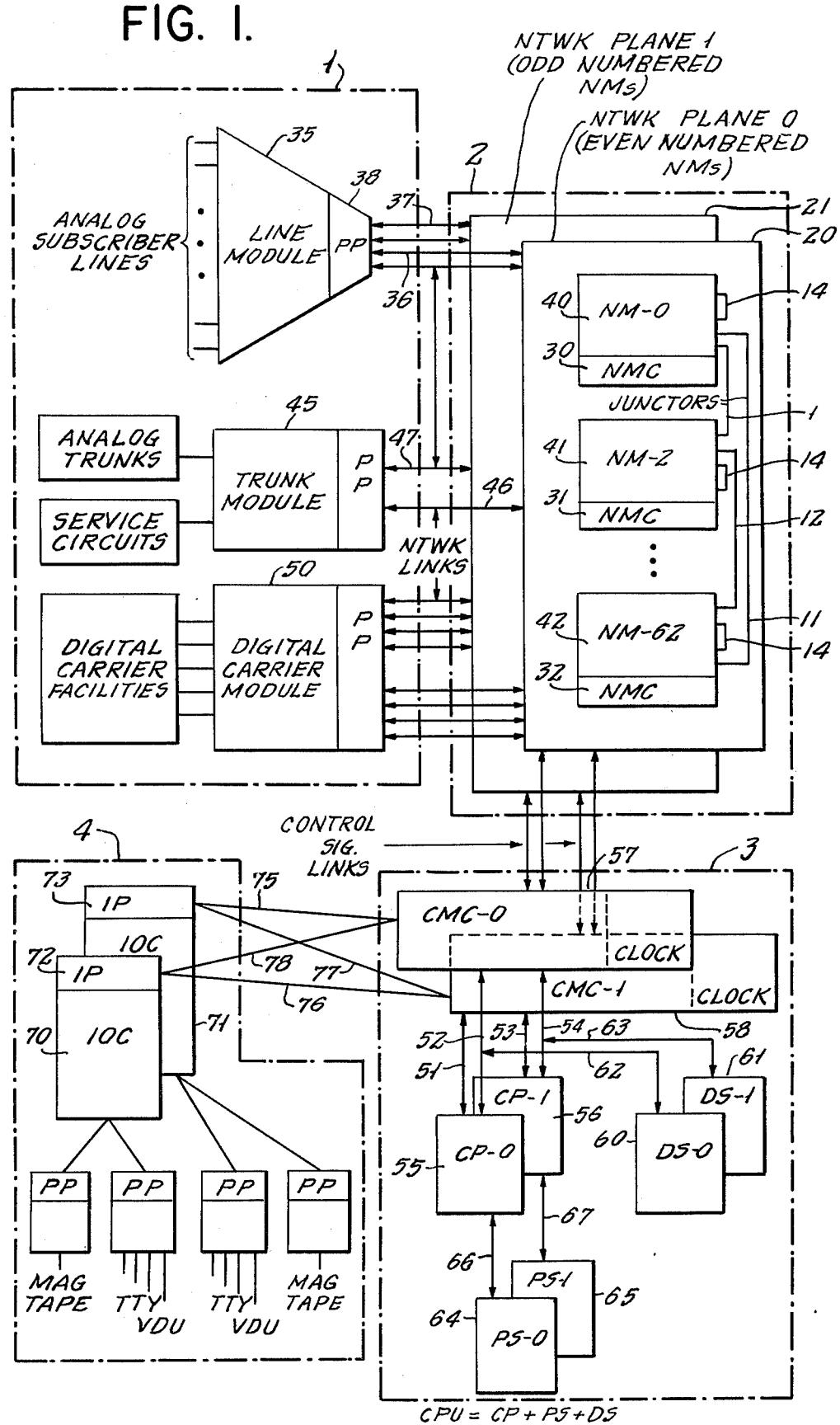
FIG. 1 is an overall basic block diagram of a telephone exchange embodying the invention.

FIG. 1 is a simplified block diagram of a time-division communication switching system serving as a telephone exchange. The system is of modular design so that it can be assembled for handling as few as 1500 lines and as many as 100,000 and also for handling trunks for toll switching up to 60,000 trunks, as well as various mixes of trunks and lines. The system can be rearranged and extended by adding line modules, trunk modules and network modules, up to 32 network modules in each of two duplicate sets in the design shown.

The system shown in FIG. 1 has four principal areas, namely, the peripheral modules area 1, the network area 2, the central control complex area 3, the maintenance and administration 4. The switching network contained in the network area 2 is a so-called folded network, which is to say that the inputs and outputs of the switching network from and to the peripheral modules are on the same face of the network. The switching network is made up of network modules, each of which can connect 1920 channels (organized in 64 "ports" having 30 speech channels time-multiplexed in a group) to outputs of likewise 1920 speech channels (likewise organized in 64 "ports" of 30 time-division speech channels each). This switching function is performed by four stages of time-division switching, two leading from PMs to junctors and two from junctors to PMs. Junctors such as the junctor 14, interconnect intermediate switching stage of the same network module while other junctors 11, 12, 13 similarly interconnect different network modules. Thus, the network modules have a peripheral "face", or the ports of their incoming and outgoing "sides", and a junctor "face" for interconnecting incoming and outgoing "sides", the junctors consituting the "fold" of the network. The organization of the time division switches in the network module is described in the copending patent application, Ser. No. 795,695, filed on May 10, 1977 by Réal Gagnier, John Brian Bourne and John Brian Terry and assigned to the assignee of the present application.

The switching network is completely duplicated and each of the duplicate networks is designated as a "plane". The reference numeral 20, in FIG. 1 designates plane "0" and the reference numeral 21 similarly designates plan "1", the network modules of which do not appear in the drawing but correspond exactly to those of Plane O, the junctor arrangement also being the same for both planes and being designed to suit the traffic of the particular exchange in accordance with known principles. Each network module has a network message controller as shown at 30 for the module 40, at 31 for the module 41 and at 32 for the module 42. In FIG. 1 the connections between each plane of the duplicated network and the other areas of the switching system are shown as merely going to the plane and their distribution to the network modules is not shown, even symbolically, in order to simplify the drawing.

The peripheral modules area 1 contains three kinds of peripheral modules. For serving local telephone lines carrying analog speech signals, line modules, such as the line module 35, are provided each connecting a maximum of, for example, 512 lines to 60, 90 or 120 speech channels (according to the amount of concentration desired) grouped into time-division multiplex groups of 30 channels each, each such group of 30 channels going through a network link such as the link 36 to plane 0 of the network or the corresponding link 37 to plane 1. A peripheral processor is included in the line module on its face which is connected by the network links to the switching network. In order to utilize processors in many respects the same as those of trunk modules which handle only one link to each network plane, it may be convenient to break up the peripheral processor 38 into two or more portions each handling an equal fraction of the lines. The line module and its peripheral processor can be regarded as a stage of time-division switching, because it provides concentration. The trunk module 45, on the other hand is normally designed to connect 30 trunks to 30 network link channels on a non-blocking basis. Of course these 30 channels must appear on both of two network links, one going to each plane of the network.

It is desirable to utilize a kind of trunk module for certain services that must be switched by the network, such as duel tone multifrequency receivers, test lines and the like.

As will be noted further at a later point, both the line modules and the trunk modules must provide not only time-multiplexing, but also conversion between analog speech signals and pulse code modulated (PCM) signals, the latter being the signals used for all purposes in the switching network. The switching system may also be used for switching traffic coming to the switching center for the time-multiplex trunks grouped in digital carrier circuits. Accordingly, a digital carrier module 50 is shown in FIG. 1. Such a DCM conveniently has 120 channels, 120 being the lowest common multiple of 24 (usual number of carrier channels per circuit) and 30 (number of speech channels per network link). In this case pulse code modulation signals pass through the digital carrier module and do not need to be converted, but supervisory signals still need to be converted and/or processed. Like other trunks, these trunks are preferably connected on a non-blocking basis to an equal number of channels in network links. Since 120 channels is the convenient number, the DCM 50 is shown in FIG. 1 as having four network links to each plane of the network.

The central control complex area 3 of the switching system, like the network area 2, contains facilities all of which are duplicated for reliability in the system. Like the network planes, units of the central control complex area are designated "0" and "1" to differentiate them, but that does not mean that the units in the central control complex so designated necessarily work with only one network plane or the other. As shown in FIG. 1, central message controllers are connected by control signal links to both of the network planes. Likewise the two central processing units 55 and 56 are connected by so-called data ports 51, 52, 53 and 54, respectively to both CMCs 57 and 58. The data ports are constituted as sixteen bit parallel bus connections for quick transfer of data. The data stores 60 and 61 are connected to the respective central processing units through data ports, but since they are used by the processing units rather than by the CMCs, each data store needs to be connected to only one data port for interconnection with the processing unit of which it is effectively a part as indicated by the data port connections 62 and 63.

The connection requirements for the program stores 64 and 65 of the respective processing units are somewhat different from the requirements of the connections 62 and 63. The ports 66 and 67 are therefore called program ports. As will be described further below, the equipment of the central control complex area 3 is connected to the equipment of peripheral modules area 1 and of the network area 2 through control signal links (CSLs) between the CMCs and the NMCs and the communication over these CSLs in both directions is in the form of messages constituted and handled in accordance with the principles, described below, of the automatic internal message system which extends the CSL connections from the CMCs to the NMCs and on to the peripheral modules through a time-division channel in each of the network links interconnecting the NMCs with the peripheral processors of the PMs.

The equipment of the maintenance and administration area 4 of the switching system shown in FIG. 1 is interconnected with the equipment of the central control complex area through the CMCs. Two input/output controllers are each connected with both of the CMCs through an interface processor by means of control signal links 75, 76, 77 and 78 each of which represents several control signal links of the kind interconnecting the CMCs and the NMCs, and, like the latter, these links carry information in messages constituted and handled in accordance with the principles, described below, of the automatic internal control signal system of the telephone switching system.

Network links, such as the links 36, 37, 46 and 47, each connect a peripheral module with a network module, as shown in FIG. 1. The network links each connect 30 time-multiplexed telephone channels (i.e. time slots) to a network module and each provides, in addition, a signal time slot (for example, channel 0). Actually the particular preferred choice of numbers of channels leaves one channel unused in the network links. The constitution of the time switches of the network modules makes it convenient to have 64 ports of each face, which means 32 channels on each of one-way units of a network link. Since only one of these needs to be a signal channel, there are 31 left available for traffic, but that is an inconvenient number to use, particularly to match up with digital carrier channels that come in groups of 24, as already noted. For this reason, one channel is unused in the preferred system in the network links, for example, channel 16. The time slot corresponding to channel 16, however, is utilized in the peripheral module by the peripheral processor for an appropriate share of its work in dealing with its trunks or line, etc., and it may be similarly noted that in the network modules, at the junctor face, there is no signal channel and all 32 channel slots of the junctor could theoretically be used to link incoming and outgoing stages of time switches. Actually the kind of framing "bit" that is currently preferred for operation makes the channel in which the framing bit appears unsuitable for speech traffic, but of course another kind of framing arrangement could readily be devised to make all 32 channels available for junctor circuits. In any event, the unused channel in the network links does not represent any great amount of unused data handling capacity in the system.

Each of the links 36, 37, 46 and 47, for example, is actually a pair of 32 channel links, one transmitting signals from the peripheral module to the network module and one transmitting signals the other way so that the line 46 of FIG. 1. represents, accordingly, a two-way pair of network links between the peripheral module 45 and one of the network modules of the "plane" 20.

It is common in telephone parlance to refer to what has been mentioned as a two-way pair of network links as a "network link" or a "four-wire network link", but for the present description it is better to be more precise and to refer to pairs of links or two-way pairs of links, each link of the pair being actually a one-way two-wire multiplexed circuit and each signalling channel being one channel of the time-division multiplex group.

The NMCs are connected to the CMCs through control signal links (CSLs) and here again the lines 83, 84 and 85 each indicate a two-way pair of links. The links of these pairs do not need to be multiplexed and are preferably 2.56 megabit per second two-wire lines. Preferably, however, the same kind of data words (with only 8 out of 10 bits normally carrying data) are used as in the network links, with the same framing bit (mentioned further below) in the "channel 0" time slot.

Message Transmission Sequences

Before the organization of the message handling components of the peripheral modules, network modules and central control complex are described, the operational sequence of message transmission will be briefly summarized.

Internal messages betwee CMCs and NMCs and between NMCs and PMs consist of up to 64 bytes sent in a format providing for several bytes of preliminary information and a final "checksum" byte. Preferably, there are 8 preliminary bytes, leaving up to 55 bytes for the message content. The handling of these messages is governed by the sending of one-byte control codes, as already mentioned, which may be regarded as very short messages but are here referred to as "code signals" or simply as "codes". These are IDLE, POIDL (priority-only idle), MIS (may I send), IWS (I will send), SEND, PACK (positive acknowledgement) and NACK (negative acknowledgement).

Figure 2:
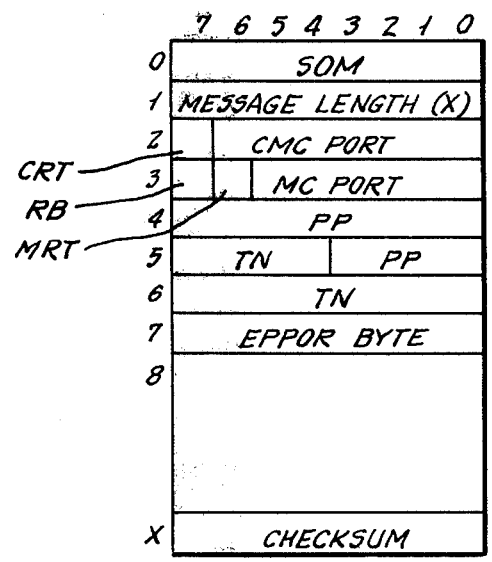
FIG. 2 is a diagram showing the format of an internal message of the kind used for control in the exchanges of FIG. 1.

The message format next described is preferred, but of course message transfer in accordance with and for the purpose of the invention can also be accomplished in a variety of other particular ways. The first byte (byte 0) illustrated in FIG. 2 of the preferred message format can also be regarded as a control code, meaning "start of message" (SOM) and also indicating that what follows is a message in the standard format there illustrated. Byte 1, which follows byte 0, gives the message length. An entire byte is dedicated to this number because that makes the same format available for handling messages between CMCs and input/output devices, where messages up to 256 bytes long may be desirable. In messages going into or out of the NMCs the three most significant bits of the "length" byte are all 0. Seven bits (0-6) of byte 2 identify the CMC port, which in effect identifies the NMC (one of as many as 64) or one of the non-NMC ports. This information is needed by the CMC for directing outgoing messages, because such a message is made up by a central processor (CP) and passed to a CMC through the interrupt-controlled interface between them.

The remaining bit of byte 2 is used on inward messages to designate the preferred CMC to use. On outward messages it specifies the CMC through which the message is sent.

Byte 3 designates, by six of its bits, a NM port number for instructing a NMC how to direct an outgoing message beyond the NM. Messages not needing a NM port designation are conventionally given all-0 for these six bits. The seventh bit (bit 6) of byte 3 is preferably used to specify the preferred network plane (i.e., to select one of two corresponding NMCs). This bit, and likewise the preferred-CMC-designating bit above mentioned, are not changed when a message is routed on the alternate path after a failed first attempt. The last bit of byte 3 is used to inhibit rerouting in order to make it possible to communicate with a CMC that has been taken out of all but a limited range of service for maintenance purposes (by designating that CMC in byte 2, bit 7 and inhibiting rerouting in byte 3, bit 7).

All of byte 4 and the first half of byte 5 are used in inward messages to designate the source of peripherally originated messages. Twelve bits are provided because processor numbers rather than module numbers or network link numbers are used as peripheral addresses. This allows for the possibility, in some embodiments of the system, that more than one processor may be reached through a particular network link and that the same processor may sometimes be accessible through more than one network link.

The rest of byte 5 and all of byte 6, twelve bits in all, are used to identify an individual terminal served by the peripheral processor designated in the previous 12 bits (e.g., a line in a line module).

Byte 7 is reserved for indicating error conditions that may arise during message transfer, all bits being originally sent as 0 and certain of them being set to 1 in the event of error detection, according to the type of error (for example, repeated failure on preferred path: a first failure on the preferred path does not set an error bit in the message, even though a counter may be incremented in the sending module). 5 bits of byte 7 show the kind of module that last set the error byte to non-zero, this many bits being desirable in order to differentiate between the different kinds of PM's and input/output devices. Sometimes an error bit is set on an outgoing message that goes on outward before being returned for rerouting. In such cases a module more remote from the CP is not permitted to rewrite an error byte that is non-zero when received. On inward messages, however, a module closer to the CP may rewrite the error byte, since errors closer to the CP have a greater effect. Three bits of the error byte show the type of error. The meaning of the 3-bit error code differs according to the type of module that wrote the error byte.

After the error byte the message content follows. The receiving module is prepared by the message length byte (byte 1) for the provisions of a "checksum" in the last byte. It computes the checksum of the received message byte by byte and then compares the checksum so computed before the last byte with the checksum received in the last byte. If the two agree a positive acknowledgement (PACK) is sent, otherwise a negative acknowledgement (NACK) is sent. The preferred method of computing the checksum is to add the bits in the corresponding positions of all bytes with neglect of "carries," since this rather simply enables the detection of practically all transmission errors. The header (preliminary bytes) of the message are included in the computation of the checksum.

The alphabetical code designations "IDLE," "MIS," etc. by which the message control codes are identified, of course, have nothing to do with particular choice of the bit pattern for these one-byte codes. These codes are not necessarily codes that may not be used in the body of the message as a message character. In a system using a number of control codes to determine message procedures (sometimes known as "protocol"), it is undesirable to require the use of codes that may not be used also as message characters, because so doing requires the use of more bits for the message characters to make up for the codes reserved for message transmission control.

The illustrated system lends itself to the use of particular codes to control the message transmission process without requiring that each of these codes be a special code excluded from the message coding.

Actually only three bits are needed to differentiate the control codes of the message transfer sequences. They can conveniently be located at bits 3, 2 and 1 of a byte of which the other bits first three bits (bits 7-4) can be used either for a fixed code to confirm that a message transfer code is being spent or to repeat the pattern of bits 3-1 or otherwise to provide possibly useful redundance. The last bit can then be used to designate a WAI (who am I?) code used only in initialization of a module.

Table I illustrates a possible set of code assignments.

TABLE I

| CONTROL CODE NAME | CODE |
|---|---|
| IDLE | 000 |
| POIDL | 001 |
| MIS | 010 |
| SEND | 011 |
| SOM | 100 |
| PACK | 101 |
| NACK | 110 |
| IWS | 111 |

Message Flow Diagram

The flow diagram of FIG. 3 may be regarded as a summary of the input/output "protocol" for message handling, indicating the various states the equipment may have at each end of a two-way signal channel, the events that will produce various responses, and the changes of state and the responses that will be made.

As is common in flow diagrams, the states are represented by circles, the external events and, in some cases, decisions, are indicated by legends not framed at all, output functions are indicated in parallelograms, input and administrative functions in rectangles and decisions are indicated by diamonds. Some administrative functions are optional and these are starred to so indicate.

The rest condition is designated as IDLE by the circle 100. In this condition, the unit transmits the corresponding eight-bit code in its assigned signalling time slot every time it comes around, in practice once every 125 microseconds (and on a CSL it is repeated in every "word", i.e every 3.9 µs.).

Figure 3:
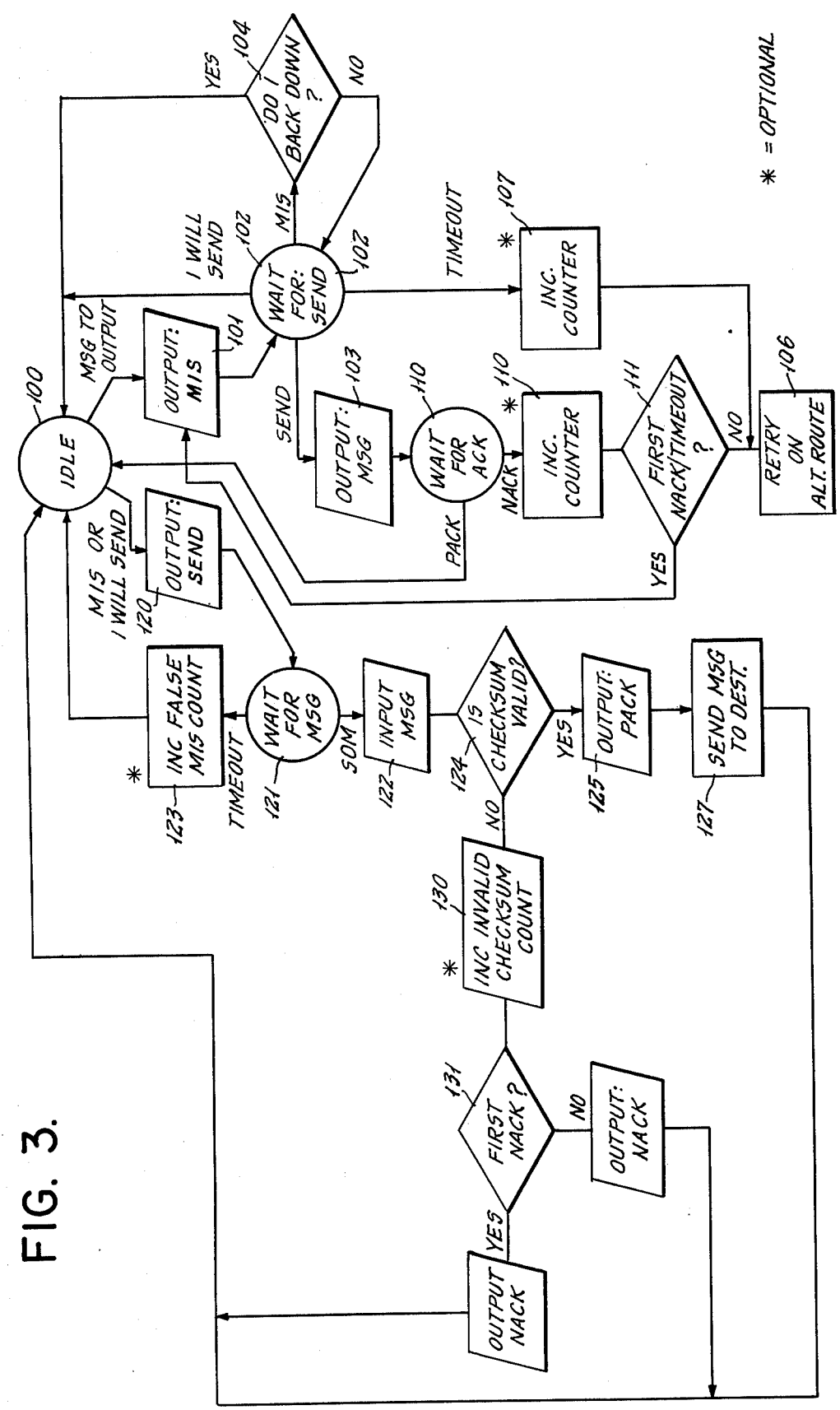
FIG. 3 is a flow chart of the internal message handling sequences for messages of the format of FIG. 2; [of the kind used for control in the exchanges of FIG. 1]

FIG. 3 shows there are only two ways out of the IDLE state. One of these is the presence of a message to be transmitted by the unit in question. As soon as such a message is ready to be transmitted (i.e. is loaded in a buffer for transmission), the output MIS is substituted for the IDLE code as indicated by the parallelogram 101 and the state then changes to that indicated at 102 in which the unit waits for the response SEND, while continuing to transmit MIS every 3.9 or 125 µs., as the case may be. There are four ways in which this state can be brought to an end. The message SEND can arrive, leading to the transmission of a message as indicated by the parallelogram 103; the message MIS can be received, raising a question of whether the unit should or should not back down, as indicated by the decision diamond 104, or in certain cases to be specified later, the superseding message IWS meaning "I will send" may be received from a unit not prepared to receive a message in which case the unit receiving the IWS will return to the IDLE state 100 and act as if it had received as MIS code wile being IDLE. Another possibility is that while the unit is in the "Wait for send" (WFS) state 102, none of the previous events will occur within some predetermined period during which, if everything were in normal operation, one of them would occur. This "timeout" indicates a malfunction and leads to a retrial on the alternate route, if any. Since this operation is much more than providing an output, it is indicated by the rectangle 106 rather than by a parallelogram. Preferably the going over to a retrial on an alternate route is preceded by reporting the malfunction, which generally involves incrementing a counter that registers the accumulated number of these failures. This operation is indicated by the rectangle 107. The state of this counter may at various stages trigger other maintenance reactions.

In the case where the message is sent as indicated by the parallelogram 103, that operation is followed by the unit entering the state 110 in which it waits for acknowledgement. If the latter is positive (PACK), the unit returns to the IDLE state and the message is erased from its buffer, which now becomes ready to receive another outgoing message. If NACK is received or if nothing is received for the timeout period, another malfunction counter is incremented, as indicated at 110, and a memory is consulted in order to make the decision, as indicated by the diamond 111, whether the NACK or timeout was the first such occurrence or whether it was the second in succession. In the first case, the unit goes back to the situation at which it sent MIS (parallelogram 101), and in the other case, it proceeds to a retrial on an alternate route (rectangle 106).

The other way out of the IDLE state 100 occurs upon reception of either the MIS code or the IWS code. The unit then responds with the output SEND as shown in the parallelogram 120 and proceeds to the state in which it waits for a message designated by the circle 121. The usual result is the reception of the start of message code (SOM) which in this case is also the indication that a data message follows. This, of course, is followed by an indication of the length of the message and the message itself indicated by the parallelogram 122. If no start of message (SOM) signal is received within the timeout period, the counter 123 for the reception of false MIS is incremented and the unit returns to the IDLE state. During the reception of a message, the checksum is computed and the count is compared with the checksum transmitted at the end of the message, as indicated by the decision diamond 124. If the checksum is correct, PACK is sent, as indicated in parallelogram 125, and the unit then undertakes to send the message to destination, which of course means either transmitting it further on another circuit or transferring it to a local decoder, so that this reaction is indicated by the rectangle 127. The unit thereafter returns to the IDLE condition 100. If the checksum received was inconsistent with the message, another malfunction counter is preferably operated, as indicated by the rectangle 130, NACK is sent out and the unit returns to the IDLE state 100.

The various timers, as is known, may simply be random-access memory locations associated with the unit's microprocessor, initially loaded with a number corresponding to the timeout period and decremented periodically by the processor's clock. Malfunction counters can likewise be memory locations.

The maximum length of a message, as determined by the buffer capacity of the NMCs is 64 bytes of 8 bits each. Actually, longer messages, up to 256 bytes, are preferably permitted in communication with input/output devices, such as tape records, through an input/output controller (e.g., 70 or 71 in FIG. 1), but this is not inconsistent with the 32 byte limit on messages to and from NMCs and PMs. In preferred practice each 8-bit byte is followed by two additional bits to make up a data "word." These two additional bits are needed for the handling of PCM speech signals, but, except for the framing bit sent once every 125 μs, are not used in network message transfer sequences.

All the channels of the network link handle digitial signals at substantially the same bit rate, for example 2.56 M bits per second transmitted in time-divided data words of 10 bits each, of which the first 8 bits are a data byte. The control signal links use the same bit and byte rates, and similarly timed framing bits.

A message may consist of less than 64 bytes, of course, but even if it does, it uses up one message place in the buffer of a module of the switching system. Each PM preferably has two levels of buffering, one-message transmitting and receiving buffers and queue buffers of 4-message capacity. Each NM has (in its network message controller) a buffer of 4-message capacity for inward messages. For messages going outward from central control, minimum buffering, of 1-message capacity, is generally sufficient at the NMs, but for simplifying initialization of a module, when a string of messages may go out to the particular module it may be advantageous to provide a 4-message capacity buffer for outward messages also at each NMC.

FIGS. 4-8 illustrate particular message transfer sequences among those comprehended in FIG. 3.

Figure 4:
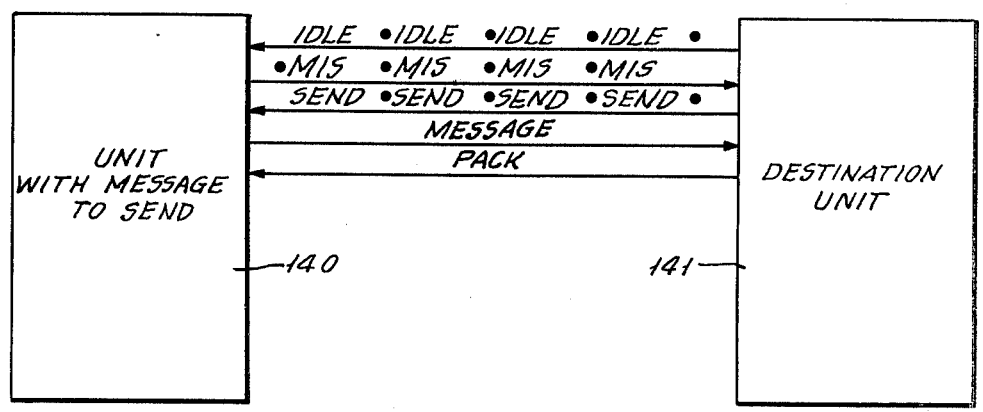
FIGS. 4-8 are diagrams illustrating particular message handling sequences.

FIG. 4 shows the message transfer sequence where the first attempt is successful. The unit 140 that has a message in its buffer ready to transmit may be a CMC, a NMC or a PM and the destination unit 141 to which the message is ready to be transmitted as the case may be, may be a CMC, a NMC or a PM. Where a port of the unit 140 has to be selected to reach the unit 141, that is assumed to have been done by reading the appropriate bytes of the message header to connect the link. The transmission sequence is indicated in descending order by the arrow-headed lines between the units 140 and 141.

The unit 141 is idle and sends repeated IDLE codes. In a control signal link the repetition is in successive "words", whereas in a network link it is in channel of successive frames.

The unit 140 sends repeated MIS codes. The reception of one of these then causes the unit 141 to send repeated SEND codes instead of IDLE codes. The unit 140 responds by sending the message.

The last byte of the message is compared with the checksum computed by the unit 141 during message reception. In the case of FIG. 4 checksum equality was found and the PACK code was accordingly sent. In practice, the acknowledgment codes are sent only once, but if desired they could be repeated once, or a few times without appreciably slowing up the system. The receipt of PACK by the unit 140 allows the latter to clear its buffer of the message or to treat that message space of its buffer as empty (i.e., allowing another message to be written into the space before that space of the buffer is treated as full). The units 140 and 141 are free, after the PACK message passes to revert to the idle state or to proceed to any other state (e.g., MIS) required by their message buffers.

The unit 141 is never told whether its PACK was received. If it fails to be received the resulting time-out has the same consequence as a double NACK.

Figure 5:
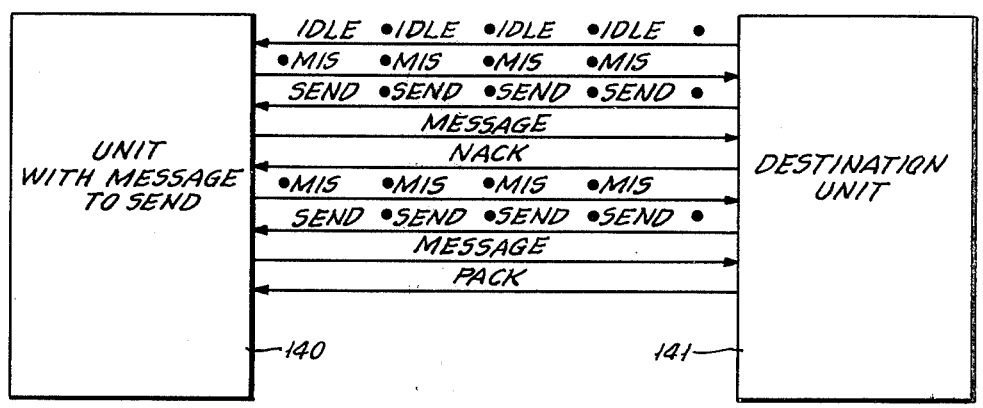

The case of a first-attempt failure and a second-attempt success is illustrated in FIG. 5. From the above description of FIG. 4 the meaning of FIG. 5 will be evident without further explanation of the message transfer sequence.

Figure 6:
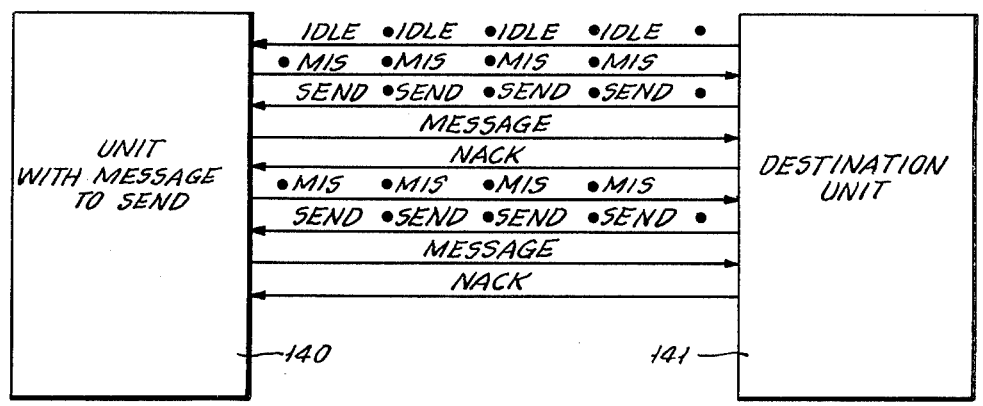

The case of a "double NACK" sequence is illustrated in FIG. 6. Following the sequence there illustrated the unit sets appropriate bits in the error byte of the message header and attempts transmission over the alternate path (re-routed message). In the case of a message from a NMC to a PM, where there is no alternate path, a "fail path" is used which consists of sending the message, with the error byte appropriately written, to the CPU (returned message).

In the preferred system the reception of a double NACK, such as illustrated in FIG. 6 also results (when transmission is over a CSL) in closing the particular port of unit 140 used in the unsuccessful message transfer sequence. This is immediately recorded in a "port status table" if the unit 140 is a CMC, causing all further messages for the corresponding destination to be immediately rerouted over the alternate path with a non-zero error byte without requiring any attempt to use the defective port-and-link. A port closure message is prepared for notifying the CPU (and the CMC's are in turn notified by the CPU of closed outward ports of NMC's), but it is not necessary to notify other units of the system. When a CMC port is closed, it is done by the CPU software after report of the error (of the double NACK received). Similarly when a CMC has sent a double NACK, the NMC treats that CMC as inaccessible and sends to the other, reporting the error as well, and the CPU must restore the lost accessibility. Likewise, a PM may treat as "closed" its port to a network module that has sent a double NACK, and immediately reroute its messages for that module to the corresponding module of the alternate network.

Figure 7:
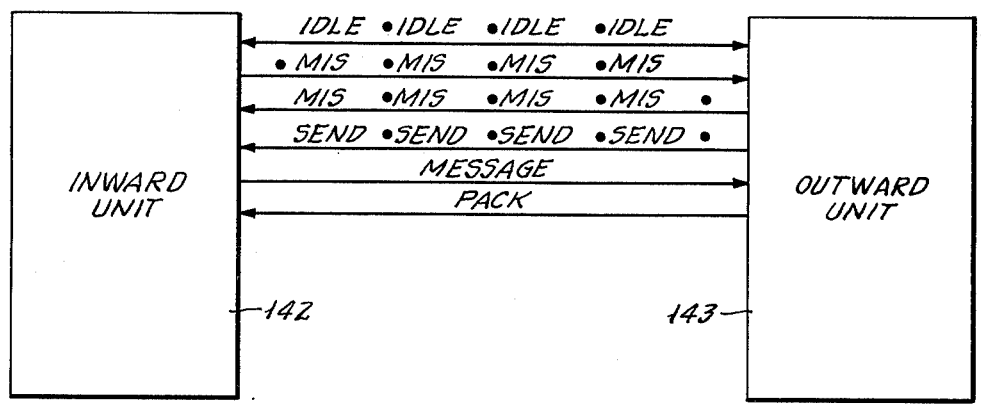

FIG. 7 illustrates the case of crossing MIS codes. In this case the outward unit (the one more remote from the CP) "backs down", (i.e. responds with a SEND code).

Figure 8:
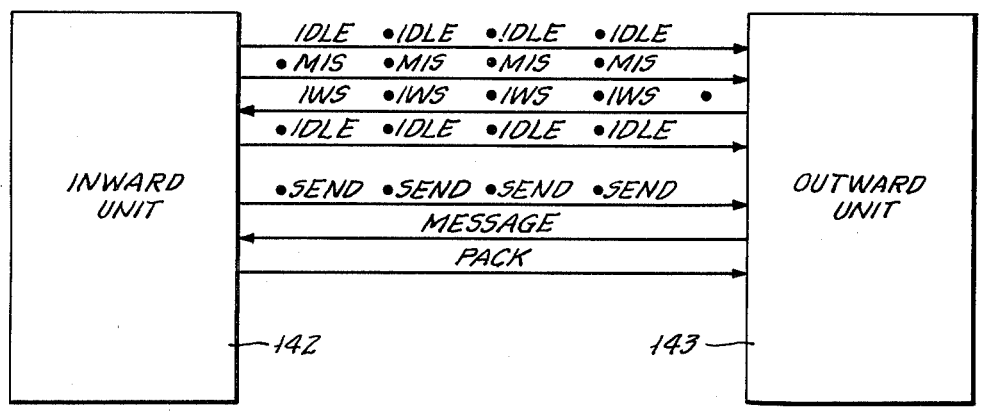

FIG. 8 illustrates the case in which the outward unit has a condition which does not permit it to "back down" and therefore sends IWS, causing the inward unit to "back down" by responding with SEND. In the preferred sequence illustrated the latter sends IDLE first and then SEND, to give time to make its incoming buffer available before the message comes. This is necessary at a CMC, which operates full duplex, but not necessary at a NMC which operates in a half-duplex mode.

Of course the above-outlined sequences for message transmission for operation of a switching system can be carried out in a wide variety of systems without departing from the principles above explained. For example, it is merely a matter of choice to set 64 bytes as the maximum length of the message and, likewise, to utilize 8-bit bytes. Furthermore, there are many usable conventions for sending each bit and, in particular, for so doing in a fashion that is compatible with network links and control signaling links that will operate over a wide range of frequencies, but will not pass steady unidirectional currents of any appreciable duratin (in common parlance, circuits that will not pass d.c.).

Link-to-Module Interface Circuits

In order to transmit over alternating current circuits essentially binary signals without limitation as to the data sequences, various kinds of bipolar pulse transmission systems are used. In the illustrated (preferred) case the so-called "bi-phase" system is used, in which there is a time interval for each bit transmitted, that may be referred to as a "cell", and the value of the bit depends on whether there is an "up transition" designating binary signal 1 (sometimes referred to as a "mark" signal) or a "down transition" designating the binary signal 0 (sometimes referred to as a "space" signal), these transitions always being near the middle of the "cell". Any transition on the cell "boundary", which is more or less coincident with a "clock" signal, is disregarded. Normally there is either none there or one in a direction opposite to the next transition. As mentioned before, this is only one of the many systems usable for putting binary signals into a form compatible with transmission through alternating current circuits in which transformers may be interposed.

It has already been inferentially mentioned that since the signalling channels are multiplexed in each network link with 30 voice channels, on a time division basis, it is necessary to provide a framing signal to be sure that each cycle of multiplexed signals is kept in step. In the preferred system, the framing signal in the network links is made by causing the tenth bit in each 10-bit "data word" sent over the signal channel to constitute a "bi-phase violation", so that it is immediately distinguishable from every other bit in the data system. This can be done, for example, by causing the signal voltage to remain the same for one and one-half bit "cells", the amount of direct current component introduced by this "bipolar violation" being negligible. Basically the same device is used in the control signal links between the network modules and the central message controllers, but in this case all 32 data words contain 8-bit signal bytes (none being speech sample bytes) and the framing bit is provided, by definition in only a particular one of the 32 "words". In this case, the tenth bit is "unused" in the other 31 "words", which is of course not necessarily the case in the network links, where 30 channels of words containing speech sample bytes are transmitted and there is no reason why the tenth bit, as well as the ninth, of the "words" could not be used, even differently from the manner of use in the two signalling channel. An important advantage of this system of universally providing the framing signal repetitively through all links of the switching system is that separate leads from the central control complex to network modules and peripheral modules for framing operations are entirely dispensed with.

It has already been mentioned that the network links are operated on the basis of allocating successive ten-bit word length time slots to each of 32 channels in turn, one frame of 32 slots occupying a time period of 125 µs, one slot and hence one "word" therefore occupying 3.9 µs and one bit "cell" 390 µs. Naturally, everything else in the electronic switching system is in step with these communication operations so far as possible.

The central message controller must scan up to 70 ports (up to 64 NMCs, 32 in each of 2 planes, plus up to enough input/output controllers (IOCs) for tape recording teletypewriter access, etc. to make a total of (70), depending upon how many of the ports which it could handle are actually equipped. It is designed to scan four of them in each 125 microsecond frame interval.

Figure 9:
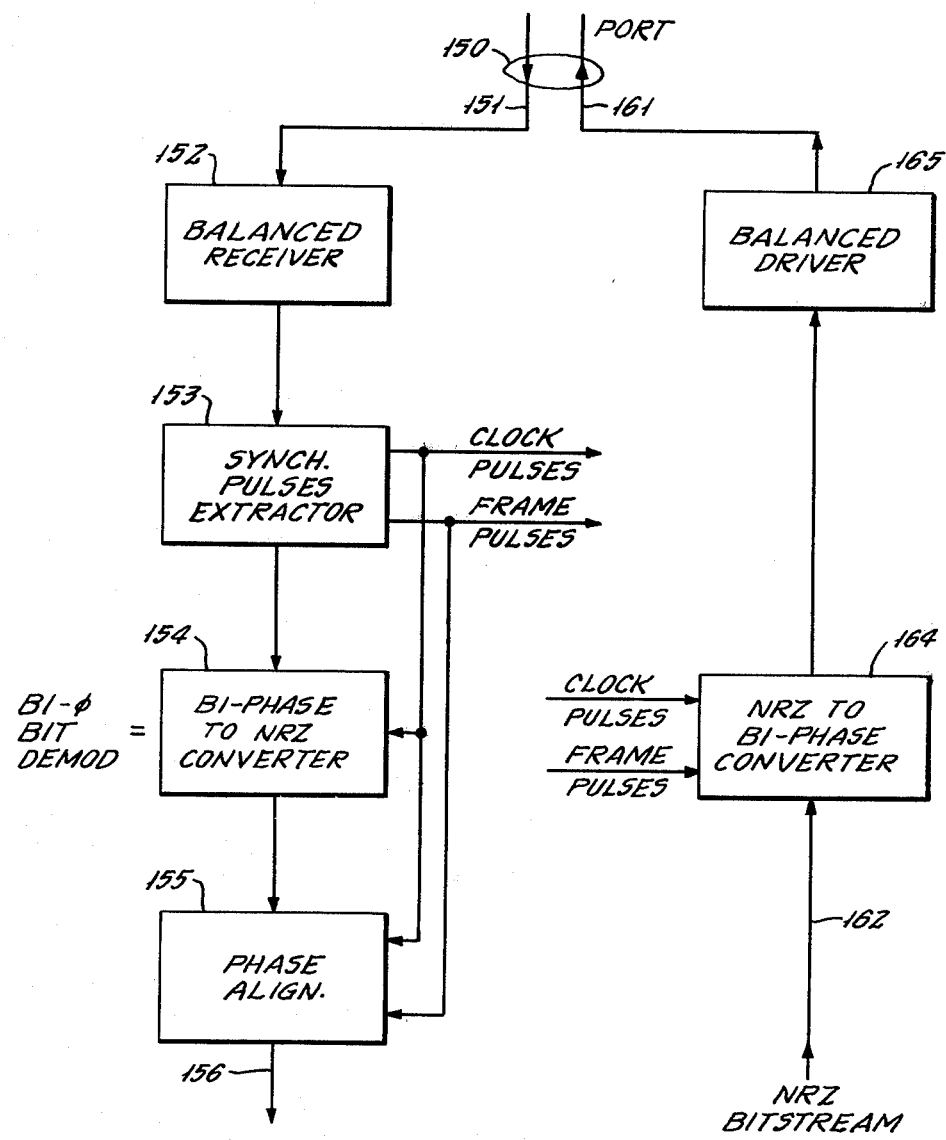
FIG. 9 is a block diagram of a typical interface between a module and link lines connecting it to another module in the telephone exchange of FIG. 1.

FIG. 9 illustrates a typical interface between a two-way link that links two modules of the switching system and the input and output circuits of the module at one end of the link. For this purpose the two central message controllers may be regarded also as modules of the switching system. Of course, in the network links between peripheral and network modules, the signals passing through the link include PCM speech signals of various telephone conversations, as well as inter-module messages. In the case of the control signal links between CMCs and the network modules, as already explained, there is a continuous stream of internal signals and no telephone traffic. The link circuit passing through the port 150 of FIG. 9 is made up of an incoming link circuit 151 and an outgoing link circuit 161, the names "incoming" and "outgoing" of course, applying strictly to a particular end of the link illustrated in FIG. 9.

The incoming link 151 goes to a balanced receiver circuit 152 that presents the bi-phase signals received, at a suitable voltage level, to the synchronizing pulse extractor circuit 153 that extracts, for separate outputs, the clock pulses and the frame pulses contained in the signal stream and passes the rest of the signals to the bi-phase to NRZ converter circuit 154. The term NRZ comes from the name "non-return to zero" and is a general term for binary signals in electrical circuits which are not balanced to ground or a similar reference voltage, in which frequently one of the two distinct levels used in transmitting binary signals is at or near local ground potential. These are referred to sometimes as unbalanced digital circuits, as well as by other names. As a practical matter, within electronic equipment digital signals are often transmitted on so-called 3-state circuits or busses in which, when the hardware is not enabled, there is a high impedance across the line, and when the hardware is enabled there is a low impedance across the line in the higher potential state and substantially zero impedance in the low potential state.

The converter 154 supplies NRZ binary signals to a phase alignment circuit 155 that serves to adjust for possible differences in signal travel time between the signal path chosen as the reference path and the other signal path leading to the module. The frame pulses are used for detection of travel time differences. An adjustable delay is inserted in the reference path so that the other paths can always be brought into phase alignment by adding a compensating amount of delay. The clock pulses serve to identify the data bits of the path in question.

The clock pulse output of the synchronizing pulse extractor circuit 153 on the reference link is used to enable the local clock pulse generator to be synchronized with the master clock. Each module has a choice of links that may be used as the reference links and if one fails another one can be used as reference by a fail-safe circuit. The frame pulses of course, when the link 151 is a network link, are used to sort out signalling channel signals from the speech signals and to operate, or to check the operation of the counter that identifies the various time slots in the local module circuits (not shown in FIG. 9).

Going the other way, the signals to be transmitted over the outgoing link 161, coming from line 162, are connected to a converter circuit 163, in which clock pulses modulate the data stream to produce bi-phase pulses, with the frame pulses being fed in also to override the modulation (i.e. to interrupt clocking of a flip-flop producing the required modulation) at the correct intervals. The output goes to a bi-phase driver circuit 165 which brings the bi-phase signals to a level sufficient to overcome all the transmission losses of the outgoing link circuit 161.

It should also be mentioned that preferably the connection of the link circuit 151 to the balanced receiver 152 and the connection of the link 161 to the bi-phase driver 165 utilize a coupling transformer having a center-tapped equipment-side winding that is grounded at the center tap. It is an advantage of the present switching system that all links operate at the same bit rates and can use the same model of isolation transformer at both ends of each link.

Peripheral Module—Basic Diagram

Figure 10:
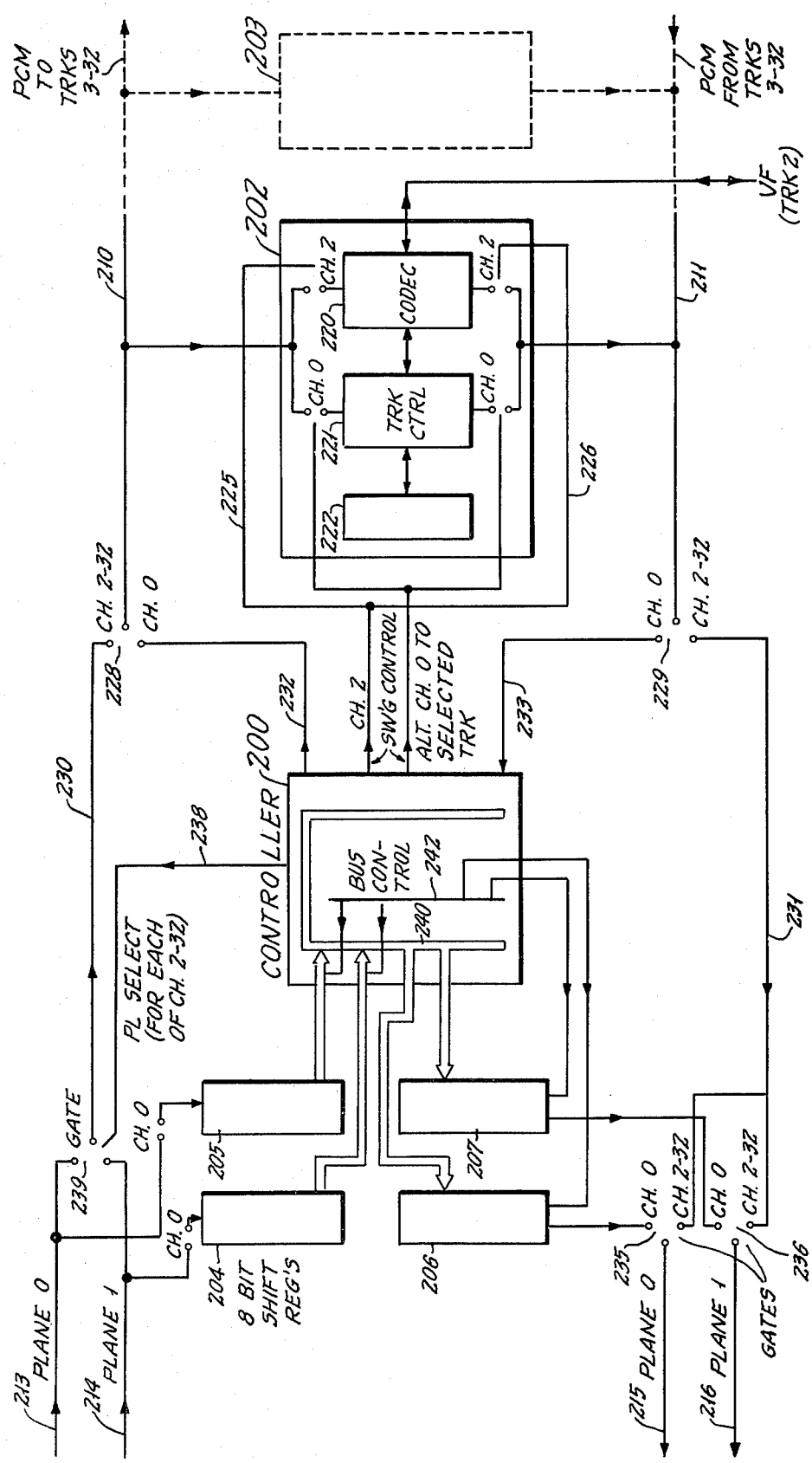
FIG. 10 is a simplified diagram of a trunk module for an exchange of the kind of FIG. 1.

FIG. 10 is a basic block diagram of the control portion of a peripheral module, simplified for explanation of the control of internal messages and their coordination with traffic handling functions.

There are illustrated in FIG. 10 principally a controller 200, a trunk circuit 202, input shift registers 204 and 205 for the controller 200 and output shift registers 206 and 207. It is to be understood that, 29 other trunk circuits are connected to the busses 210 and 211, one of these being shown in broken lines, namely the trunk circuit 203.

At the upper left are shown an incoming network line 213 from plane 0 of the network and an incoming network line 214 from plane 1 of the network. At the lower left are an outgoing network link 215 to plane 0 of the network and an outgoing network link 216 to plane 1 of the network. At the lower right is a two-way voice frequency trunk circuit 218. The voice frequency trunk circuit 218 is connected to a coder-decoder 220, which may be referred to as a "codec" for short, and also to a trunk controller 221 that is provided with an auxiliary memory 222. The codec 220 converts the voice signals into PCM pulses that are produced in groups times to go onto the PCM bus 211 in the time slot assigned to the trunk circuit 202. In the case of a line module, the time slot for a line circuit connection to corresponding PCM bus would be variable and would be assigned by the controller 200, but since the trunk module operates on a nonblocking basis, each trunk can have a permanent time-slot. The codec 202 also receives PCM pulse groups from the PCM bus 210 during the time slot assigned to the trunk circuit, in this case, for example, channel 2, and converts them to voice frequency signals that go out over the trunk 218. The various trunk conditions known in telephone art as supervisory signals, obtained from the usual tones, from d.c. conditions, or whatever, according to the kind of trunk, are passed on to the trunk control circuit 221, which also applies supervisory signals of the appropriate kind (in response to messages from the network) for transmission by the trunk 218.

The control 200 controls the time switches by which the various trunk circuits are in turn connected to the PCM busses 210 and 211 and this is illustrated by the control lines 225 and 226 controlling the connection of the codec 220 of the trunk circuit 202.

The PCM busses 210 and 211 respectively are terminated at the time switches 228 and 229. These switches are also controlled by the controller 200, but no control line is shown, to simply the drawing. During the time slots of channels 1–15 and 17–31, the busses are continued by extension busses 230 and 231 respectively, whereas during the time slots of channels 0 and 16 the busses 210 and 211 are connected into the controller 200 respectively through the leads 232 and 233.

The extension busses 230 and 231 each connect to a network link operating in the same direction through a plane selection gate. Because of the manner of utilizing the network planes already explained, the plane selection gating is different for the incoming links and for the outgoing links.

On the outgoing side, at the lower left of FIG. 10, there are two gates, 235 and 236. During the time slots of channels 1–31, both of these gates connect their respective network links 215 and 216 to the PCM bus extension 231, because PCM-coded speech signals are transmitted on both planes of the network. During the time slots of channels 1–31, the PCM bus extension 230, however, connects to only one of the links 213, 214, and not always the same one which one being determined by the controller 200. The line 238 controlling the gate 239 represents that function.

During the time slot of channel 0, however, as already explained, the plane selection operation is different. The controller 200 has an output buffer 206 for network link 215 of plane 0 and another output buffer 207 for network link 216 of plane 1. The output buffers are simple shift registers with a capacity of one 8-bit byte each. The 8-bit byte of one of these shift registers 206 and 207 will be an IDLE code at the same time that the other buffer contains a message byte. Of course, if the module in question is idle and ready to receive a message, both of the buffers 206 and 207 will put out IDLE codes during the time slot of channel 0.

Similarly, both of the incoming links 213 and 214 are connected during the time slot of channel 0 to an incoming buffer of the controller 200, namely the shift registers 205 and 204 respectively. These are loaded serially and thereafter read out in parallel into the input-output bus 240 of the controller 200. Similarly the registers 206 and 207 are loaded in parallel from the bus 240 and non-destructively read out serially in the channel 0 time slot. Only a new loading destroys the previous buffer content.

During the time slot of channel 0, either an IDLE code or a message byte is put into the one of the shift registers 204 and 205 and an IDLE code into the other. In some other time slot these bytes can be put on the I/O bus 240 for such processing as may be required. The buffers for connecting the parallel bus 240 with the serial data busses 232 and 233 are not shown in FIG. 10 but operate in the same way as the buffer-register group 204–207.

The controller includes the necessary processor, random access memory and read-only memory for its various functions for receiving and transmitting messages, evaluating messages from the network and for evaluating received trunk condition signals from the trunks so as to formulate messages. The speed of communication in the network is very great in order to meet the requirements for traffic handling, but the speed of communications with the individual trunks for supervisory and control purposes does not need to be so great.

The channel 0 and 16 time slots are available for exchanging data with the supervisory circuits (signal reception and signal distribution) of the various trunks. Actually all these time slots are not needed in all cases but the provision of an exchange of one byte in channel 0 and another in channel 16 of a frame selected for accessing a trunk is useful for certain types of trunks equipped to provide and use that much data. Accordingly, in each such slot there is a transfer of one byte of information both ways between controller 200 and a single trunk circuit (for example trunk circuit 202). The controller comes back to the same trunk 5 milliseconds later having similarly exchanged information with the other 29 trunks in between (which allows use of 10 of the slots of this series for special purposes that do not concern the present invention).

For its various functions, the controller 200, as has already been mentioned, of course, cooperates with a processor working with a random access memory (and also with a read-only memory for its rarely changed routines, etc.). The trunk circuit 202 has relatively few different supervisory tasks to perform, and consequently a simple buffer register 222 is sufficient to enable the trunk status to be quickly supplied for subsequent execution.

In order to simplify the illustration, FIG. 10 shows a codec in each individual trunk circuit for converting voice frequency signals to PCM pulse groups timed for the appropriate time slot, and vice versa. As a practical matter, it is preferred to do the coding in two steps and to convert between voice frequency and pulse amplitude modulated signals (PAM) occuring in the appropriate time slots and then to provide a common codec state between PAM busses and PCM extension busses, since it is the latter stage of coding and decoding that is sufficiently complicated to warrant the use of a common codec serving all trunks. The PAM coding and decoding is easily combined with time-division multiplexing and demultiplexing, whereas the PCM-PAM codec deals with signals that are already multiplexed. A PAM pulse is readily translated to or from an 8-bit "word" of which the base is an 8-bit byte. The operations during channel 0, however, should remain digital, however, requiring a digital data bus to the trunk circuits also. Such an arrangement is incorporated in the system of FIG. 11 and in the modification of it shown in FIG. 12.

Peripheral Module, Complete Basic Organization

Figure 11:
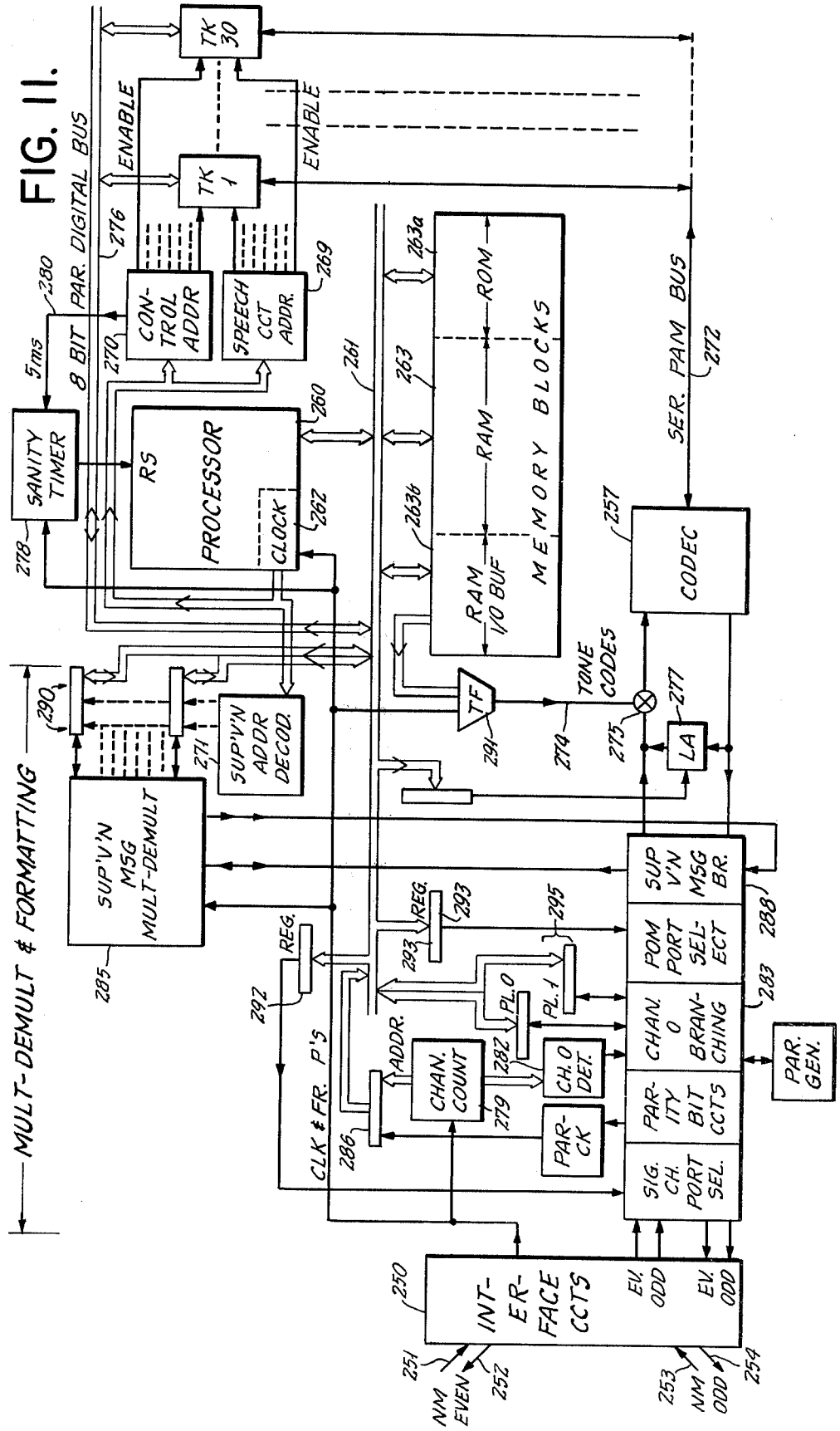
FIG. 11 is a basic block diagram of a preferred kind of trunk module.

FIG. 11 is a basic block diagram of the organization of a peripheral module, taking the trunk module as an example.

Between the network links 251 and 252 of an even-numbered NM of plane 0 and 253, 254, of an odd-numbered NM of plane 1, on one hand, and the processor 260 and its main data bus 261, on the other hand, there are not only the interface circuits 250 but also a group of "mult-demult" and formatting circuits. The term "mult-demult" is short for multiplexing and demultiplexing. Formatting refers to conversion from serial to parallel transmission of data bits, together with addition, in some cases, and decoding, in other cases, of address bits. The processes 260 includes a clock circuit 262 synchronized to clock and frame pulses from the interface circuits 250.

In addition to performing normal clocking functions for the processor and its memory, the clock 262 counts out 5 ms and 160 ms intervals for operating trunk accessing circuits 269 and 270 and a supervision address decoder 271. The trunk accessing circuit 269 enables each trunk at the time of its assigned speech channel for passing a speech sample in each direction of transmission, while the similar circuit 270 enables each trunk in turn in 30 of the 40 channel 0 slots, and likewise in 30 of the channel 16 slots, in a 5 ms cycle for transfer in both directions of an 8-bit digital byte (one byte in channel 0 and one byte in channel 16: the latter is not needed on most trunks, but there are trunk types where the second byte is advantageously usable).

The speech samples are converted into pulse amplitude modulation samples when going from a trunk to the PAM bus 272 and, going the other way, the PAM samples distributed to each of the respective trunks are integrated in the trunk circuit to reproduce analog speech waves. As mentioned before, the PAM speech samples are converted to PCM codes in a common codec 257 serving the entire module. Although the two-way PAM bus 272 is drawn as a single line with double arrowheads, the corresponding PCM bus on the other side of the codec 257 is shown as two one-way lines, because one of them has an incoming branch 274 for applying a PCM tone sample in one channel or another as ordered by the processor 260 and it may be desirable to provide an additional connection not shown in the drawing for assuring that the branching device 275 blocks the path from the interface circuits 250 during the short period required to apply the tone sample code. If a tone is to be provided in the other direction, the processor, acting through the digital bus 276 can produce a loop-around connection at the trunk circuit, as is known to be done in other types of switching systems through more conventional controls. There is also provision for a digital loop-around connection 277 which can be activated in any one or more channels under the orders of the processor 260.

It is assumed in FIG. 11 that all the trunks are analog trunks. If some are digital they can be addressed by the addressor 270 to put and receive PCM samples in and from the bus 276 in the correct speech sample time-slot, while at the same time a two-way connection is established between the bus 276 and the two-way PCM lines connected to the codec 257, by means of a third addressor (not shown).

Trunk condition reports and trunk commands are interchanged between the digital bus 276 and the trunk circuit on two-way 8-bit parallel digital connections, the trunk access circuit 270 enabling the transfer in one direction and then in the other for each trunk in turn during the channel 0 time slot, and likewise the succeeding channel 16 time slot. The different trunks are thus enabled for digital communiciation with the processor in different frames as already explained. The digital bus 276 communicates with the main bus 261 of the processor by which the memory 263 is accessed, so that the processor can put the bytes thus picked up to appropriate places of the memory for handling and deliver bytes to the digital bus 276, selected from the memory 263 for application to the particular trunk during its accessing time slots.

The connections of the processor 260 and its memory 263 to the interface circuits require the multi-demult and formatting circuits now to be described. These are required for the following functions: handling channel 0 message on the network links, both in transmission and reception; handling supervision messages (which are messages from PM to PM); and port selection (selecting which of the incoming network links will be used for receiving speech samples and selecting the outgoing network link which will be used for transmission of channel 0 messages).

For these various tasks it is necessary to separate the channel 0 signals from the incoming bitstream of both network links, to insert message codes and message bytes into the outgoing bitstreams of both network links (only IDLE codes in one of them), to separate the supervision bits and detect parity errors on all speech channels, sorting out the results by channel, and to insert supervision message bits (as well as generate parity bits) for completion of the data words in which the PCM speech samples are transmitted.

For this purpose the counter 279, to which clock and frame pulses are furnished from the clock and frame pulse output of the interface circuits 250, is provided to register at any moment the number of the channel time-slot interval. It is to be understood that the counter 279 could be a counter located in the memory 263, because such a counter would also be required by the processor 260 and would be provided in the memory 263 as a memory location incremented regularly by clock pulses and reset by frame pulses, but as a matter of convenience, for reducing the input/output load on the bus 261, a separate "hardware" counter 279 is preferably used in the mult-demult circuits, rather than one of the "software counters" in the memory 263.

In a similar fashion, a hardware timer 278 is used to reset the processor 260 in case of serious malfunction indicated by the failure of a timer reset signal to be provided every 5 milliseconds over the line 280 from an appropriate part of the module, such as for example the trunk addressing circuits 270, this signal confirming that some large part of the operations of the processor are functioning normally. This timer, which is accordingly called a "sanity" timer, could obviously not be a software timer in the memory 263, because a resetting operation preferably destroys the entire random access memory and requires it all to be replaced afresh by a string of initializing data from a CPU obtained from a tape memory and sent over the message path in 256 byte blocks with special error checking (the only network response for which the PM is prepared from the time of reset until the program is all loaded), to provide a fresh start free of program errors which may have crept in. The ROM contains enough nonvolatile instructions for loading the replacement for the RAM programs lost by resetting, the loading of program being done in accordance with a well-known procedure commonly called "boot-strapping".

The channel counter 279 furnishes its output to a decoder 282 which operates the channel 0 branching circuit 283, to a supervision message mult-demult circuit 285 and to the address portion of a parity error register 286.

The supervision message mult-demult operates the supervision message branching circuit 288 to pick up bit 1 that follows the 8 bits of a PCM speech sample received from a network line and to add an appropriate bit 1 to follow each PCM speech sample provided by the codec 257 that provides bits 9-2 (the bits being numbered in descending order). The mult-demult circuit 285 loads the incoming portion of an array of supervision message registers 290, each of one speech channel, which are unloaded in 8-bit bytes (only 2 such per cycle if 24 bits are used merely for framing) into the memory 263, and feeds out bits from 8-bit bytes of supervision message that are put into the outgoing portions of the register 290, prefixing them with framing bits and then feeding the message bit by bit to the transmitting portion of the supervison branching circuit 288. The timing of the loading and the unloading of the registers of the array 290 is provided by the supervision address decoder 271 that is driven by the clock 262 of the processor 260.

The supervision messages consist of the 40 bits provided frame by frame in each channel by bit 1 following a speech sample. These bits provide a message channel from PM to PM that goes through the same switched path as the speech samples and bypasses the CPUs. The kind of information transmitted through this supervision message channel determines the response to be provided by the program of the processor 260 stored in its memory 263, which is furnished from the CPU, and may include connection supervision signalling and/or ordinary signalling, such as "onhook" and "offhook" conditions, and also calling digits, for which this channel may be found more economical in the use of multi-frequency tones, and other information that may be prescribed by the CPU to be transmitted through this channel also. Preferably only 16 bits of supervision message are transmitted in each 5 ms interval and the other 24 bits are invariant, preferably a string of 23 zeros serving as a framing signal followed by a 1 that serves as a start of message signal.

The processor 260, as instructed by its memory 263, makes up the supervision message going out from each trunk to which the module is connected and it also compares the supervision message received on each trunk in each 5 ms interval with the supervison message received in the previous 5 ms interval on the same network link channel. So long as there is no change in the supervision message it does nothing more about it, but as soon as a change is detected in the supervision message, it enters the appropriate process block of its memory and takes the appropriate action, such as providing a digital signal to a trunk circuit over the digital bus 276 or changing the receiving port of the interface circuits 250 to switch reception over to the other network plane.

The processor 260 selects a channel 0 message transmitting port through a signal port select register 292 and selects the PCM receiving port through a PCM port select register 293.

Although messages are sent through channel 0 through only one port at a time, IDLE codes are transmitted and received on the other port. Thus the channel 0 formatter 295 interposed between the channel 0 branching circuit 283 and the data bus 261, in order to make the transition between serial data and 8-bit parallel data bus, provides receiving and transmitting formatting for both ports. A formatter 297 is also needed to convert tone samples from parallel to serial codes before their application to the PCM line through the branching device connection or switch 275.

The memory 263 of the processor includes a small ROM section 263a which is "nonvolatile", containing basic routines and other instructions unlikely to require changing. It also includes an input/output buffer section 263b which may be used to hold information just received or about to be sent out until the processor can deal with it.

8-bit bytes must be accompanied by a memory address for writing them into the random access memory (RAM) portions of the memory 263. The necessary address bits are provided by the processor in accordance with its program stored in memory and, in the case of information coming over the digital bus 276 towards the memory or through the various data inputs from the mult-demult and formatting circuits to the digital bus 261, may be provided by the hardware associated with the particular connecting parallel data bus identifying in what part of the input/output buffer 261b the data must go. Similarly the outgoing portions of the busses branching out from the main data bus 261 have enabling circuits of the usual kind so that the processor can direct data from its memory into the proper output.

The RAM portion of the memory 263 may include, in addition to program instructions, various queues and stacks for manipulating data, as is well known to supplement the processor's built-in resources, and various "software timers", which is to say memory locations used to count out real time and to time out when expected events or responses are not forthcoming within the respective periods proscribed for them, as well as asynchronous counters for counting up various events, such as, for example, parity errors on a particular channel of a network link. The latter counters may be scanned by the processor 260 in accordance with a part of its program, or they may be read from time to time by the CPU by sending a message to the PM, to which the processor 260 is programmed to reply by giving the information from the particular counter located in its memory 263.

Processors suitable for the function of the processor 260 are available from a number of manufacturers, and memory modules or blocks, both of the ROM and of the RAM variety, are available that can be put together into a memory array to contain all the necessary input/output, programming, and data manipulation and accumulation for all of the functions of the trunk module of FIG. 11. In particular all of the channel 0 message transfer sequences described in connection with FIG. 3 can be implemented with the use of well known processes and memory unit in the arrangement of FIG. 11, along with the other functions described above.

Peripheral Module—Preferred Version of Trunk Module

Figure 12:
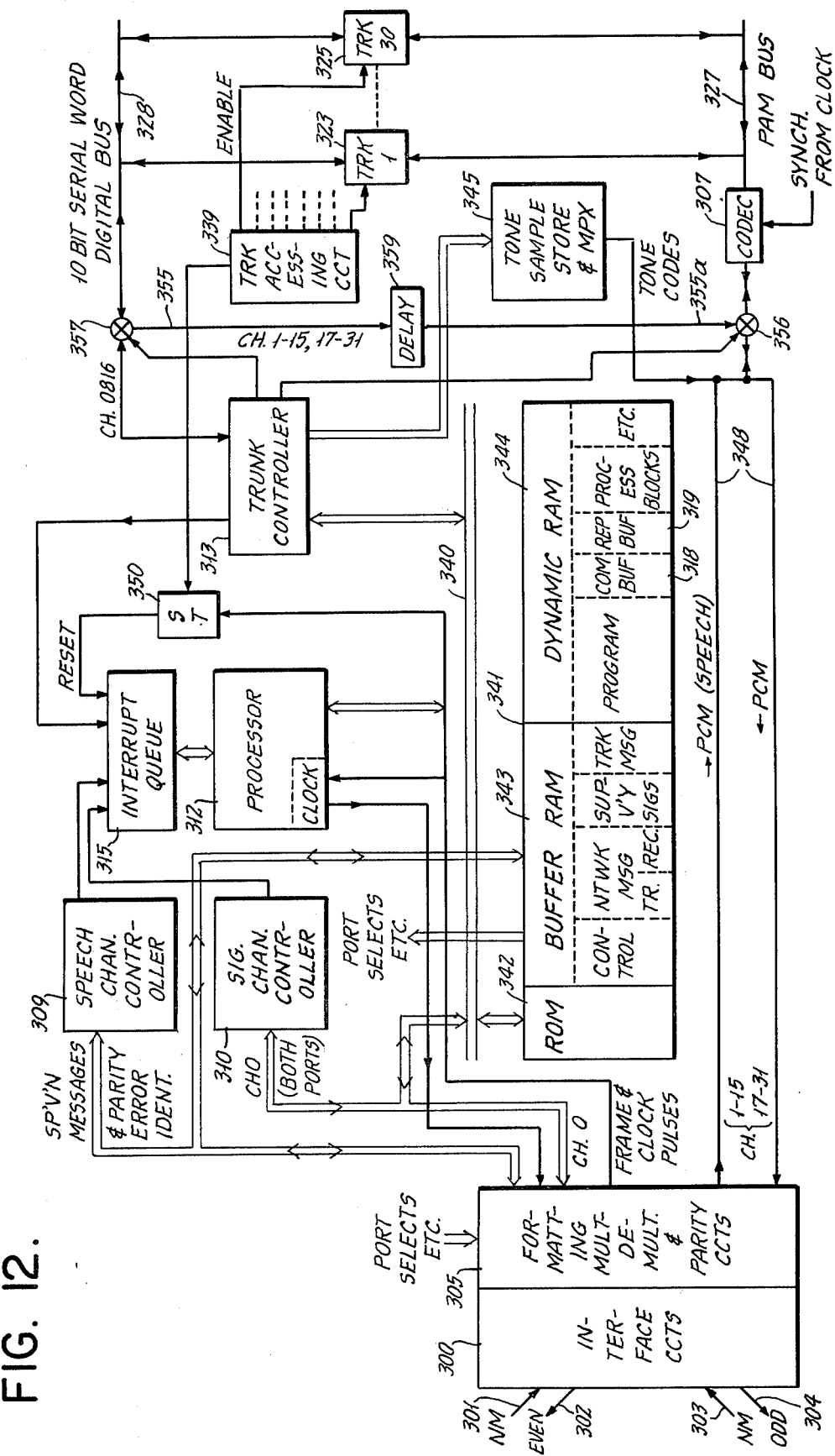
FIG. 12 is a block diagram of a preferred modification of the trunk module of FIG. 11 designed to use components that are at the present time less expensive.

An illustration of the implementation of the message transfer sequence as well as of the supervision message functions is given in some detail in connection with a modified form of the trunk module of FIG. 11 that is illustrated in FIG. 12.

The trunk module illustrated by diagram in FIG. 12 is designed to use a processor 312 that is widely available at relatively low cost but which has certain limitations that make it desirable to utilize certain additional devices to do what may be called preprocessing of a relatively simple kind, so that the processor 312 is brought into play only upon certain combinations of events determined by such preprocessing.

As shown in FIG. 12, the preferred embodiment of trunk module for the practice of the invention utilizes a processor 312 of INTEL type 8085 which is provided additionally with an interrupt queue for operating, under control of the processor, the interrupt inputs characteristic of this type of processor and provided with "hardware" controllers 309, 310 and 313 (as distinguished from "software" memory), each of which provides the preprocessing mentioned above, and can call in processor 312 through the interrupt queue 315. The controller 309 and 310 may actually be part of the same logic unit, but they are shown separately because they provide separate interrupts and work on different inputs. This same unit may also contain, for convenience, at least part of the formatting and mult-demult circuits 305 which are interposed between the rest of the module and the interface circuits 300 that makes the connection with the incoming network links 301 and 303 and the outgoing network links 302 and 304 for communication with an even numbered NM (not shown) and with an odd numbered NM (likewise not shown). The controller 309 preferably contains the necessary formatting for supervision messages, and parity error identification and is therefore shown as having a serial input whether the data furnished to it is over two serial lines as shown, a channel counter in the controller. If the channel counter 279 of FIG. 11 is used, then more input lines to the controller are needed, the choice being simply one of economics.

The formatting, mult-demult and parity circuits 305 perform the functions described for the corresponding circuits of FIG. 11 and may be correspondingly constituted. The trunk controller 313 scans and activates the trunk circuits, such as the trunk circuit 323 and the trunk circuit 325, through the trunk digital bus 328 that corresponds to the digital bus 276 of FIG. 11, with the assistance of the trunk accessing circuit 339.

A separate tone sample storage and delivery circuit 345, formed of blocks of ROM and counters, is provided from which the trunk contoller 313 can select tone samples in proper succession to generate tones by tone PCM codes in any particular time-slot, this being an economical arrangement compared with putting the selection of tone samples among the tasks of the processor 312 and putting the storage of tone samples in an ROM portion of the processor's memory.

The processor again operates through a main data bus 340 through which it has access to its memory 341 which includes an ROM portion 342 corresponding to the ROM portion 263a of the memory 263 of FIG. 11, a fast-acting buffer RAM 343 serving as input/output buffer for the processor, and a dynamic RAM 344 for the other memory requirements of the processor 312. The buffer RAM 343 is a socalled "static" RAM which the memory bits are written into flip-flops in the well-known way, but the remainder of the RAM can conveniently be provided in dynamic form, in order to obtain much higher density of memory and lower cost per bit storage, at the expense of needing to "refresh" the memory every millisecond or two and a slightly lower reading and writing speed. Such memory blocks store bits in the form of the charge of a small capacitor, and the leakage is such that refreshing of the memory by an automatic circuit (which is provided as an external component with such memories in conventional technology) is necessary to prevent the memory from becoming "corrupted" by the passage of time. An overall cost saving is provided by the use of dynamic RAM blocks where their characteristics are suitable for the purpose, rather than the more expensive static RAM blocks.

The controllers 309, 310 and 313, like the trunk accessing circuit 339 and the interrupt queue 315 are logic circuits the constitution of which will be evident to persons skilled in the art from the specific functions they are required to perform as set forth herein. Manufacturers of such assemblies of logic circuits are accustomed to producing them to specifications that merely state the required functions in a sufficiently specific manner.

The controller 309, 310 and 313 have access to the data bus 340, but they are limited to addressing buffer RAM portion 343. Time-sharing is provided so that these controllers and also the processor 312 can have two-way access to the buffer RAM 343 in any channel time-slot without interfering with the access of the others of these four units thereto. For this reason the buffer RAM 343 must be faster to read and write than the dynamic RAM.

The foregoing describes the principal differences between the circuit of FIG. 12 and that of FIG. 11, except for trunk accessing which is described further below. The organization of the contents of the memory 341 will, however, be described before explaining the operation of the module in more detail.

The memory 341 can be adequately constituted as a memory of 19 "thousand" 8-bit words. The word "thousand", abbreviated "K" in digital data practice refers to a quantity of 1024 bits rather than merely 1,000. Of the 19 K words, 2,048 are in the ROM 342, and, as in the case of FIG. 11, are "non-volatile". 1 K are in the buffer RAM 343, organized in four pages of 256 words each, and the remaining 16 K are in the synchronously refreshed dynamic RAM 344.

The dynamic RAM 344 includes a large amount of program obtained upon initialization from the CPU, along with process blocks, queues, data stacks, timer locations, counters and so on. A portion of the dynamic RAM 344 of particular interest in connection with the present invention are a four-message command buffer queue 318 and a four-message report buffer queue 319, to which reference will later be made.

The line modules and digital carrier modules of a switching system of the present invention are organized in a manner similar to that here shown for a trunk module, the basic difference being that since the line module has more lines than link speech channels each line circuit is not enabled in every frame and the processor must work with the connection memory to assign a link speech channel to align at the beginning of a call and must deny dial tone to a calling line if all speech channels are occupied. In the case of the digital carrier module, the PAM converters are unnecessary and also the CODEC, but adjustments may be necessary for differences in clock rates and for translation of supervisory signals, as will be evident to those familiar with known forms of time-division electronic switching.

In order to illustrate the specific logic of a typical peripheral module, the operation of the trunk module of FIG. 12 will now be considered in detail.

The commands executed by signals over the digital bus 328 in the various trunk circuits such as the trunk circuit 323 and the trunk circuit 325 are preferably executed by setting an appropriate flipflop in the trunk circuit, the output of which controls a power transistor driver which in turn operates a relay.

Once a trunk is accessed after an appropriate interrupt is provided to the processor, the latter does what is necessary in about 0.1 ms, involving reading, writing, etc. At the next look the processor can verify the resulting status of that particular trunk. Furthermore, the trunk controller 313 can scan trunk status data repetitively, comparing it with previous status data put in memory, interrupting the processor only when a change occurs.

In general it may be said that the timing is done rapidly through an executive instruction which includes an execution table. The 8080 processor used for the processor 312 is not designed to look at "flags" provided in the memory to indicate actions performed or needing to be done. In consequence provision is made for generating a nonqueued list (that is, neither a first-in-first-out, nor a last-in-first-out list). There are, however, several levels of interrupt provided for the 8080 processor and the interrupt queue 315 is provided, so that the queued interrupts are executed, rather than merely read. These introductory remarks will be better understood with respect to a further description of the manner of operation of the module of FIG. 12.

Sixteen-bit addressing is used for access to the 19 K byte memory 343. The addresses in the memory are conveniently defined, for example, by five places of hexadecimal digits of which the lower ten are represented by the Arabic digits 0-9 and the upper six are designated by the alphabetical letters A-F.

The approximately 1,000 bytes of buffer RAM are available for control of the trunk module hardware and are subdivided into 4 "pages" of 256 bytes each.

The first "page" of this memory may be referred to as the control page (addresses F00 to 0FFF, for example). This "page" of the memory is subdivided into 32 "channels", but for reasons of convenience, these channels, numbered 0 to 31, do not each collect information relating to exactly the same numbered channel of the network links. The reason is that it is simpler to number the channels in real time and where, as in the case of message bytes, for instance, a one-channel slot delay is necessary for reaching the memory, to put data in a memory channel numbered higher by 1 than the network link channel to which the data relate. The scheme for utilization of the control page "channels" in the buffer RAM of the trunk module memory runs essentially as follows:

Channel 0 of the control page of the memory has 8 bytes (or "words") with addresses OFOO through OF07. The next 8 bytes are designated as composing channel 1 of the control page memory, and next 8 channel 2, and so on. The organization of the memory will be better understood if the first, second, third and so on bytes of the various "channels" of the memory are explained sequentially.

Thus, the first byte of each channel of the memory is a command for the trunk having the same number as the memory channel. In the case of channel 0 of the memory this is one of the general purpose timers, since there is no trunk given the number 0. This is one of the "software timers" located in the dynamic RAM. Likewise, in the case of channel 31 of the memory the first address is of a byte constituting a command for the second general purpose timer of the trunk module. Each of these timers is actually two individually addressable timer locations.

The second byte of the channel of the control page of the memory is in most cases a PAD control word for the PAD value selected by the receiving and transmitting PAD addresses to be applied to the corresponding speech samples, a value set up on a per call basis via messages from the CMC, the PAD word for a particular channel of a network link being located in the corresponding channel of the control page of the memory, except that the PAD word for channel 1 is in channel 0 of the memory and the PAD word for channel 17 of the network link is in channel 16 of the memory. This is because channel 1 of the memory is utilized for a number of bytes that relate to the signalling channel, channel 0 of the network link, because of the delay in storing the message bytes and codes and, likewise, the corresponding bytes of channel 17 of the memory are utilized for other signalling channel information as further explained below. The first and last addresses in channel 1 and in channel 17 of the memory, however, correspond generally to the first and last words in other channels of the memory.

The third word in each channel of the memory is in general the trunk number word identifying a particular trunk associated with a network link channel having the same number as the number of the memory channel in question. This pattern, however, is varied so that the trunk number for channel 01 of the network link is located in chanel 0 of the memory control page and the trunk number associated with channel 17 of the network link is located in channel 16 of the memory. This vacates the corresponding addresses in channels 1 and 17 for signalling information as mentioned before. The fourth and seventh words in the memory channels of the control page are not used in most cases, but they are used in channels 1 and 17 of the memory for signalling information. The fifth word in a memory channel of the control page is for the supervision message status of the network link channel bearing the preceding number (channel 31 in the case of channel 0, channel 1 in the case of channel 2 and so on, these words again begin utilized for different signalling information in chanels 1 and 17 in the memory). The sixth word of a memory channel in the control page of the memory controls the transmission of a supervision message in a manner more fully explained below.

The eighth and last word of each channel of the control page of the memory is a command word for the next higher numbered channel of the network link, except that this address is not used in channel 31, where the succeedingly numbered channel is channel 0, a signalling channel and, likewise is not used in channel 15.

The second through seventh words in channel 1 of the memory are, as mentioned before, signaling information. The second is the plane 0 message state, the third is the plane 0 message address, the fourth is the plane 0 IN register, the fifth is the plane 0 out active register, the sixth is the plane 0 message byte count and the seventh is the plane 0 out idle register. The corresponding words in channel 17 provide the corresponding information for plane 1.

The various memory words of the control page described above will now be further described as used in the preferred embodiment of trunk module.

The trunk command word, which is the first word of channels 1-30 (a corresponding command for a timer being provided in channels 0 and 31 of the memory) makes no use of the third, fourth and fifth bits of the 8 bit word. It should be mentioned that it is common to number channels in the order of their sequence, but it is common to number bits in the reverse order of their sequence because it is usual to consider the first bit of a byte or word as the most significant bit, as in arithmetical notation. Thus the bits not used in the trunk command word are bits 5, 4 and 3. Bit 0 of the trunk command word is the trunk mode control bit, and if it is 1, an interrupt will be raised if the received trunk data matches the data stored in the trunk compare locations. Conversely, if the trunk mode control bit is 0, an interrupt will be raised if the received trunk data does not match the data stored in the trunk compare locations. (The received trunk data and the trunk compare locations are described in connection with the trunk message page of the buffer RAM.)

Bit 1 of the trunk command word is the trunk interrupt control bit. If it is 1, any interrupt generated as a result of this bit will be enabled. If it is 0, any trunk match/mismatch interrupt will be disabled.

Bit 2 of the trunk command word is the trunk error control bit. If this bit is 1, a parity error on trunk, message transfer will generate an interrupt, whereas if this bit is 0, the parity interrupt is masked (parity error will not generate an interrupt).

Bit 6 of the trunk command word is the timer interrupt control bit. An individual timer is provided for each trunk which is decremented once per major cycle (5 milliseconds) and an interrupt is generated when the timer reaches 0. If the timer interrupt control bit is 1, these timer interrupts at the end of 5 millisecond cycles are enabled, whereas when this bit is 0, these trunk timer interrupts are disabled. Timer interrupts are sent continuously until the timer address is switched or the timer contents are changed.

Bit 7 of the trunk command word is for timer address control. Each trunk module timing operation may decrement one of two locations. The location to be decremented once per 5 millisecond interval is selected by the timer address control bit. For example, if the TAC bit of trunk command word 2 is 1, then the contents of timer 1 of trunk 2 will be decremented every 5 milliseconds. If this bit is 0, then timer 0 of trunk 2 will be decremented (the trunk really has a pair of software timers).

In channel 0 and channel 31 of the memory, a command word for the general purpose timer in question is provided and in these words only bits 7 and 6 are used and these are the timer address control and timer interrupt control bits having respectively a significance for the general purpose timer corresponding to the significance of the corresponding trunk command for the individual trunk timers.

The PAD control word uses all 8 bits. An independent PAD adjustment is provided both going to and coming from each trunk. Bits 2, 1 and 0 provide a transmitting PAD address, transmitting meaning transmission from a trunk to a network link and each address signifies a different number of decibels of amplitude added to channel speech samples. Bits 6, 5 and 4 provide similar receiving PAD addresses. Bit 3 is the receiviing PAD enable bit which controls whether the PAD value selected by the corresponding address will be applied to the corresponding speech samples (if this bit is 1) or whether the speech samples will be left unaffected (if this bit is 0). Bit 7 is the corresponding transmitting PAD enable bit. As mentioned before, the required PAD values are set up on a per call basis by messages from the CMC provided by the CPU.

The trunk number word does not use bit number 6. Bits 0-4 identify the number of a trunk associated with the network channel to which the word relates. In a trunk module such assignments are relatively permanent (long-standing is a better word). For example, loading 03 as the third word of channel 16 of the control page memory will cause connection of the speech samples from trunk number 3 to network link channel number 17 (as mentioned before, the third word of channel 16 of the memory is the trunk number word for channel 17 of the network link, since channel 16 is available as a signalling channel and is not used for speech samples from any trunk, whereas channel 17 of the memory has its words 2-6 devoted to signalling data).

Bit 5 of the trunk number word is the trunk enable bit. Speech samples to and from the trunk are enabled only if this bit is set (that is, if it is equal=1). This bit does not affect the transmission of commands to or reports from the trunk.

Bit 7 of the trunk number word is used to set in a feature for testing purposes, a feature which likewise does not affect the transmission of commands to and reports from the trunk. This bit is normally 0, but when it is set at 1, digital data from the trunk is looped back towards the trunk. This bit is therefore referred to as the trunk loop-around bit. The looping around is connected at the loop-around path 277 shown in FIG. 11 or a corresponding place in circuit 305 of FIG. 12.

The fifth and sixth words in most channel of the control page of the buffer RAM memory relate to the supervision message system using bit 1 of the 10 bit words of which bit 9-2 are PCM speech samples. A supervision message is sent from one peripheral module through the switch connections to the other in the following manner. In every forty frames corresponding to a 5 millisecond period 23 synchronizing zeros are sent followed by a 1 which may be regarded as a start-of-data bit. The remaining 16 bits of the 40 bits sent frame by frame are specified for the channel, but there is a choice between two words identified as word 0 and word 1, which allows loading the next word in while the previous one is still being sent. Each word is made up of two 8-bit bytes identified as byte 0 and byte 1. These words are not stored in memory on the control page but on the supervision page.

The fifth word of each channel is the supervision state word, of which bit 7 is the supervision state address that shows from which address the supervision word is currently being transmitted, that is, whether word 1 or word 0 of the channel is being transmitted. Bit 6 is not used and bit 5 is a match bit used by hardware to keep track of bit-by-bit comparison. This match bit is 1 while the receiver is receiving synchronizing zeros or the start of data 1 bit. This bit will go to zero (by action of controller 309) if any of the bits of the received supervision message do not match with the corresponding bits of the previously received word (called the comparison word). Bits 4-0 are supervision state bits giving the current state of the supervision message receiver. If the supervision state is 0111, then the receiver is receiving synchronizing zeros or the start-of-data bit. Otherwise the supervision state is 1xxxx when 0 < xxxx < F, which equals the number of the supervision message bits received thus far. Received supervision data is valid only when the supervision state is 10000. This means within 3 milliseconds from any match/mismatch interrupt.

The sixth word in each channel of the control page of the buffer RAM is the supervision command. Bit 7 of this word is a supervision command address bit and selects from which address (1 or 0 for the particular channel) the next supervision message will be transmitted. This becomes bit 7 of the preceding word (by action of controller 309) at the start of each new supervision message. Bits 6-3 of this word are not used. Bit 2 determines whether parity errors will result in interrupts in the particular channel or whether parity errors for that particular channel will be masked.

Bit 0 is the supervision command mode bit. If this bit is 1, an interrupt will be raised on a data match. If this bit is 0, a data mismatch will generate an interrupt. Bit 1 serves to enable or disable any interrupts generated as the result of bit 0 of the same word. If bit 1 is 1, interrupts are enabled.

The last word of each channel of the control page of the buffer RAM is a channel command word. Bits 4-0 are tone address bits that determine the tuype (speech or tones) of PCM data which will be sent to the trunks. Half of these addresses relate to various multi-frequency tones. Of the other half, two of them designate speech saples one is undefined and others indicate busy tone, dial tone, 2,600 Hz tone (actually two addresses for this) and so on. Bit 7 of the channel command word is used to select the network plane which will be used at the receiving end of the switched connection as the source of speech samples. This bit is changed in response to errors or in response to a certain accumulation of errors. This has nothing to do with the choice of network plane for the sending of a message in the time slot of the signalling channel or channels.

Bits 6 and 5 are used to control the path of the PCM data within the trunk module. If both of these bits are 0 the normal operational mode of the speech channel will be in effect. Speech from the selected plane or else tone samples are passed on to the network. If bit 6 is 1 and bit 5 is 0, the trunk number will be loaded into the received trunk message buffer instead of the normal trunk message. If the fifth bit is 1 and the sixth bit is 0, a digital loop around mode is in effect. Any pulse codes destined for the trunk are looped back towards the network, replacing the pulse codes from the trunks. When both of these bits are 1, the analog loop-around mode is put into force. Any pulse codes destined for the trunk is looped back towards the network after being decoded and recoded by the CODEC. Looping around does not affect signal channel messages nor does it affect the transmission of supervision words.

The control page of the buffer RAM involves some signalling channel control. Supervision of each plane requies 6 bytes in the control page. These have already been identified as bytes 2-6 in channel 1 and in channel 17 of the control page of the buffer RAM.

The sixth word in chanel 1 of the buffer RAM is the "out idle" register for plane 0 and the corresponding word in channel 17 is the out idle register for plane 1. The contents of this register ae sent continuously to the network link whenever the message controller is in an idle state. Thus, at different times, this register should be loaded with IDLE, WAI, MIS, or SEND, depending on the message state, WAI being the code for the reset condition. The fifth word of these two channels is the "out active" register of the particular network plane. The contents of this register are continuously sent to the network link whenever the network message controller is in an active state. At different times during message handling this register will contain the code for SEND, IDLE, PACK, NACK, depending on the message state. The fourth word of each of these two channels of the control page is the IN register. This register contains the current byte received from the network link which could be: IDLE, POIDL, MIS, SEND, PACK, or NACK, depending upon the message state.

The sixth word of channel 1 and of channel 17 of the control page of the buffer RAM is the message byte count. This word registers the current number of message bytes left to receive or transmit. It should contain zero if a message has been successfully received or transmitted.

The third word of these channels of the control page of the buffer RAM registers the message address, which is the address within the network message page to be described below from which the current network message byte will be read (transmission of message) or written (reception of message). This register is loaded with the address of the message header before transmission of the message is requested. Similarly, it is loaded with the message page address for an incoming message header before message reception is initiated. On successful reception or transmission of a message, this register will point to the location which is next in sequence after the last message byte. The absolute address pointed to by the message address register is a combination of the memory page address and the content of the message address word.

The second word of these channels of the control page of the buffer RAM is a register for the message state. Only the four least significant bits are used in this case (the others being undefined) to show the current state of the signal channel controller 310 of the trunk module (FIG. 12). The content of this register may be written at any time to force the controller into some desired state. An explanation of the 16 possible states, 8 for message reception and 8 for transmission, follows.

These states include some states that are not used in normal controller operation. The 16 states are designated 0-9 and A-F. States, 5, 6, 7 and 8 are the states not used under normal operation. They are identical to state 0 described below, except that a MIS received from the network link will only interrupt the processor and will not cause the controller to jump to state 4. The processor 312 of the trunk module can force the controller to one of these deaf-dumb states for test or maintenance purposes by writing into the state register.

The message receiving states of the controller 310 are state 0 (the normal idle state), in which the contents of the OUT IDLE register are sent during signalling time to the appropriate network plane, while the incoming link from the appropriate network plane is scanned for a MIS code; state 4 (the wait for message header state); state 3 (receive message byte count state); state 2 (receive message state) and state 1 (wait for PACK-/NACK).

While in state 0 the controller will issue an interrupt (this interrupt is a "Restart C" interrupt as explained below in connection with the processor) for every MIS received from the network link. The controller will remain in state 0 until the processor loads the OUT IDLE register with SEND, thereby initiating a message reception operation, at which time the controller jumps to state 4.

State 4 is an active state, so the OUT ACTIVE register needs to be loaded with SEND before the OUT IDLE register is so loaded, in order to implement the continuously repeated SEND code procedure already described. While the controller is in state 0, the IN register contains the byte currently received over the network link, so a state 0 interrupt must be accompanied by the presence of MIS in the IN register.

In state 4 the contents of the OUT ACTIVE register are sent to the appropriate network plane, while the controller scans the input link for the message header code. On seeing the header, the controller 310 jumps to state 3 without interrupting the processor 312. Also, the message header is written into the location pointed to by the message address register and the message address is then incremented. One of the general purpose timers is preferably used as a message header time out. These timers generate interrupts of the class known as Restart B. A Restart B interrupt will never occur during state 4 assuming proper message transfer.

In state 3 the contents of the OUT ACTIVE register are sent to the appropriate network plane, as in state 4. In state 3 the first byte received from the network link is assumed to be the message byte count, which is first loaded into the location pointed to by the message address register and then decremented and loaded into the message count register. Message addresses are also incremented during this state. The controller generates no interrupts while in state 3.

In state 2 the message bytes received over the network link are loaded into the network message page buffer RAM locations successively pointed to by the message address register. As these bytes are successively loaded, the message address register is incremented and the message count register is decremented. At the same time the contents of the OUT ACTIVE register are sent to the appropriate network plane. After decrementing the message count register, the controller remains in state 2 unless the message count register content is 0, in which case a Restart-C interrupt is generated and the controller jumps to state 1.

In state 1, again, the contents of the OUT ACTIVE register are sent to the outgoing network link. The controller will be in state 1 when the processor 312 services the interrupt generated in state 2. For the controller to exit from state 1, the processor must first load IDLE into the OUT IDLE register. Then, depending upon the validity of the checksum, the processor 312 writes PACK or NACK into the OUT ACTIVE register. On seeing one of these last two mentioned codes in the OUT ACTIVE register, the controller jumps back to state 0 without interrupt. This sequence will result in the transmission of a single PACK or NACK code as required by the currently preferred message transfer procedure already described. The controller 312 could with some additional logic, be designed to jump to state 0 after a delay of one or two frames in order to cause the code to be repeated once or twice. The IN register is loaded with the byte from the incoming link.

The transmitting states of the signal channel controller 310 are state F (a transitory idle state), state B (transmit message header), state C (transmit message count), state D (transmit message) and state E (wait for PACK-/NACK).

To initiate message transmission, after a message is in the outgoing portion of the network message page of the buffer RAM, the processor 312 must first load the OUT ACTIVE register with IDLE and then load the OUT IDLE with MIS. This last will cause the controller 310 to go into state A and implement a continuously repeated transmission of MIS. At the same time the controller 310 also loads the IN register with the byte currently received from the network link. On seeing MIS or POIDL arrive over the incoming network link, the controller 310 interrupts the processor 312, for setting a priority flag in the latter case, but stays in state A unless and until the processor puts it in state 9 described below, in response to the cross MIS. On seeing SEND arriving over the incoming network link, the controller 310 both interrupts the processor 312 and jumps to state B. The OUT IDLE register is reloaded with IDLE.

In state B the contents of the first word of the outgoing portion of the network message page of the memory, now pointed to by the message address register, are sent to the outgoing network link. As this is the first byte of the message, this location should contain the message header. The message address is then incremented by 1 and then the controller jumps to state C without generating an interrupt. The byte received over the incoming network link is loaded into the IN register.

In state C the contents of the memory location pointed to by the message address register are sent, again, to the outgoing network link. As this is the second byte of the message, it is assumed to be the message count and is therefore decremented and loaded into the message count register. Then the message address register is incremented. Also, the byte received over the incoming network link is loaded into the IN register. The controller 310 then jumps to state D, without generating any interrupt.

In state D the message bytes successively pointed to by the message address register are transmitted, the message address register then incremented and the message count register decremented. The byte received over the incoming network link is again loaded to the IN register. As soon as the message count register content is 0, the controller jumps to state E, but otherwise it continues in state D.

In state E the byte arriving from the incoming network link is loaded into the IN register and examined for whether it is PACK or NACK. If one of these codes is received, the controller 310 interrupts the processor 312 and jumps to state F. Otherwise the controller continues in state E. Finally, the OUT ACTIVE register contents are sent to the outgoing network link. It will be recalled that the OUT ACTIVE register was loaded with IDLE before the message transmission was requested.

In state F of the controller 310 the processor 312 services the interrupt generated at the end of state E and then puts the controller back into state O. The processor can also use state F for maintenance purposes, because in this state a MIS from the NM will not cause an interrupt to be generated.

State 9 is not a normal transmitting state but is a transmitting state utilized only when the module is in an overload condition as further explained below. This is the IWS state.

If in state A the IN register receives MIS while there is an overload condition, the processor loads the OUT ACTIVE register with IWS and puts the controller 310 into the state 9, in which the MIS from the NM is ignored. As soon as the NM replaces its MIS with SEND, the controller 310 jumps to state A.

The controller 310 observes both ports, since if an incoming message fails the NMC will have to reroute the message (it will send it back to a CMC, which will send it over a NMC of the other network plane to the other port of the addressed PM).

This completes the description of the control page of the buffer RAM of the trunk module memory. The other three 256 byte pages of the buffer RAM are the network message page, the supervision page and the trunk message page.

The network message page provides storage for one message received from a network link and also for one assembled message for transmission over an outgoing network link. With messages of 64 byte maximum length, half of this page is not used. Messages for transmission must be assembled in the network message page before transmission in initiated. Also, the contents of the message address register in the control page must point to the start of the message header, the first message byte, in the network message page before transmission is initiated.

The supervision page is organized on a per channel basis, since the supervision message capability is provided for each speech channel, i.e. for 30 channels of the network links. Eight bytes are provided per channel, and channel 0 and channel 16 of this page are not used. The first and second words of a channel of the supervision page of the buffer RAM are respectively byte 0 and byte 1 of the received supervision word. As here described, only a two-bit message, treated as a two-byte word, is provided for, the other 29 bits being all zero followed by a start-of-message 1. The fifth and sixth words are respectively byte 0 and byte 1 of transmit supervision word 0, and the seventh and eighth words are respectively byte 0 and byte 1 of transmit supervision word 1.

The third and fourth words of each channel of the supervision page respectively provide byte 0 and byte 1 of the comparison word, which has the same format as the received supervision word and except at the beginning of a call is the previously received supervision word. It is used as the basis for the supervision match-/mismatch interrupts.

The received supervision word is valid for 3 milliseconds after a supervision match/mismatch interrupt.

The supervision command interrupt bit of the supervision command word of the appropriate channel of the control page must be preset while the comparison word is being changed and for 2 milliseconds thereafter. This will prevent false match/mismatch interrupts from occuring.

As already mentioned in connection with the control page, the choice between the transmit supervision words, for transmitting one of these, is determined by the setting of the supervision state address bit of the supervision state word of the corresponding channel of the control page.

When a supervision word is to be provided, it must first be set up in the memory space provided for the supervision word that is not under selection for transmission, after which the supervision state address bit can be changed to select the new supervision word. This explains why two supervision words must be provided for transmission. New supervision words can be provided by message from the CPU.

The speech channel controller 309 is provided the supervision words received over each speech channel, as well as the preceding zeros and start-of-message 1, and writes the received words into the buffer RAM while also comparing them with the supervision compare word of the respective channels, and therefrom generating any appropriate match/mismatch interrupt, according to the bits in the corresponding channel of the control page that determine the mode of operation of the speech channel controller 309. The processor responds to the interrupt by reading the new supervision word from the buffer RAM, and processing the reported event in accordance with its program.

The trunk message page is organized on a per trunk basis with the first general purpose timer utilizing the space that would be allocated to trunk 0 if there were a trunk 0 and the second general purpose timer using the space that would be allocated to trunk 31 if there were a trunk 31. Eight bytes are available per trunk. In the case of the general purpose timers only two bytes are used and these are the bytes corresponding to the two bytes used for the individual trunk timers in the memory space allocated to the 30 trunks.

The first two words allocated to each trunk in the trunk page of the buffer RAM are the received trunk bytes 0 and 1. Byte 0 is received in the channel 0 time slot and byte 1 in the channel 16 slot of the frame allotted for access to the data circuits of the trunk. The third and fourth words are trunk timer words that are written by the processor 312 and decremented once every 5 milliseconds by the timer hardware. Only one of these tow words for one trunk is active at any one time and the choice is determined by the timer address control bit of the trunk command word of the corresponding channel of the control page of the buffer RAM. The general purpose timer words operate in the same way as the trunk timer words.

The fourth and fifth words allocated to each trunk in the trunk message page of the buffer RAM respectively are trunk compare bytes 0 and 1. Except at initialization, these are the bytes received during the 5 ms period preceding the reception of the received bytes stored as the first two words of the memory channel. These compare bytes are used as the basis for the match/mismatch interrupt comparisons. The compare bytes must be updated within 5 milliseconds of match/mismatch interrupts to insure correct compare data at the time of comparison. The newly received bytes are likewise valid for no more than 5 milliseconds.

The seventh and eighth words in the memory allocated to a trunk on the trunk message page are trunk transmit bytes 0 and 1, which are the command bytes sent to the trunk.

The above-described four "pages" of memory constitute the buffer RAM. These pages could also be called the "mapped" input/output memory of the processor 312. There is, however, some additional message buffering in the remainder of the random access memory, which is called the dynamic RAM. The dynamic RAM 344 includes a 512 byte block of memory that provides for storage of 4 messages, the messages originating in the trunk module being referred to for convenience as reports and those coming from the network and addressed to the trunk module being referred to for convenience as commands. These are simple first-in-first-out queues. Six additional bytes, three for the reports and three for the commands, are required to control the queuing function of these buffers. The three control bytes for each buffer are, respectively, a read pointer, a write pointer and a buffer status register. In the latter only bits 0 and 7 are used and bit 0 is set at 1 if the buffer is full, while bit 7 is set at 1 if the buffer is not empty.

The dynamic RAM provides most of the program memory (the ROM has only a minor part of it) and all the temporary memory necessary for the operation of the processor.

Interrupt Levels

The processor 312, as mentioned before, is preferably of the type 8080 available under the trademark "INTEL". This processor, as explained in the Intel MCS 85 user's manual, has four levels of interrupts and a reset connection or line that may also be regarded as an interrupt. An interrupt queue 315 is provided in the FIG. 12 module so that interrupts from several sources can be queued for attention in succession according to their nature. As will now be explained, the various inputs shown in FIG. 12 to the interrupt queue 315 operate at different levels of priority.

A reset operation has the highest priority and interrupts operation on any other level. The "sanity" timer 350 triggers such an operation if it should time out. The next higher level of interrupt is the so-called trap level. Reset and trap interrupts are usually generated as a result of system faults (usually hardware faults) and the resulting levels of operation are not normal operating levels. For this reason, reset and trap interrupts are "non-maskable".

Interrupts of lower priority than a trap interrupt are called "restart" interrupts and designated, for convenience, in descending order of priority as RST-C, RST-B and RST-A respectively. The RST-A interrupt is used only for utility input/output handling during initial testing of a trunk module and the corresponding level of operation is not a normal operating level.

The level of operation of lowest priority of the processor, which includes maintenance routines of various types, for instance, and other deferrable operations, is referred to as the base level. The three normal operating levels (the concept of operating levels is particularly useful in identifying stored instructions, firmware or software, in various sequences) are the base level, the RST-B level and the RST-C level. However, the operations at these levels are organized to have provision for generating trap interrupts and reset interrupts under certain conditions that may be encountered, and this may be said to be mainly for "maintaining the sanity" of the operations of the various parts of the module.

A trap interrupt would be generated by a parity error in the dynamic RAM or in the buffer RAM if parity checking of RAM outputs is provided. Such provision is preferably omitted as not warranted by the cost.

It is also convenient to provide for generating a trap interrupt by way of a test card for the module, for maintainence or for software development purposes. Such an interrupt stops everything else but does not destroy the RAM contents as a reset does.

RST-C interrupts are those generated by the signal channel controller 310. The source of the interrupt can be ascertained by the processor by examining the message state byte of the control bytes relating to the particular port (network plane) in use. As mentioned above, these are to be found in channels 1 and 17 of the control page of the buffer RAM.

RST-B interrupts are raised by either the speech channel controller 309 or the trunk controller 313. The interrupt queue 315 stores source address bits for distinguishing the different interrupts. Each byte in this queue indentifies the nature of the interrupt in the three most significant bits of an interrupt register byte and, in the five remaining bits, identifies the trunk or channel number involved. The trunk number is given in the case of a trunk parity error, trunk timer or trunk match/mismatch interrupt. A general purpose timer interrupt is identified in the same way as a trunk timer interrupt with its quasitrunk number being given. The channel number is provided in the interrupt register byte when the interrupt is raised by a network parity error. The channel number raised by 1 is given in the interrupt register byte when the interrupt is raised by a supervision message match/mismatch.

Now that the memory organization of the trunk module has been explained and also the various interrupt levels, it may be useful to go over again the message reception and message transmission procedures.

Thus, when no messages are being transmitted or received, the processor 312 is executing system tasks (usually those programmed in base level) while the signal channel controller 310 is in an idle state looking for a MIS from the network ports (i.e. the links respectively connecting it to a network module in each "plane" of the network). When a MIS is recognized, the controller 310 issues a RST-C interrupt to the interrupt queue 315 of the processor 312.

When this interrupt is recognized the processor will consult the buffer RAM portion of the memory and will thereby determine which port caused the interrupt. The controller 310 is then caused to provide SEND continuously (i.e. in each successive frame) as an output over the network link to the appropriate NM. At the same time one of the general purpose timers serving as the I/O timer is loaded for a wait-for-message time-out. This completes the response to the MIS and the processor is liberated from the above-described response routine and picks up what it was doing before at the interrupted point.

The controller 310 then accepts the message from the NMC and loads the message into the input buffer, namely into the input half of the network page of the buffer RAM. Upon receiving the last byte of the message (i.e. when the message count reaches zero) the controller 310 issues another RST-C interrupt to the processor 312.

On recognizing this interrupt, the appropriate portions of the buffer RAM will be consulted to check the validity (check-sum comparison) of the received message, the result of which will cause the controller 310 to reply either PACK or NACK. At the same time the I/O timer will be disabled. If the validity check is positive, the message is then transferred to the command buffer portion of the dynamic RAM for later handling by the processor. This completes the response to the last mentioned interrupt and the processor 312 then goes back to the interrupted point and continues what it was doing before, while the controller, after providing a single PACK or NACK to the appropriate network link, returns to the idle state.

A transmission sequence such as normally takes place begins with the signal channel controller 310 in the normal idle state. The processor 312 must first copy the message from the report buffer of the dynamic RAM into the output buffer portion of the network page of the buffer RAM, after which the processor 312 puts the controller 310 in state A, in which it provides continuously (i.e. in every frame) a MIS code to the network link for the desired network plane. The I/O timer will be loaded for a wait-for-send timeout. This completes the response of the processor 312 to the detection by it of a report in the report buffer portion of the dynamic RAM ready to be sent to the NMC. With this response completed, the processor 312 then proceeds to execute other system tasks.

When a SEND is received from the NMC, the controller 310 proceeds to transmit the message to the NMC. At this time a RST-C interrupt is issued to the processor 312, upon recognizing which the processor will cooperate with the appropriate buffer RAM to load the I/O timer for a transmit message timeout and cause the MIS code to be replaced by an Idle code in the "out active" register. This completes the response to the last mentioned interrupt, so that the processor goes back to the interrupted point and continues what it was doing before.

When the controller 310 has sent out the last byte of the message, it will wait for an acknowledgement from the NMC. Upon receiving either a PACK or NACK from the NMC, the controller 310 then issues another RST-C interrupt to the processor 312. In response to this interrupt, the PACK or NACK must be read as soon as possible, since the replay is valid for only one frame (125 us). If the reply was PACK, the message will be removed from the report buffer of the dynamic RAM, making space for another report, the I/O timer will be disabled and the controller will go into the idle state. This completes the response of the processor 312 to the last mentioned interrupt, so it returns to the interrupted point and continues what it was doing.

Although the timing for message events is controlled by loading one of the timers, timing between each data byte is provided by the signal channel controller 310, which transmits or receives data to or from a NMC at a rate of 1 byte per frame.

If a timer, loaded for a wait period as above mentioned, times out before an anticipated start of message signal arrives, the port in question (i.e. the connection with the particular network link, which is to say with the particular network plane) is thereafter treated as closed and the closure action will be reported to the CPU by a message assembled and sent to the CPU by way of the alternate port.

When the anticipated event is reception of a SEND code or an acknowledgement code, a timeout will result in the port in question being closed and in a rerouting of the message (i.e. through the alternate port) with an indication set in the error byte of the message of the fact of the timeout.

The transmission of reports from the trunk module to the network message controller is modified when the module is in the overload state. The overload state is established by the setting of a high priority flag in an appropriate word of the memory, i.e., a bit at a particular word address in the dynamic RAM.

Some of the otherwise unused bits in the report buffer status byte, related to the portion of the dynamic RAM allocated to the report buffer, can be used to indicate the number of reports in the report buffer up to a threshold value and one of these bits can be used to indicate whether the number of reports at least equals the threshold value.

Them every time a report is put in the buffer, the processor checks whether the overload threshold has been reached and if so it sets the high priority flag. The trunk controller 313 is required to consult the priority flag in the memory before reporting a low priority event in a trunk. The presence of a new call on a trunk that was previously idle is, for example, a low priority event. If the priority flag is set for high priority, a low priority event is ignored by the trunk controller 313, but if the priority flag is set at normal priority, low priority as well as high priority events are responded to by the provision of a corresponding report in the report buffer 319. If desired, a supplementary report buffer of low priority could be provided in the dynamic RAM for storing one low priority report for a limited period of time, for transfer to the report buffer 319 in cases in whih the overload condition is of a very short duration.

As already mentioned, the overload condition identified by the setting of a high priority flag in the memory does not relate merely to the condition of the report buffer 319. The reception of POIDL from a network link (i.e. the presence of that code in the IN register of the corresponding channel of the control page of the buffer RAM) will likewise result in the setting of the priority flag to high priority. The base level executive instruction provided in memory includes a routine that precedes a report transmit activation involving the following steps: examining the message state of the port in use for signal reception to see if it is the state 0 and if it is in state 0, determining whether the IN register in the channel of the control page of the buffer RAM relating to the port contains POIDL, and if so setting the priority flag to high priority, whereas if the content of that register is IDLE and if at the same time the report buffer status byte shows the buffer empty, then the priority flag is set to normal priority. In all other cases the priority flag is left unchanged by the routine just described. As mentioned before, the priority flag may also be set as a result of the procedure of placing a report in the report buffer which causes the number of reports in that buffer to reach the threshold value (which, for example, could be two reports or three reports as it may be convenient to set).

Interrupt Masking

The input/output stack of bytes in the dynamic RAM provided for manipulation of data by the processor is subject to access by more than one operating level, so that to avoid contention problems, a lower level routine is required to mask out the higher level or levels temporarily when obtaining access to these data. The RST-C level is the highest normal operating level in order of priority and in operations at this level access is obtainable to any data at any time. Certain base level and RST-B level routines accordingly require interrupt masking or disabling, depending on the situation, as more fully explained below.

When a RST-C interrupt causes the processor to enter the RST-C level of operation, the interrupt system is disabled from further operation by the hardward (processor 312 and interrupt circuits 315). The RST-C interrupt executive instructions provided in the ROM portion of the memory will not re-enable interrupts until the operation is about to return to the interrupted level.

In operations on the RST-B level, for all valid input/output timer timeouts the interrupt system will be disabled until the timeout routine has completed handling the particular timeout. It may happen that although the interrupt is disabled just for the timeout handling, the timed-out event may have registered a RST-C interrupt before the timeout handler routine clears the timeout condition. The timeout routine should thus restore any pending RST-C interrupt that may have been disabled after clearing the timeout condition.

Base level routines, being the lowest level, are generally allowed to mask out other levels for no more than 10 instruction executions. The "set interrupt masks" instruction accordingly provided is accordingly used for interrupt masking and unmasking, instead of providing a disabling or blocking of interrupts. The masking of all interrupt levels on base level routines relating to messages take place in the following situations:

1. When testing and setting the input buffer status for copying of a message.
2. When testing and setting the contents of the command buffer read pointer, write pointer and status byte during the dequeuing of a message in the command buffer.
3. When testing and setting the contents of the report buffer read pointer, write pointer and status byte during the queuing of a report. 4. During various actions during transmissin of a report message, such as changing the message address, the message state and various other registers of the buffer RAM involved in message transmission and when changing certain other basic items of memory, such as a current port flag.

In some of these cases a little more than 10 instruction executions is involved, but interrupt masking is permitted since these routines are entered only if the signal channel controller is idle. In most cases unmasking is done by removing all interrupt masks, but there will be some common sub-routines used by all three operating levels and in these cases the protected section should be taken care of by requiring the reading of current interrupt mask status and saving the data thus read, before all interrupts are masked and then, after the protected sequence has been completed, restoring the original interrupt masks.

Terminal events (events noted on trunks in the case of the trunk module) as well as channel events operate to generate a RST-B interrupt, these including, for example, terminal parity errors, scan changes, supervision changes, and timeout of trunk timers.

The interrupt queue 315, which can for example contain 16 bytes, serves to queue terminal and channel event interrupts. As long as the queue 315 is not empty, the RST-B interrupt line remains activated. The interrupt executive instruction for the RST-B interrupts provided in memory provides the instructions for causing the processor to determine the cause of the interrupt from the queue output and to call into action the appropriate routine, also in the ROM portion of the memory, for handling the particular kind of interrupt. Only when the queue 315 is empty does the processor return to the interrupted point of what it was previously doing.

Whenever the processor 312 is not operating on one of the other levels in response to an interrupt, it operates on the base level instructions provided in memory. All non-immediate tasks are executed on the base level. Base level functions include the processing of background tasks, the processing of messages received and placed into the command buffer, the processing of terminal events flagged by operation at the RST-B level, the generation of reports, the detection of overload and the processing of maintenance tasks.

The processing of terminal events requires provision in the dynamic RAM of 30 terminal process blocks of memory, one for each terminal, a terminal event queue and a server process block.

Content of Messages

Before the description of the trunk module, as an example of a peripheral module, is left, in order to take up a description of other modules of the system, something should be said of the content of the messages.

All messages from the CPU, through the CMC and a NMC to a PM are in the form of commands called, for convenience, "primitives". Each message contains a number of primitives and related data. The primitives are essentially operational codes, abbreviated "opcodes", for specific operations that the processor of the PM is to perform. There are opcodes for arithmetic and logic functions, setting up signalling and supervision processes, writing reports, calling executives, etc. Thus, each message to a PM is a program used to control the PM.

By way of comparison, it is worth mentioning at this time that in a conventional electronic time-division switching system, the functions of the processor 312 and of the controllers 309 and 310 would be in the CPU rather in a PM, and a scanner in the CPU would reach all trunks every 5ms, and not only those of one module, to perform equivalent functions in the trunk circuits, and no message controller like the controller 310 would be incorporated in the system.

All actions in the processor of a PM result from the execution from a string of "primitives" either contained in a message or as a procedure (executive) previously defined via messages to the processor of the PM. The ultimate functions performed are basically the same as those previously performed in previously known electronic time division switching systems, the difference being the ordering of these functions through condensed messages sent through a NMCs of the network rather than communicated directly from the CPU to the PM by a high capacity data bus.

The system of the present invention has the ability of providing deferred execution of an executive procedure. This occurs when a primitive requests that an executive be executed after an event (e.g. scan change) has occurred. Thus the memory of the PM includes provision for the execution of primitive strings not specifically included in or called from messages. What events result in high priority messages, as distinguished from low priority messages, is defined by the executive process which generates a message, which process is itself sent from the CPU at the time of initialization of the PM, so that in effect the CPU determines what events are considered high priority.

Since all messages from a CPU to a PM are of a sequence of one or more primitives, the processing of these messages requires a command executive instruction, that may be referred to as a command executor. This executor must be able to process primitives which are either in messages, in predefined executives, or resident in the relatively permanent memory of the PM. The command executor instruction has two levels of operation: on the control level it decodes the primitives in order and performs checks such as opcode validity. On the primitive level, it performs the function of the individual primitives.

To understand the operation of the primitives it is helpful to understand the environment in which they operate. This environment may be thought of as a pseudo processor on which the primitive programs are executed. This pseudo processor operates on terminals and channels. It uses minor processes and background tasks to provide control and monitoring of the terminals and channels. The pseudo processor has a parameter stack for variable storage.

A terminal is an external connection to the switching system. It is normally a single voice line such as a trunk, subscriber line or one of the 24 terminals in a T1 carrier digroup. It may be directly connected to a channel on a non-blocking basis or it may require being attached to a channel for access to a network when there are more terminals than channels.

Each terminal has two terminal processes associated with it. These processes can be set up to perform signalling and supervision tasks. A process performs its function until a predefined event (e.g. end of digit) occurs. The process will then queue an executive for execution by the pseudo processor. The processor of the PM will detect the queued event and activate the pseudo processor to execute it.

Data is passed to minor processes in three ways: (1) as operands which follow the minor process opcode in the primitive string; (2) as parameters on the stack, or (3) as previously defined terminal variables.

The processor has a number of background processes available on a per terminal basis. The processes can be activated to interrupt the processor 312 when the process event occurs. Background tasks includes supervision message checking on a channel and also 5 ms, 40 ms, and 160 millisecond timing.

There are two types of primitives in use. Operation primitives, defined by their respective opcodes, perform logical arithmetic terminal processes and housekeeping functions. Stack primitives, through their respective opcodes, perform stack manipulation functions and include as part of their opcodes the number of parameters used by the primitive. Manipulation is performed to get the appropriate bytes into the desired process block, making use of a data "stack" in the well-known way. On account of the addressing in the 8080 type processor 312, it is easier to work with data transferred to standard locations within the RAM "page" on which the process program runs.

Reports for the report buffer of the dynamic RAM portion of the memory are compiled by a set of report primitives. These primitives will set up the report header, fill the report with the required data, and queue the report for output. No other reporting mechanism is provided.

Primitive processor procedures are referred to as execs, which are a form of executive instruction. They consist of primitive strings defined at initialization by a series of "define-exec" messages from the CPU. The pseudo processor has provision for up to eighty execs containing a total of 1100 bytes. In hardware, these instructions are stored in the dynamic RAM portion of the memory of the PM, as described for the case of the trunk module described with reference to FIG. 12.

The stored programming provided in the memory of a PM can conveniently include a message processing portion that is the same for all PMs, for implementing the command decoder for the primitives and the code for all primitives that are not dependent on the particular type of PM. These stored instructions will include provision for taking real time breaks during waiting loops, or when higher level base level tasks are pending.

The decoder process requires that code for all primitives which are particular to a PM be implemented in the program stored in the memory of the particular PM. Certain primitives requiring implementation must be implemented in each PM with the entry address being the primitive name. This requires that immediately preceding the opcode address, the program must contain the macro "PRAM n" where "n" is the number of parameters which are to be obtained from the parameter stack by the primitive. Typically some 40 odd primitives will require implementation.

The decoder will take a real time break, to allow the base level executive to process higher priority tasks, when the break flag, (which is identified by a particular address) is nonzero. This flag is set after a lower priority task has occupied the processor for some predetermined period of time measured by a timer started when the lower priority task was begun.

One of the primitives is identified as a STOP primitive, which when executed calls in a sub-routine to allow the PM program to do the necessary housekeeping to finish a server process. This normally includes items such as: removing messages from the message queue and clearing what may be referred to as the terminal "outbasket".

The sequences of operation of the controller 310 that define its constitution have been fully specified by the flow diagram of FIG. 3, by the description of its receiving and transmitting states and their inter-relations and by several descriptions of all the variations of message transfer sequences.

The sequences of operation of the controller 309 that define its constitution are, as is evident from the description already given, much simpler. It detects the supervision framing signals of each channel and converts the following 16 serial bits of supervision message into two 8-bit bytes, loading the latter into memory as well as reading from the memory previously received message bytes and comparing them with the new ones, generating an interrupt either on match or mismatch (usually the latter) as prescribed by a control bit likewise read from the memory, the memory in each case being the buffer RAM 343. It also sets the supervision status bit at the proper memory location. It also reads the control bit specifying which of the two supervision word memory addresses applies to transmission, and obtains and sends out the proper supervision message for each channel serially immediately after sending the necessary framing bit sequence. The function of the controller 309 regarding parity errors is even simpler: it simply issues an interrupt to the interrupt queue 315 that identifies the channel as well as the occurrence of a parity error.

The trunk controller 313, like the controller 309, compares the digital bytes received with corresponding bytes received earlier (in this case 5 ms earlier rather than 125 us earlier, however) and raises an interrupt according to a mode specified in memory, also setting a status bit in memory. It also sends trunk command bytes out onto the digital bus 328 at the proper time. These operations are quite straightforward, as is also the function of operating to tone sample store 340, as already described above. The driving of the trunk addressing circuit 339 is more complicated, being designed to make possible a single addressing connection to each trunk for connecting the trunk both with the PAM bus 327 and the digital bus 328 at the necessary times, while also taking account of the possible presence of both digital and analog trunks among the trunks 1 to 30.

What is done is that the addresser 339 is arranged to connect each trunk to both busses 327 and 328 during the assigned speech channel slot and also in channel slots 0 and 16 of one particular frame out of every 40. This produces easily disregarded noise on the PAM bus 327 in signal channels and, unless the trunk is a digital trunk, negligible reaction on the digital bus 328 in speech channel. The digital bus 328, furthermore, carries not only 8-bit data or PCM bytes, but two additional bits, both ways. Going towards the controller 313, one of these bits significantly whether the trunk is digital or analog, and if an analog trunk is indicated, the output of the codec 307 provides the PCM code, whereas if a digital trunk is indicated a connection 355 is enabled between the 8 data lines of the bus 328 and the PCM bus 342.

In channels 0 and 16 the bus 327 goes to the controller 313 for loading the data in memory, rather than to the connection 355, the controller 313 having operated a switch 357 to that effect.

The controller 313 also adds a bit to the PCM code coming in from the bus 342 during the portion of the channel slot alloted to its transfer showing that the data is PCM and not trunk control (command), because framing information is not distributed to the trunk circuits. When a command byte is dispatched to an addressed trunk the controller 313 adds 2 bits, one to signify a command and another to specify whether the data is the channel 0 byte or the channel 16 byte.

When a control (report) byte is put on the bus 327 by an addressed trunk circuit, one bit (the "first": the one that designates analog or digital trunk in the case of a speech channel) is unused and the other one (unused in speech channels) is used as a parity check bit in the usual way to detect hardware faults.

This system provides ready usability of a module for any mix of analog and digital trunks and at the same time space and cost savings of one-wire addressing.

Network Message Controller (NMC)

Although, as already mentioned, the NMCs pass messages on that travel in either direction between CMCs and PMs, an important function of the NMCs is to handle the orders of the central processing unit for setting up and taking down the connections in the time switches of the NM in which the particular controller is located. The handling of "through" messages is therefore preferably done in a fashion as compatible as possible with the handling of messages for assigning junctor channels and so-called interswitch links at or in the particular network module in order to effect the necessary connection of telephone traffic.

Figure 13:
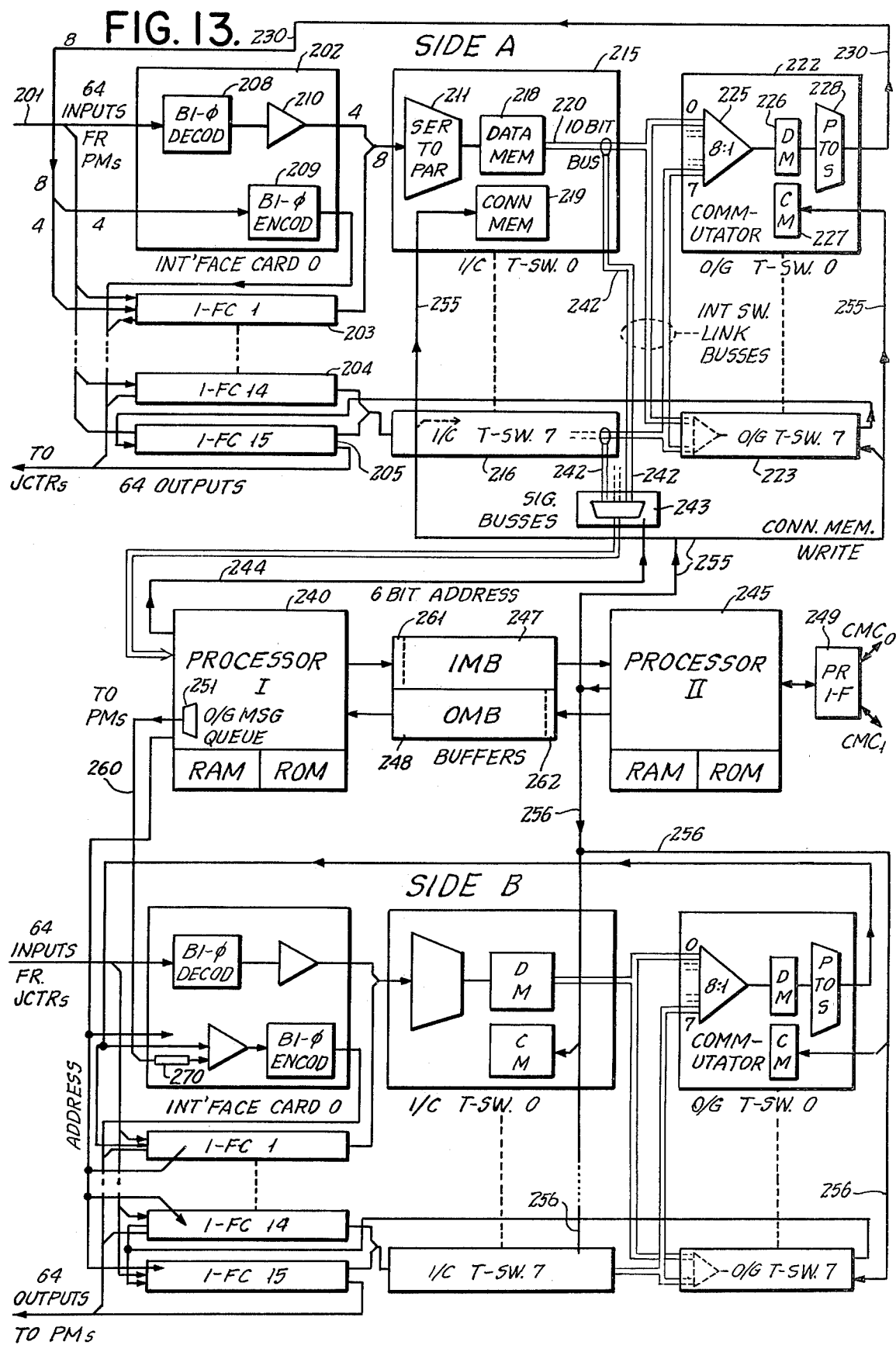
FIG. 13 is a block diagram of a preferred kind of network module.

FIG. 13 is a simplified block diagram of a network module, emphasizing the NMC and its connections.

As more fully explained in the copending application, Ser. No. 795,695 of Gagnier, Bourne and Terry, already mentioned above, the four stages of switching contained in a NM are organized in two stages constituting what is known as "Side A" of the module for connecting any of the 30 channels of each of the 64 inputs from peripheral modules to any of the 31 channels of any of the 64 junctors and two other stages, organized in "Side B" to connect any of the 31 channels of 64 junctors, which are in general not the same 64 junctors as are connected to side A although some junctors are common to enable channels from side A to be connected back through side B, to any of the 30 channels of each of 64 outputs to PMs. The operation also involves assigning complementary time slots through the switch stages for the two directions of transmission, so that the delays involved in time switching will in the aggregate be the same for each direction of communication. The assignments for effecting these switching operations are received from a CPU, through a CMC and then through control signal links. In FIG. 13 the time switch organization of side A is shown in the upper part of the diagram, the processor and buffers of the NMC are shown in the middle, and at the bottom are shown the time switches of side B of the NM.

As shown in FIG. 13 the 64 inputs from PMS, each of these inputs being a one-way network link providing 30 time division channels for telephone traffic and two time division channels for internal messages, are collectively shown coming in at 201 and being distributed to 16 interface cards numbered 0 to 15 of which only numbers 0, 1, 14 and 15 are shown in FIG. 13, respectively at 202, 203, 204 and 205. Thus of the 64 inputs (each with 32 channels) four are taken care of on each of the interface cards of side A of the network module. The circuits provided on each interface card are illustrated in the case of the interface card 202: namely, a bi-phase decoder 208, phase alignment buffer 210, and a bi-phase encoder 209. It is to be understood that such units are provided for each of the four input "ports" handled by the particular interface card. The time switches of the two stages of side A are organized, in each stage, on eight time-switch cards or units, designated as incoming time-switches 0 to 7 inclusive for the first stage and as outgoing time-switches 0 to 7 inclusive, for the second stage.

FIG. 13 shows a block diagram of the incoming timeswitch 0, designated by the reference numeral 215. FIG. 13 also shows a more simplified symbolic form of the incoming time-switch 7, designated with the reference numeral 216, and it is to be understood, of course, that the intervening time-switches are also there and similarly connected. The incoming time-switch block diagram 215 shows that the eight inputs provided by two interface cards, namely interface card 0 and interface card 1 in the case of incoming time-switch 0, are first supplied to a circuit 211 which converts the serial data to ten-bit parallel format, arraying each ten-bit word, of the kind already mentioned above, for parallel transfer out of the circuit 211, which is consequently referred to as the "incoming formatter" circuit. The output of the formatter 211 writes successive ten-bit words in locations ("addresses") of a data memory 218 respectively assigned permanently to the various channels of the eight ports served by the particular time-switch. The time-switch 215 is also provided with a connection memory 219 containing a one-word statement of the disposition of each word of the data memory 218 as prescribed on the central processing unit, designating the particular data word which is to be read-out in each time slot into the ten-bit output bit 220.

FIG. 13 also shows the outgoing time-switch 0 in the block diagram 222 and also, in more simplified form, the outgoing time-switch 7 in the empty block 223, it being understood that six other time-switches are also present, numbered 1 through 6. As shown in circuit block 222, each outgoing time-switch circuit has an 8:1 commutator-type multiplexer, designated 225 in the case of the circuit 222. The commutator 225 leads into the data memory 226 which is associated with a connection memory 227 which controls the data memory 226 in the same way that the data memory 218 is associated with the connection memory 219. Each location of the data memory 226 is permanently assigned to the particular channel time of each interswitch link bus.

The ten-bit busses such as the bus 220, connecting the incoming time-switches with the outgoing time-switches are known as "interswitch link busses". It is possible by means of them, within one cycle of channel time slots, to read a data memory word for each channel of eight ports and make them accessible to all eight of the outgoing time-switches.

The connection memory 227 determines in what sequence the words in the data memory are read out into 8 junctors. In each channel slot a different word is read out into each of 8 junctors, but only as transformed first into serial data by the parallel-to-series outgoing formatter 228 and then into bi-phase signals by either the encoder 209 of interface card 202 or the corresponding encoder (not shown) of interface card 204. Each interface card feeds bi-phase signals to 4 junctors.

Side B of the network module is similarly organized, but the inputs to the bi-phase decoders of the interface cards are in this case the time-division channels of 64 junctors distributed so that four of the 64 junctors go to each interface card, while the outputs of the bi-phase encoders of the 16 interface cards furnish the various time-division channels of 64 output to as many network links for transmission to peripheral modules.

As already mentioned, the 64 inputs 201 of side A of the network module, coming from as many network links connected to various PMs, contain at least one signalling or message channel for each network link. The ten-bit words coming over the signalling channel of each link undergo initial handling similar to the handling of ten-bit telephone traffic "words". In other words, the ten-bit words coming over the signalling channels are written into a location in the data memory of an incoming time-switch of side A, which data memory locations is permanently allocated to the particular signalling channel of the particular network link. These message words, however, are not read into outgoing time-switch circuits, but are extracted from the ten-bit output busses of the respective incoming time-switches for handling by the processor 240 of the NMC, this being done through the signalling busses 242 leading to a multiplexer 243. Since the junctors do not carry signalling channels, no similar operation of extracting message signals is done in side B of the network module. The processor 240 has an addressing PM connection 244 to the data memories to enable it to scan the signalling channel words to get them sequentially into the multiplexer 243. There is similar addressing 260 by the processor 240 for the bi-phase encoders of the side B interfaces for directing messages out of the outgoing message queue 251 of the processor 240.

The NMC of the NM consists essentially of two processors, referred to as processor I and processor II, the first of these being the circuit 240 already mentioned and the second being the circuit 245 that provides the portion of the NMC that communicates with the CMCs. Each of these processors is provided with an appropriate amount of random access memory (RAM) and read-only memory (ROM). The two processors 240 and 245 work together through an additional random access memory that functions as a buffer unit that includes an inward message buffer 247 and an outward message buffer 248. Each processor can read both buffers 247 and 248 but can only write in one of them. The processor 245 can write only in the outward message buffer 248 and the processor 240 only in the inward message buffer 247. The processor 245 operates through a processor interface circuit 249 which enables it to communicate with either one of the two CMCs of the switching system.

It is thus seen that the processor 240, in addition to receiving messages from side A of the network module and putting them in the inward message buffer for transmission to one of the central message controllers, also received messages from the outward message buffer 248 and transmits them, through side B of the network module, to the various PMs. In the message transfer sequence of control codes, the MIS codes from a peripheral module having a message to send are received through side A of the network module and if there is space in the inward message buffer 247, the processor 240 responds by transmitting a SEND code through an interface card of side B of the network module to the appropriate peripheral module.

Each of the buffers 247 and 248 contains a "status word", the status word 261 being provided in the buffer 247 and the status word 262 being provided in the buffer 248. When one of these two processors writes a message into the buffer into which it can write, it sets a corresponding flag into the status word of the buffer to indicate that a new message has been put in the buffer, as well as the address of the message (i.e. the address would indicate which of the subdivisions, typically four subdivisions of 64 bytes each, for four separate messages is involved). The other processor scans the status word of the buffer into which it does not write and responds to a flag that has been set indicating a new message by reading the message and writing it into its outgoing message queue. When it has completed that operation it replaces the flag previously set by a different flag which indicates that the message space of the message that has just been read is now available for writing in another message.

Each of these processors performs all of the message transmission and reception sequences that are performed in the case of the trunk module by the signal channel controller 310 of FIG. 12 backed up by the processor 312 of the trunk module. In other words a message is not put into the buffer 247 or into the buffer 248 unless the calculated checksum agrees with the transmitted checksum and a positive acknowledgement has been sent back to the source of the message. The outgoing message queues of the processors are, of course, portions of the random access memories with which the processors are provided. In the case of the processor 240, the queuing is somewhat more complicated than in the case of the processor 245, because the messages are addressed to various PMs, so that the appropriate biphase encoder of an interface card must be addressed for enabling before each message is sent out in the signal channel of the appropriate network link. This is facilitated by provision of a 1 byte register 270 ahead of the message input to the biphase encoders of side B of the NM.

Some of the messages received by the processor 245 from a CMC involve the assignment of interswitch link busses and junctor channels to particular telephone calls. The processor 245 recognizes these messages by the peripheral processor number in the header, which designates this particular NMC in such case, and then utilizes the message contents to write the corresponding words in the connection memory of the appropriate time-switch, as indicated by the lines 255 for side A of the NM and by the lines 256 for side B of the NM.

FIG. 13 omits showing, in order to simplify the illustration, the provisions preferably made for inserting test codes (usually predetermined and easily recognized sequences of simulated coded speech samples), and picking them up at a later stage, so as to check the functioning of time-switching connections.

Figure 14:
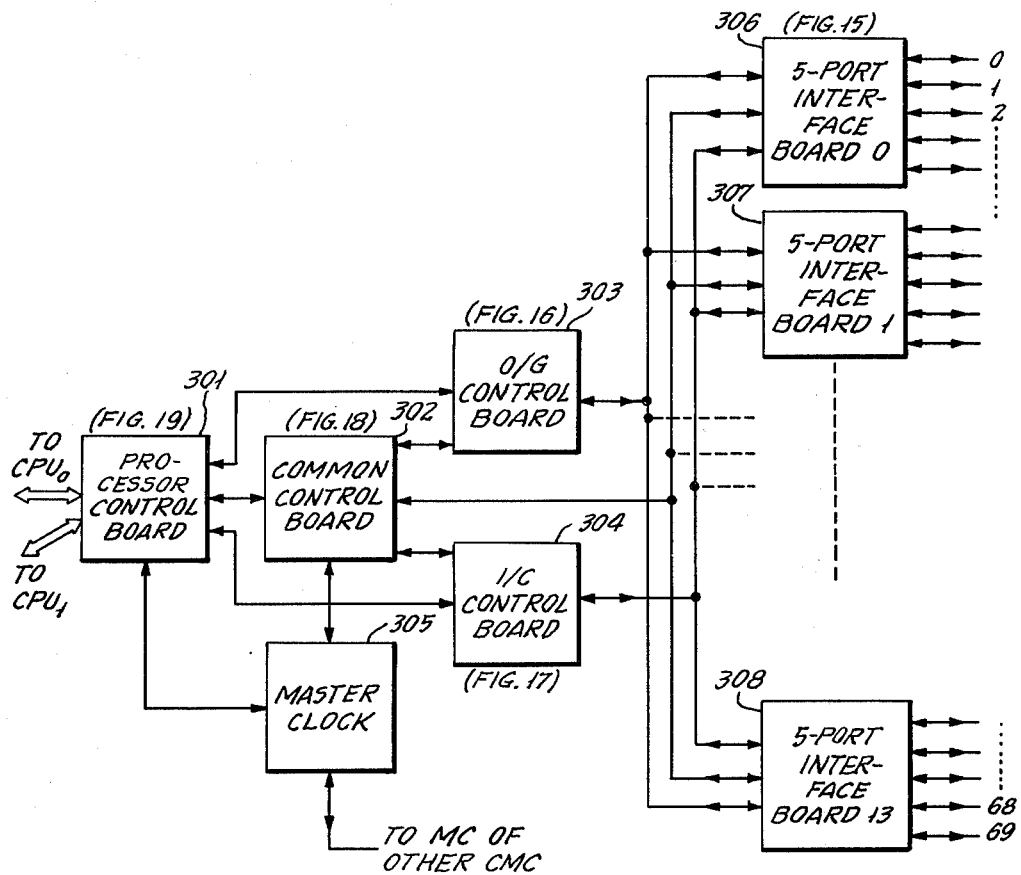
FIG. 14 is a block diagram of a central message controller for the exchange of FIG. 1.

FIG. 14 is an overall block diagram of one of the two CMCs of a switching system embodying the invention. The CMC puts into operation the message transfer sequence, between itself and NMCs or input/output devices, for messages going to or from a CPU. The two CMCs of a typical system are much more closely and conventionally connected to the CPU, but neither of them is tied to a particular CPU. Messages are passed between a CPU and a CMC in 16-bit (2 byte) parallel form at high speed (a speed comparable to that at which information is passed from a data store to a central processor). Message flow between CPU and CMC is interrupt-driven. That contrasts with the passing of messages between a CMC and a NMC or an input/output device at medium speed in bit-serial form over control signal links and the message flow is driven by the message transfer sequences using the 1-byte control codes already discussed.

As shown in FIG. 14, a CMC consists of a processor interface 301, usually with its circuits arranged on a single board, a common control board 302, an outgoing control board 303, an incoming control board 304, a master clock board 305 and fourteen 5-port interface boards of which three, respectively designated 306, 307 and 308 are shown in FIG. 14. With these 14 interface boards a CMC can handle communications with 70 ports, namely 32 NMCs in each of two planes and six interface controllers of as many input/output devices that appear to the central message controller very much like network message controllers except that they can handle longer messages.

Figure 15:
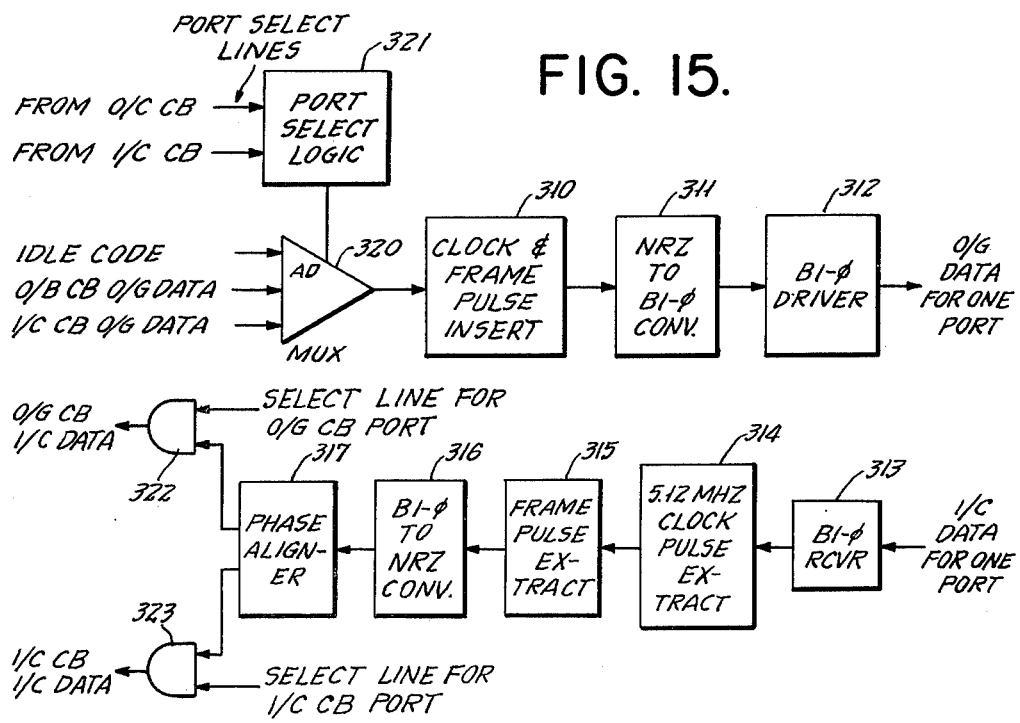
FIG. 15 is a block diagram of the circuits of an interface [circuit] board of the CMC of FIG. 14 for one of the five ports served by an interface board.

FIG. 15 is a block diagram of the five-port interface board of which fourteen are used in each CMC. The frame pulse insertion circuit 310, TTL to bi-phase converter 311 and the bi-phase driver 312 among the outgoing circuits and the bi-phase receiver 313, clock pulse extraction circuit 314, frame pulse extractor 315, bi-phase to NRZ converter 316 and phase alignment circuit 317 among the incoming data circuits will be recognized as having been explained already with reference to FIG. 10. The remainder of the circuits of FIG. 15 are the circuits necessary for enabling communication over the outgoing and incoming links of a particular port. Since the CMCs for reasons of circuit efficiency, are capable of full duplex operation, while the NMCs and input/output device controllers operate in the half duplex mode, as already mentioned, not only is it possible for the CMC to transmit by one port and receive by another, but simultaneous selection of the same port for transmission and reception of messages is prevented by logic circuits, because the controller at the other end of the control signal link is unable to receive and transmit simultaneously.

Figure 16:
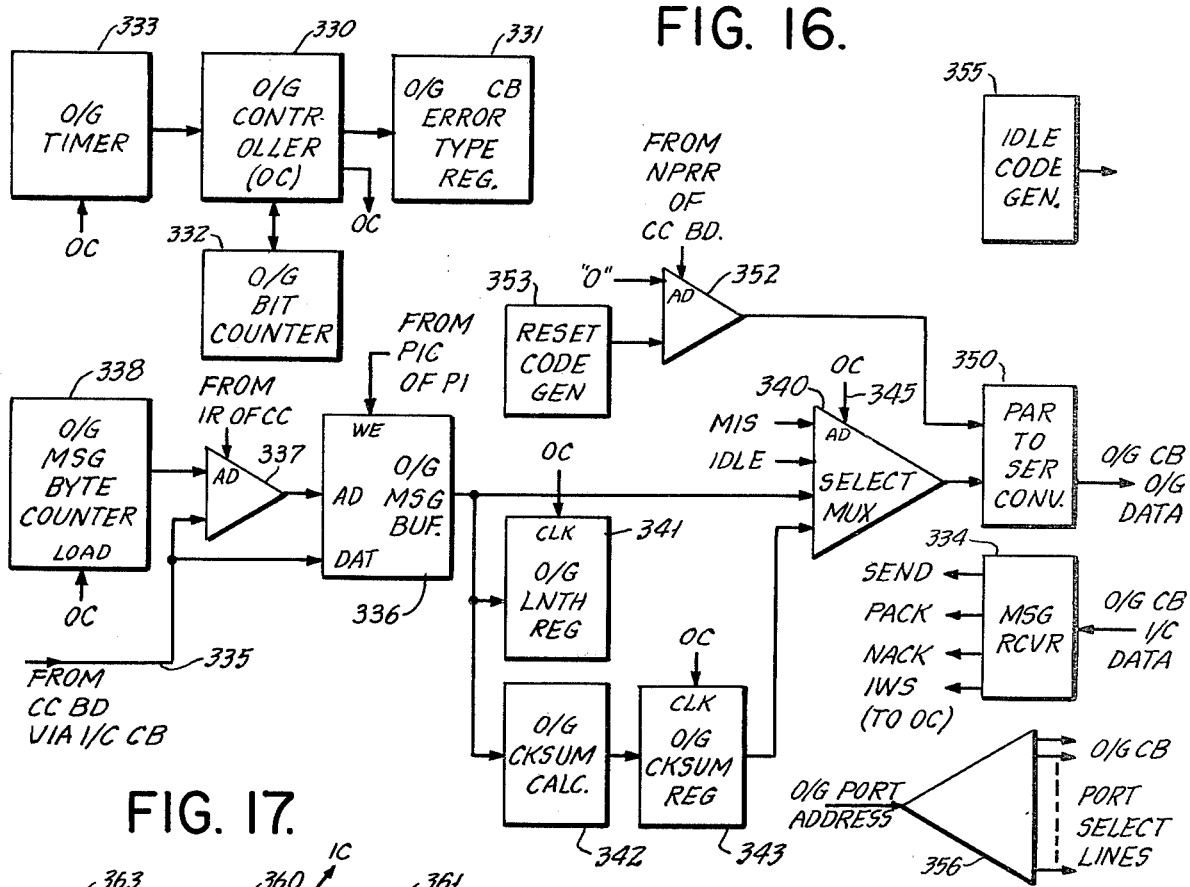
FIG. 16 is a block diagram of the outgoing control circuit board of the CMC of FIG. 14.
Figure 17:
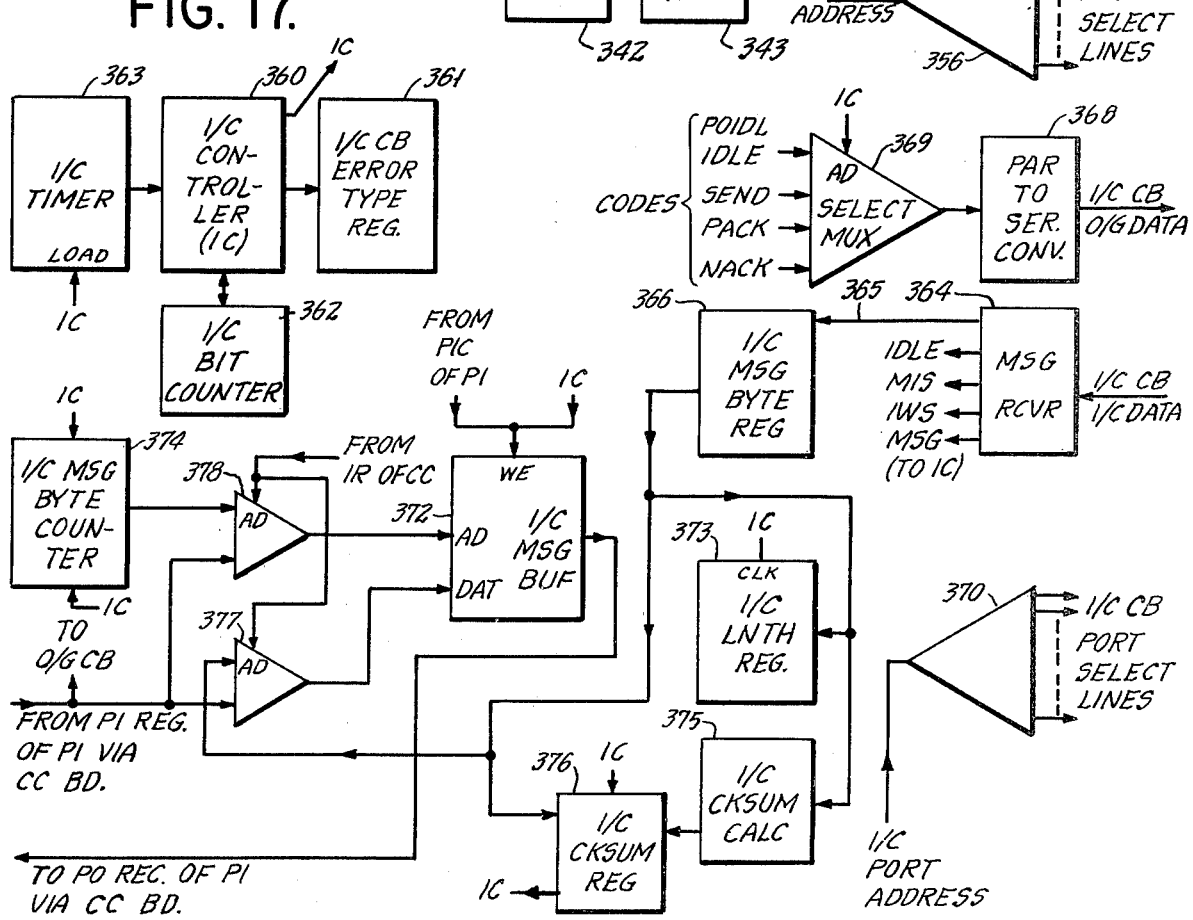
FIG. 17 is a block diagram of the incoming control circuit board of the CMC of FIG. 14.

As shown in FIG. 14 a CMC has an outgoing control board 303 which, as shown in FIG. 16 contains an outgoing controller and associated circuits, and also an incoming control board 304 which, as shown in FIG. 17 contains an incoming controller and associated circuits. The outgoing control board provides, to a selected port, outgoing messages as well as message control codes and must receive from that port message control codes in between its own transmissions. Likewise, the incoming control board 304 receives data consisting of a message and message control codes from a port and must send back message control codes to that port on a half duplex basis. Consequently, in FIG. 15 the circuits 310, 311 and 312 sending outgoing data for the particular port served by the circuits must be able to send outgoing data from the outgoing control board at certain times and to send at other times outgoing data from the incoming control board, while at all other times the idle code is sent out through that port. The choice is made in the multiplexer 320 to which the port select logic circuit 321 provides an address signal selecting the proper input to the multiplexer for transmission. A line from the outgoing control board and one from the incoming control board is provided to the port select logic circuit of each port. This line is also connected to the AND-gates 322 and 323 which both receive the output of the phase aligner circuit 317 that provides the incoming data from the port. Thus the outgoing control board can select a port to which a message needs to be sent and at the same time the incoming control board can select another port which is sending out MIS codes showing that it has a message to transmit, the incoming control board being inhibited by the port contention control circuits to be discussed later from selecting the same port selected by the outgoing control board. In the process of sending its message, the outgoing control board can receive control codes as well as send them through the port it has selected and likewise the incoming control board, in the process of receiving its message, can send out message control codes to the port it has selected in order to fulfill the message transfer sequences.

FIG. 16 is a block diagram of the outgoing control board of a CMC. The heart of this collection of circuits is the outgoing controller 330. It has a number of outputs going to various circuits on the outgoing control board at the respective inputs marked OC, in addition to the output directly shown in FIG. 16 to the error-type register 331 of the outgoing control board. It receives inputs not only from the outgoing timer 333 (to which it furnishes a starting signal at the "load" input thereof), but also from the outputs of the message receiver 334 identifying control codes of the message transfer sequence received from the port to which outgoing control board is engaged in transferring a message. The outgoing controller is also associated with an outgoing bit counter 332 which it needs for various of its operations.

The outgoing times the period of waiting for a SEND code (e.g. 80 ms.), that of waiting for PACK or NACK (e.g. 40 μs.) and that for repetitively sending a reset code (120 μs.).

The messages to be sent reach the outgoing controller through the 16-bit parallel bus 335 coming from the common control board 302 (FIG. 14) (and actually routed for convenience through the incoming control board 304 as shown in FIG. 17). The connection 335 feeds the message data to the outgoing message buffer 336, which can hold a maximum length message, and also feeds data to a multiplexer 337 that receives another input from the outgoing message byte counter 338 and a control signal from the interrupt register of the common control board 302 (FIGS. 14 and 18), the data selected by the multiplexer 337 and provided as an output to the address input of the outgoing message buffer 336. The outgoing message buffer also has an enable input connected to the processor interface controller of the processor interface circuit 301 (FIGS. 14 and 19). The outgoing message buffer, when unloaded byte-by-byte under control of the outgoing controller, transmits its contents not only to the selecting multiplex circuit 340, but also (length byte only) to the outgoing length register 341 and the outgoing checksum calculator 342. The outgoing length register stores the message length given in the length byte of the message (under control of the outgoing controller), so that the checksum byte will be added at the end from the checksum register 343 as an additional byte. The outgoing controller has a control input 345 to the multiplexer 340 for passing the checksum byte from the checksum register through the multiplexer after the last byte of the message, and also for passing repeated MIS or IDLE codes through the multiplexer for transmission at appropriate times. The output of the multiplexer 340 is a multibit parallel output, which signifies that the message data from the lead 335 through the buffer 336 and the multiplexer 340 proceed byte-by-byte with all 8 bits of each byte transmitted in parallel until the data reaches the parallel-to-serial converter circuit 350, which provides the outgoing control board's outgoing data to the bus, from which it is selected for transmission through a particular port by port select logic of port interface board.

The parallel-to-serial converter 350 also makes up a 10-bit word for each 8-bit byte, normally adding a "0" for the ninth bit (bit 1) and the tenth (bit 0) in each word. In the case of transmission to input/output devices, as distinguished from NMs, the ninth bit is utilized for reset code transmission. The tenth bit cell, of course, is for subsequent frame pulse insertion in all cases. The parallel-to-serial converter 350 has its "ninth bit" connected so that it can be used for transmitting a special reset code for I/O devices (ninth bits of successive words transmitted in a repeated 01011010 pattern) to reset an input-output device. A reset operation is conducted, as described further below, through an I/O device reset register in the common control board, which provides an input 351 to the multiplexer 352 which has one input that is simply a zero condition, which is transmitted as the ninth bit in each word when an I/O device reset code is not to be sent through the parallel-to-serial converter 350, and another input connected to the I/O device reset code generator 353 which can be switched through at the command of the I/O device reset register, so that it will be transmitted to the intended I/O device at once and achieve resetting of the latter. As already mentioned, resetting of NMs and PMs is done by regular network messages sent by a CPU through a CMC.

The MIS, IDLE and POIDL inputs to the multiplexer 340 come from appropriate code sources (parallel arrays of "0" and "1" voltages). A generator circuit 355 is necesary to supply the IDLE code in serial form to the outgoing multiplexers of the port interface boards. Repeated codes such as IDLE, POIDL and MIS are repeated in successive words without gaps.

The outgoing control board port select lines are supplied with signals by a logic circuit 356 in response to the provision of an outgoig port address from the common control board 302, as described below with reference to FIG. 18. Some connections which would be readily understood to be necessary have been omitted in FIG. 16 to simplify the illustration, for example the output connection of the length register 341. It will further be understood that the message byte counter receives a signal from the outgoing controller causing it to start counting on a new message as a count input to advance it with each byte furnished to the circuits 336 and 337. The inputs to the outgoing controller are not shown in FIG. 16 and will be better understood after consideration of the block diagrams of the other circuits of the central message controller. FIG. 17 is a block diagram of the circuits of the incoming control board of a CMC. In a manner analogous to the outgoing control board just described, the heart of these circuits constituted by the incoming controller 360 which has particularly associated with it the error type register 361 of the incoming control board, the incoming bit counter 362 and the incoming timer 363. The incoming timer 363 provides timing of a 40 millisecond period for: (1) waiting for MIS, IWS, or IDLE codes during scan of a port; (2) waiting for a message to begin after transmission of a SEND code, and (3) waiting for MIS or IWS after transmission of NACK.

The incoming controller of course furnishes outputs to various other circuits, and receives inputs not only from circuits on the incoming control board but also some from the central control board to be described below with reference to FIG. 19. The message receiver 364, to which the incoming control board incoming data is supplied from a port interface board, not only has outputs connected to the incoming controller 360 for indicating when a message control code is received, but also has an output 365 for messages received that goes to the incoming message byte register 366 and through the latter to other circuits described below. The parallel to serial converter 368 which provides the outgoing data of the incoming control board has only control codes as an input and these are selected as directed by the incoming controller 360 by the selecting multiplexer 369. Since these are 1 byte codes transmitted in parallel, they are provided by a simple array of "0" and "1" voltages.

Figure 18:
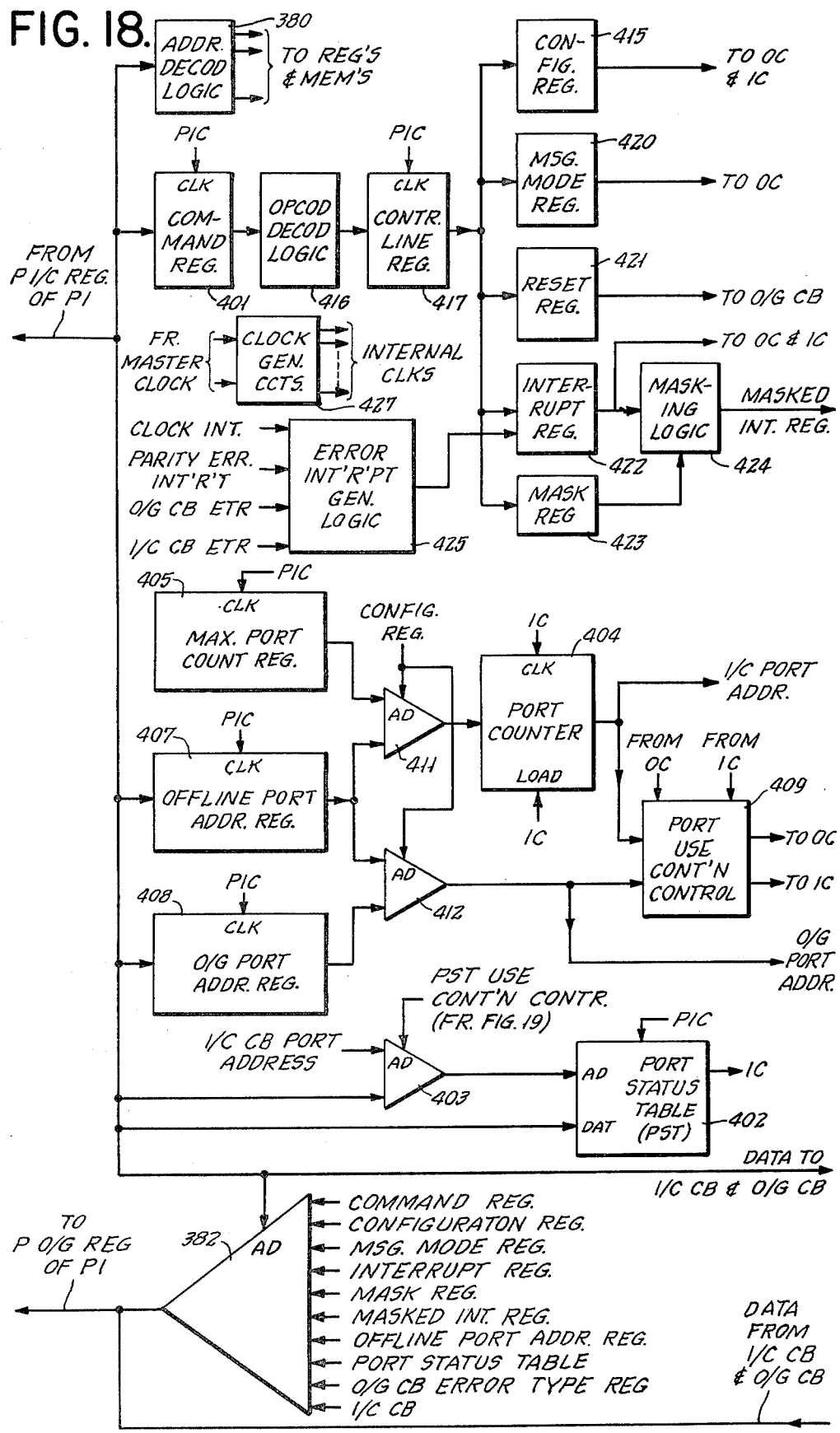
FIG. 18 is a block diagram of the common control circuit board of the CMC of FIG. 14.
Figure 19:
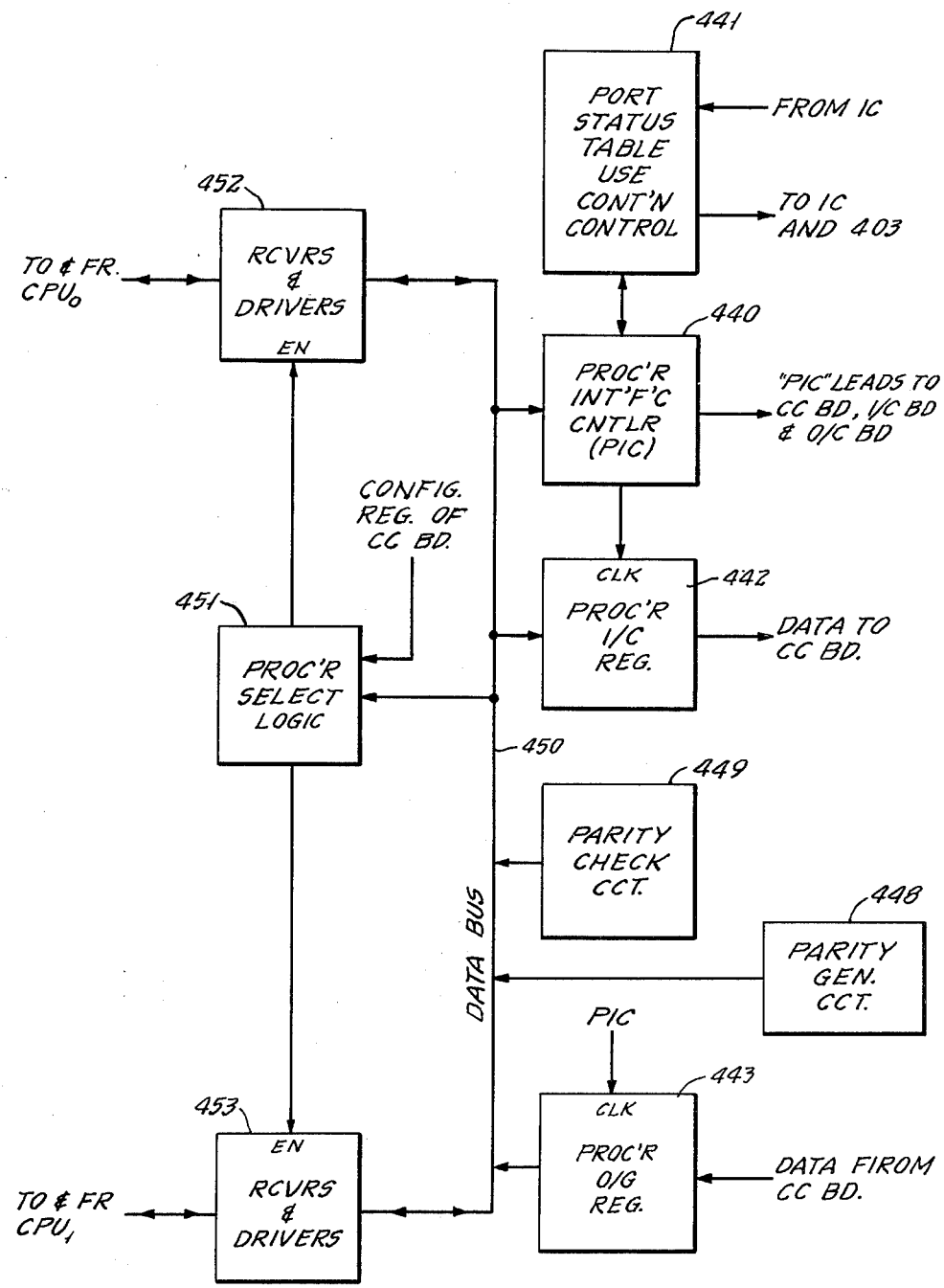
FIG. 19 is a block diagram of the processor interface board of the CMC of FIG. 14.

As in the case of the corresponding circuit of the outgoing control board, the incoming control board port select lines are selectively energized by a logic circuit 370 in response to an incoming port address supplied from the common control board 302 (FIGS. 14 and 18).

Received messages proceed byte-by-byte in 8-bit parallel form from the incoming message byte register 366 towards the incoming message buffer 372 (where bytes are paired into two-byte words) while the length byte is stored in the incoming length register 373 at the command of the incoming controller in response to the message byte counter 374, in order to direct when the incoming checksum calculator 375 will be stopped to compare the incoming checksum register 376 with the next message byte that gives the received checksum.

The incoming message buffer 372 feeds the processor outgoing register 442 of the processor interface board (FIG. 19) which is the register from which messages are sent in 16 bit parallel words at high speed under interrupt control to a central processing unit. The corresponding processor incoming register also has access to the incoming message buffer though it furnishes data primarily to the outgoing message buffer of the outgoing message control board. Multiplexers 377 and 378, under control of the message byte counter 374 and the interrupt register of the common control board control the input to the incoming message buffer 372, which also has enabling inputs from the incoming controller and from the processor interface controller on the processor interface board.

The conversion from 16 to 8 bit parallel transmission could be provided in the processor incoming and outgoing registers of the processor interface board instead of in the message buffers if desired. It is preferred to keep the higher transmission speed in effect as far as possible.

FIG. 18 is a block diagram of the circuits of the common control board of a CMC. The principal circuits of this unit are a large number of registers for various purposes, to which information is written principally by a central processing unit through the processor incoming register 442 of the processor interface board (FIG. 19) which is discussed further below. An address decoding logic circuit 380 interprets the information received from that processor incoming register to the proper register or memory of the common control board. The contents of each of these registers and of the error type registers of the outgoing and incoming control boards can be read out to a central processor under control of a signal from the processor incoming register 442 of the processor interface board (FIG. 19).

The command register 401 is a six-bit register which contains a word representing any of 39 commands of a central processor for execution by the central message controller. Many of these commands relate to changing the state of one or another of the other registers. Those in turn govern the action of one of the controllers of the CMC. Thus, the CMC can not only provides messages to the outgoing message buffer of the outgoing control board for transmission and receive messages from the incoming message buffer, but also cause the performance of various operations by writing instructions into various registers of the CMC directly or indirectly.

A port status table 402 is used to tell the incoming controller which port to scan for incoming messages. This table contains one bit per port, indicating whether the port is in service or not. In scanning, the incoming controller 360 skips the ports that are listed as closed, which is to say out of service. It is necessary to prevent interference between consultation of the port status table by the incoming controller when a CPU finds it necessary to update the status table. Since the consultation of the table by the incoming controller is a very short operation, a port status use contention control signal is used to delay access of the CPU to the table without the necessity of a process coming to the notice of the CPU. This signal also switches the address input of the table by means of the multiplexer 403 from the incoming controller port address provided by the port counter 404 to the port address provided by the CPU through the processor interface board of the CMC.

There is also a maximum port count register 405 that stores the number of ports with which the system is equipped and which is changed whenever additional network modules or input-output devices are added. It provides the number from which the port counter 404 starts counting downward to zero to provide the port scanning sequence. As already explained, the output of the port counter is the incoming controller port address, and the particular port is scanned for incoming signals only if the port status table shows that the port is in service (i.e., not closed).

Provision is made for putting a CMC into the so-called offline mode in which it can send or receive lengthy information to or from a disc or tape device without interfering with the operation of the switching system. For this purpose, it operates in cooperation with an inactive central processing unit and is permitted to send or receive messages to only one port. For this purpose, the offline port address register 407 is provided into which the central processor can write the address of the port with which the CMC is to be permitted to communicate when it is put into the offline mode.

Finally, there is the outgoing port address register 408 in which the address of the port through which a message should be transmitted is registered when written in by a central processor. Neither the incoming nor the outgoing controller obtains access to a port until permission is received from the port use contention control 409. If the port is idle, the controller in question gets immediate permission. If the port is in use by the other controller, the requesting controller must wait until the port is idle. If both controllers simultaneously request to use an idle port, the incoming controller will be granted use of the port first, since there is less message handling capacity in the incoming direction than in the outgoing direction (the difference is small and is due to the "overhead" of the incoming controller associated with its need to scan the ports to find one that may be calling).

Multibit selectors 411 and 412, of the kind generally referred to as multiplexers, are operated in response to the configuration register 415, which will be presently described, to designate port numbers stored in the offline port address register 407 when the CMC has been put into the offline mode.

The configuration register 415 is one of the registers the content of which is written in accordance with certain commands that may be written into the command register 401. These commands are interpreted by decoding logic 416, the output of which is put into a control line register 417, which stores the instruction of the command register in such form that it can perform the appropriate operation in the subsidiary register which is to be altered. These subsidiary registers of the command register, in addition to the configuration register 415, comprise the message mode register 420, the reset register 421, the interrupt register 422 and the mask register 423.

The configuration register 415 holds six bits each having a particular and independent significance. Bit 5 indicates whether the CMC is in the on-line or in the off-line mode. A CMC is normally on-line. This means that it is driven by the active central processor. The two central processors are operating in synchronism, then the CMC replies to both CPUs. If the two CPUs are operating independently, then the CMC replies to the active CPU only and any port on the CMC may be used. An off-line CMC, on the other hand, is driven by the inactive CPU. If the two CPUs are operating in synchronism, the CMC replies to both CPUs. If the two CPUs are operating independently, the CMC replies to the inactive CPU only. Only the port specified in the off-line port address register 407 may be used, and this register can be loaded by the active CPU only and, therefore, only when the CMC is on-line. The off-line mode exists to allow loading of an off-line CMC from a magnetic tape or disc device without any risk whatever of disturbing the rest of the system.

There is no coordination between the CMCs at the CMC level to prevent both of them being being put off-line. It is the responsibility of the active CPU to ensure that both CMCs are not made off-line.

A manual pushbutton (not shown in the drawings) is preferably provided to enable an off-line CMC to be manually forced back on-line. Furthermore, there is a special way in which a CPU can force a CMC on-line. This is performed when the central processor issues a reset order for its data port by which it communicates with the CMC, which causes the processor interface controller 440 (FIG. 19) of the processor interface board 301 (FIG. 14) into the IDLE state, one of the consequences of which is to force the CMC on-line. It should be added that an on-line CMC monitors the reset line (one of the many lines of the multibit parallel data port) from the active CPU only. An off-line CMC monitors the reset line from both CPUs. Therefore, the active CP can always force an off-line CMC back on-line by issuing a data port reset order.

Bit 4 of the configuration register of a CMC indicates whether the CMC is operational or is "maintenance busy". A CMC is normally operational. In the maintenance busy mode, the parity check of each word plus address transmitted across the data port is no longer performed, and both the outgoing controller 330 (FIG. 16) and the incoming controller (FIG. 17) are held in the IDLE state, so that no message transfer sequences or scanning can take place.

Bit 3 of the configuration register signifies whether or not the outgoing controller 330 is forced to provide, for test purposes, invalid checksum codes. Similarly, bit 2 of the configuration register indicates whether the processor interface controller 440 is forced to provide invalid parity bits for test purposes.

Bit 1 of the configuration register signifies whether all the interrupts for alerting a central processor are enabled or whether they are disabled for the purpose of preventing a CMC, for maintenance purposes, from interrupting the CPs.

Finally, bit 0 of the configuration register indicates whethe the CMC has been ordered to send out normal IDLE code at all ports in service or whether it has been put into a condition requiring it to send priority-only IDLE codes (POIDL) from each IDLE port.

Only the NMCs of the respective NMs discriminate between these two codes (i.e. the input/output devices do not) and they respond by immediately making the same substitution in the codes they send out in idle signalling channels of network links connecting to PMs. As already explained, this differentiation of the IDLE codes makes it possible very quickly to block the transmission of low-priority messages at the PMs without the necessity of providing direct signalling channels between the PMs and the CPUs.

The I/O device reset register 421 contains only a single bit which signifies whether a task to be performed by the outgoing controller is resetting an input-output device by sending a special reset message in the manner previously described, or whether the task to be performed by the outgoing controller is the normal task of message transfer using the previously described message transfer sequence.

The message mode register 420 has just a single bit which indicates whether the message in the outgoing message buffer 336 is to be sent in the simplex mode, which is to say to an input/output device, or to a NMC of a particular plane, or whether it is to be sent in the duplex mode, namely to a pair of corresponding NMCs one in each network plane.

The interrupt register 422 registers four bits. Bit 3 indicates that the outgoing message buffer 336 is empty, and this bit is set by the outgoing controller 330 when it is ready to accept a message from a CPU. Bit 2 of the interrupt register is similarly set by the incoming controller when the incoming message buffer 372 has been loaded with a message in which byte 7 is zero, signifying that no problem has been encountered by the message so far. Bit 1 is set by the incoming controller when the incoming message buffer 372 has been loaded with a rerouted message, hence a message in which byte 7 is not zero.

Bit 4 of the interrupt register is the error bit and may be set by any one of four sources: (1) by the outgoing controller if the latter has encountered a problem and has recorded it in the outgoing controller error type register 331; (2) by the incoming controller regarding a problem recorded in the incoming controller error type register 361; (3) by the processor interface controller 440 (FIG. 19) when a parity error has been detected and recorded in the parity error interrupt register of the error interrupt generation logic circuit 425, and (4) by the master clock 305 (FIG. 14) to indicate abnormal status thereof (which also produces a signal on the clock interrupt input to the error interrupt generation logic 425). When an error is detected from one of these sources and causes the setting of the error bit in the interrupt register 422 as the result of operation of the error interrupt generation logic 425, a CPU is alerted and responds after the completion of the particular macro-instruction, if any, which it is executing. The CPU, after reading the interrupt register, reads the various error source registers to ascertain the nature of the error. An error bit resulting from the first three sources listed above can each be cleared by one of the 39 commands of the command register 401 after the CPU has dealt with the error, whereas a bit set by the last-mentioned kind of error is cleared by a command generated by the master clock when the error is cleared.

The mask register 423 serves to make it possible for certain bits of the interrupt register to be disregarded, so that the condition of the remaining bits can be quickly ascertained. The mask register 423 accordingly has a separate bit that can be set for masking each of the bits of the interrupt register. The condition of the mask register 423 performs its masking task through the masking logic circuit 424. As can be seen from the way the multiplex selector 382 is shown in FIG. 18, a CPU can read the interrupt register directly or through the masking logic, in the latter case it can be said to read a masked interrupt register. The CPU can also read the mask register itself if necessary.

The master clock 305 (FIG. 14) produces a frame pulse every 125 µs that is 90 ns wide and also 10.24 MHz pulses at a 50% duty cycle from which it is easy to obtain two interlocking phases of 5.12 MHz clock pulses. Clock pulse generator circuits 427 are provided on the common control board of each CMC for deriving clock pulses for use by various circuits, including the insertion circuit 310 for each of the ports of the fourteen interface boards.

FIG. 19 is a block diagram of the processor interface board which contains the processor interface controller 440 that handles the exchange of messages between the CMC and one or the other of the CPUs. A processing incoming register 442 is used to facilitate the transfer of data from the data bus 450 to the common control, outgoing and incoming control boards for supplying information to the outgoing message buffer 336 and to various registers already mentioned. Similarly, a processor outgoing register 443 is provided for transferring information from the incoming message buffer 386 and from various registers to the data bus 450. The configuration register 415 of the common control board controls the setting of the processor selection logic circuit 451 to determine to and from which CPU communication will be established by the particular CMC utilizing the receiver and driver circuits 452 in the case of communication with CPU0 and the receiver and driver circuits 453 in the case of communication with CPU1.

As already mentioned, the processing interface controller 440 manages the port status table use contention control 441 to delay access of the incoming controller 360 to the port status table 402 of the common control board (FIG. 18) while the processor incoming register 442 has access to the table 402 while selecting the port address to be updated, rather than the incoming port address, in the multiplexer 403 of FIG. 18.

A faster-acting error detection system is used for interchange of information between a CMC and a CPU than in the case of transmission of messages between a CMC and the switching network, as is desirable because of the higher data flow rate involved. A parity bit is generated in the CPU for each combination of a 16-bit word and the contemporary signals on the 24 address lines (not shown), some of which identify the particular CMC and others of which identify particular locations in CMC. This pariity bit is checked by the parity check circuit 449 for all received words and a parity generator circuit 448 is provided to supply a parity bit on each outgoing word. If a parity error in a received word is detected by the parity check circuit 449, it is registered in a parity error interrupt register that is not separately shown in the drawings, but is to be understood as being in a connection between the parity check circuit 449 and the parity error interrupt input of the error interrupt generation logic circuit 425 of FIG. 18. Since the interrupt consequently posted in the interrupt register 422 will not come to the notice of the central processor sending the erroneous message until it has completed sending the message, something must be done to prevent loading a message already known to be erroneous into the outgoing message buffer 336. This is preferably done by requiring that until the parity error interrupt register is cleared by the central processor, all write operations shall be treated as if they had parity errors except for write operations for clearing the parity error interrupt register or write operations for making the CMC maintenance busy, or write operations taking place when the CMC is already in the "maintenance busy" condition. Such a procedure is necessary because it is desirable to organize the process of loading an entire message into the outgoing message buffer and then causing the message to be sent under a single macro-instruction during the execution of which the central processor will not recognize an interrupt, so that unless the CMC blocks all write operations subsequent to a faulty write until the interrupt is recognized, a bad message will not only be loaded into the outgoing message buffer, but will be sent on to a network message controller or to a controller of an input/output device.

In the preferred system, it has been found necessary to use no more than five bits in the outgoing error-type register 361. Thus, for example, in the error-type register 331 related to the outgoing controller, bit 4 is conveniently assigned to indicate, when set (equal 1), that a contention problem was encountered, for example, that a network message controller sent IWS and a message loaded in the outgoing message buffer 336 had to be aborted.

Figure 20:
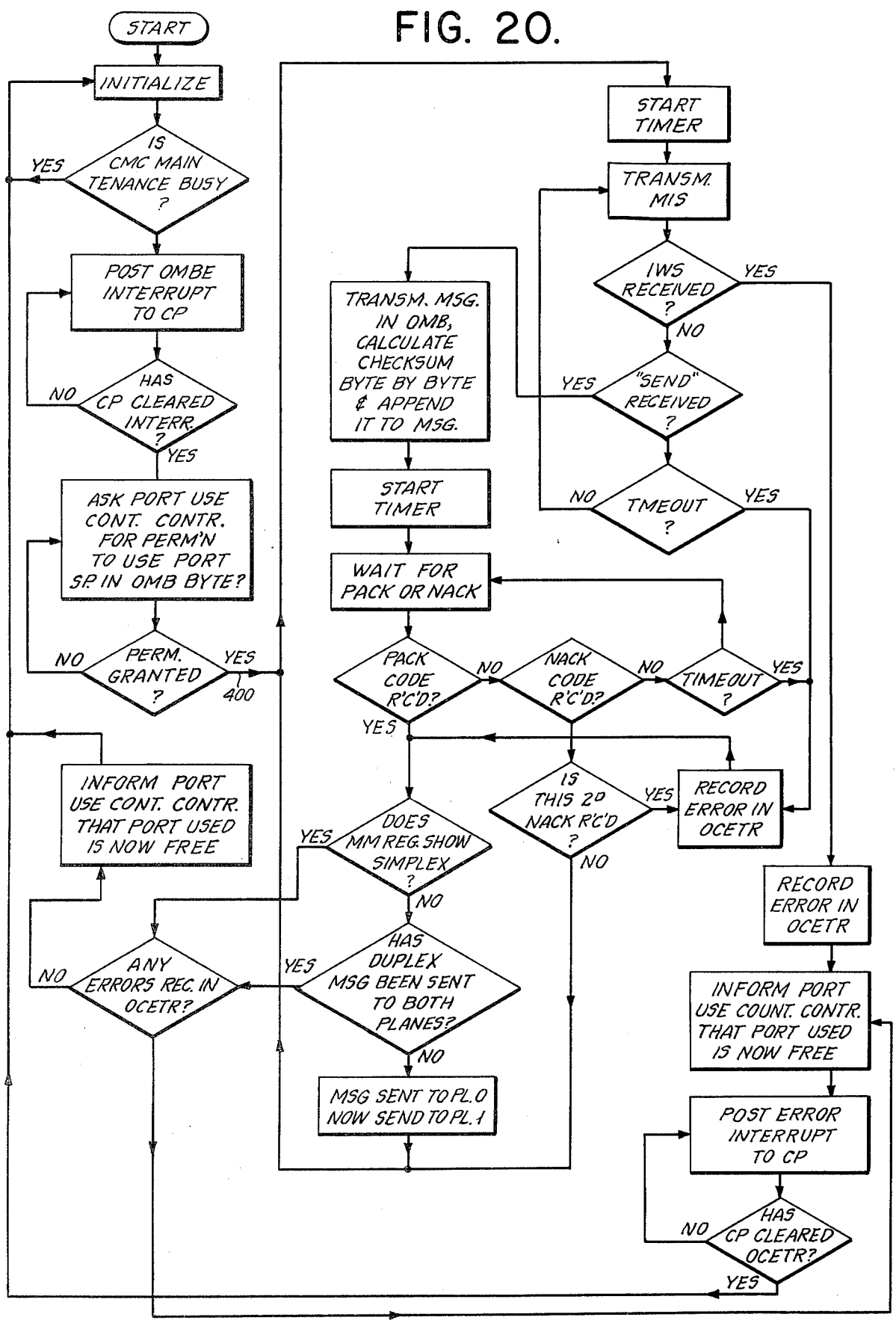
FIG. 20 is a simplified flow diagram of the operation of the CMC outgoing controller.
Figure 21:
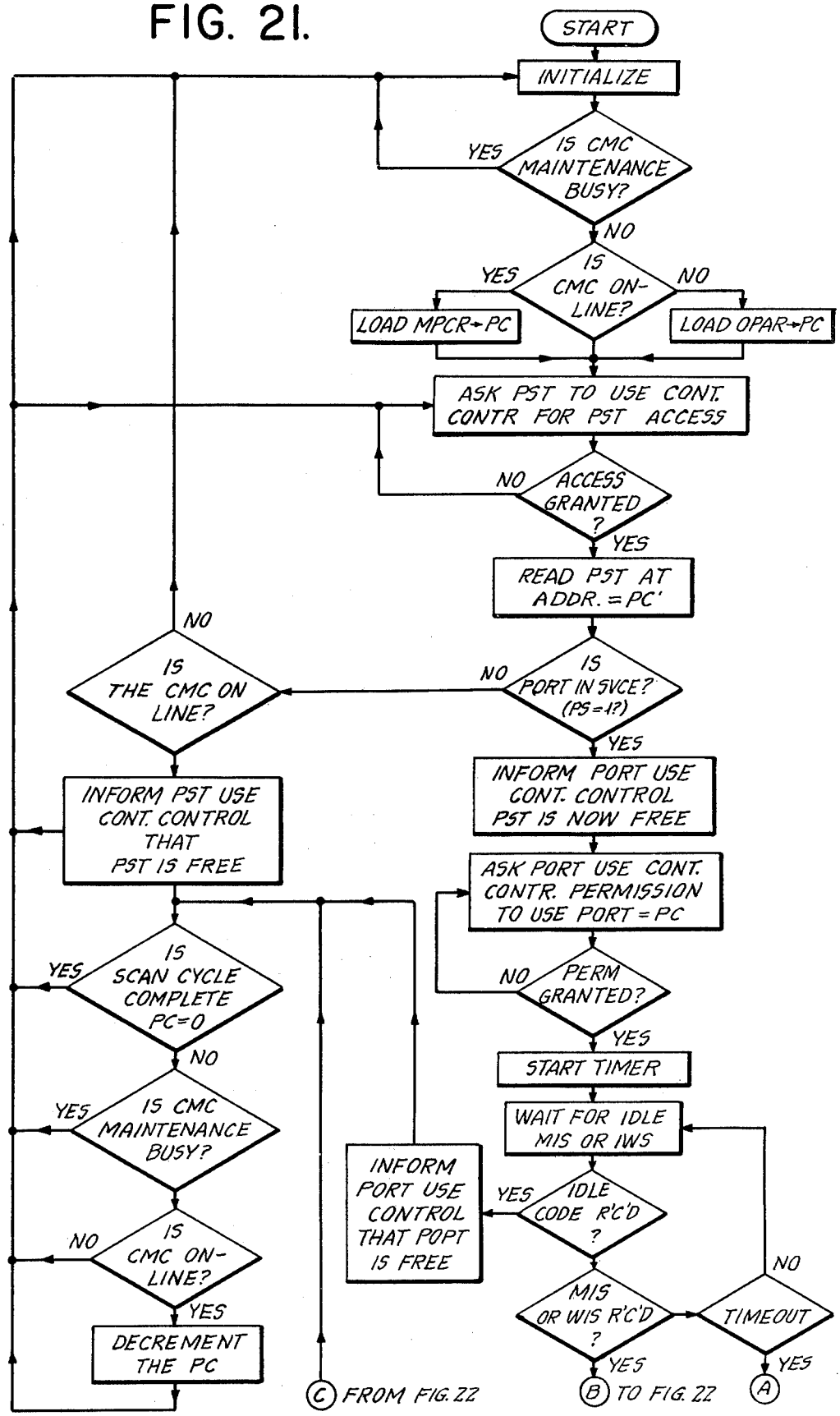
FIGS. 21 and 22 together provide a simplified flow diagram of the operation of the CMC incoming controller.
Figure 22:
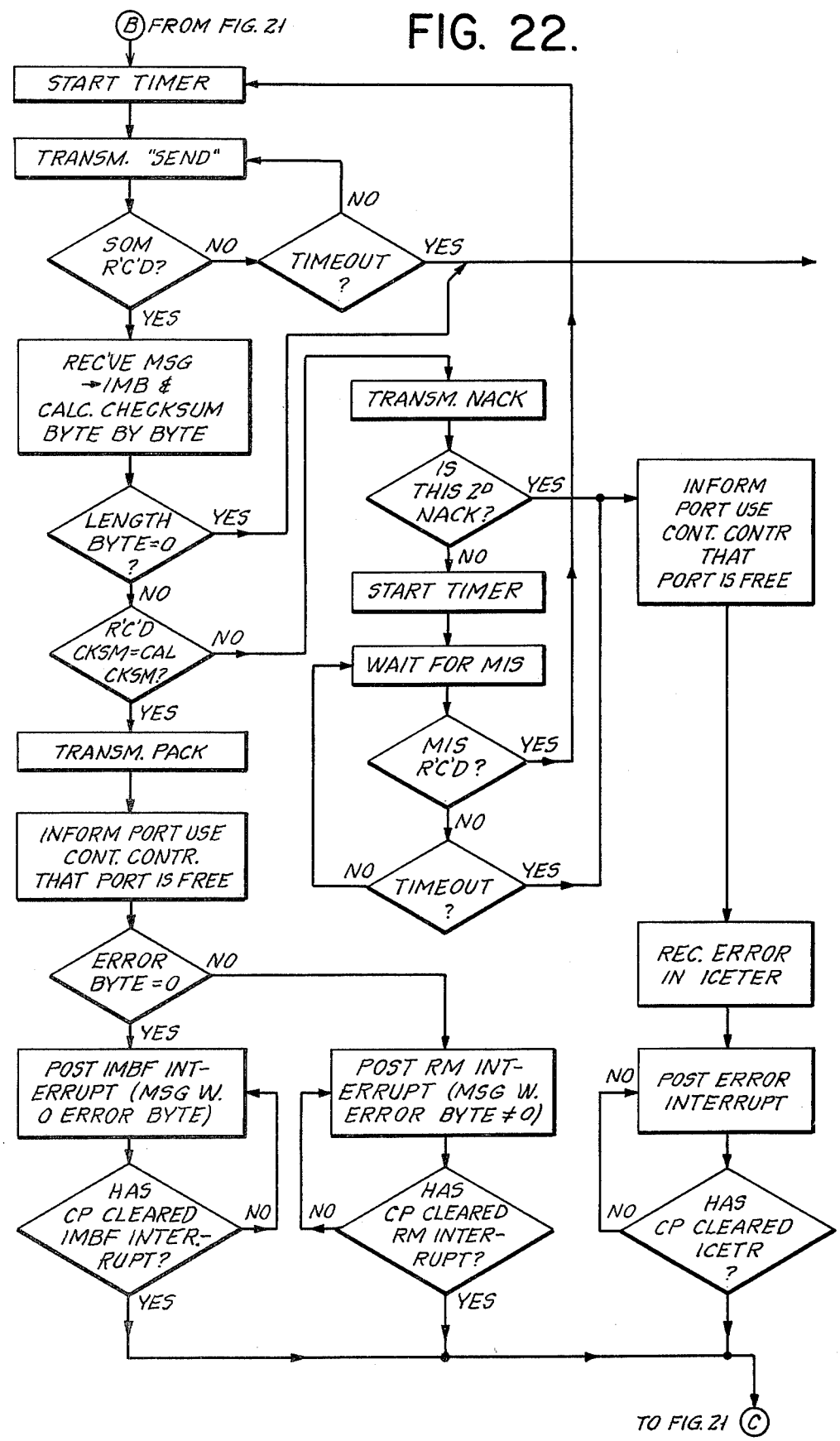

FIGS. 20-23 are flow diagrams that define the constitution of the three controllers of a CMC. FIG. 20, being the diagram for the outgoing controller 330 already described with reference to FIG. 16, that shows the various components that are provided on the outgoing control board along with the outgoing controller itself and their interconnections. Similarly, FIGS. 21 and 22 together provide the flow chart for the incoming controller 360, the operation of which has already been discussed in connection with FIG. 17, that shows various components which cooperate with the incoming controller and are mounted on the incoming control board of the CMC. The flow chart of FIG. 21 joins on to that of FIG. 22, these charts being joined as marked by the reference symbols A, B, C, where the procedure taking place in one chart goes on to the other flow chart.

Figure 23:
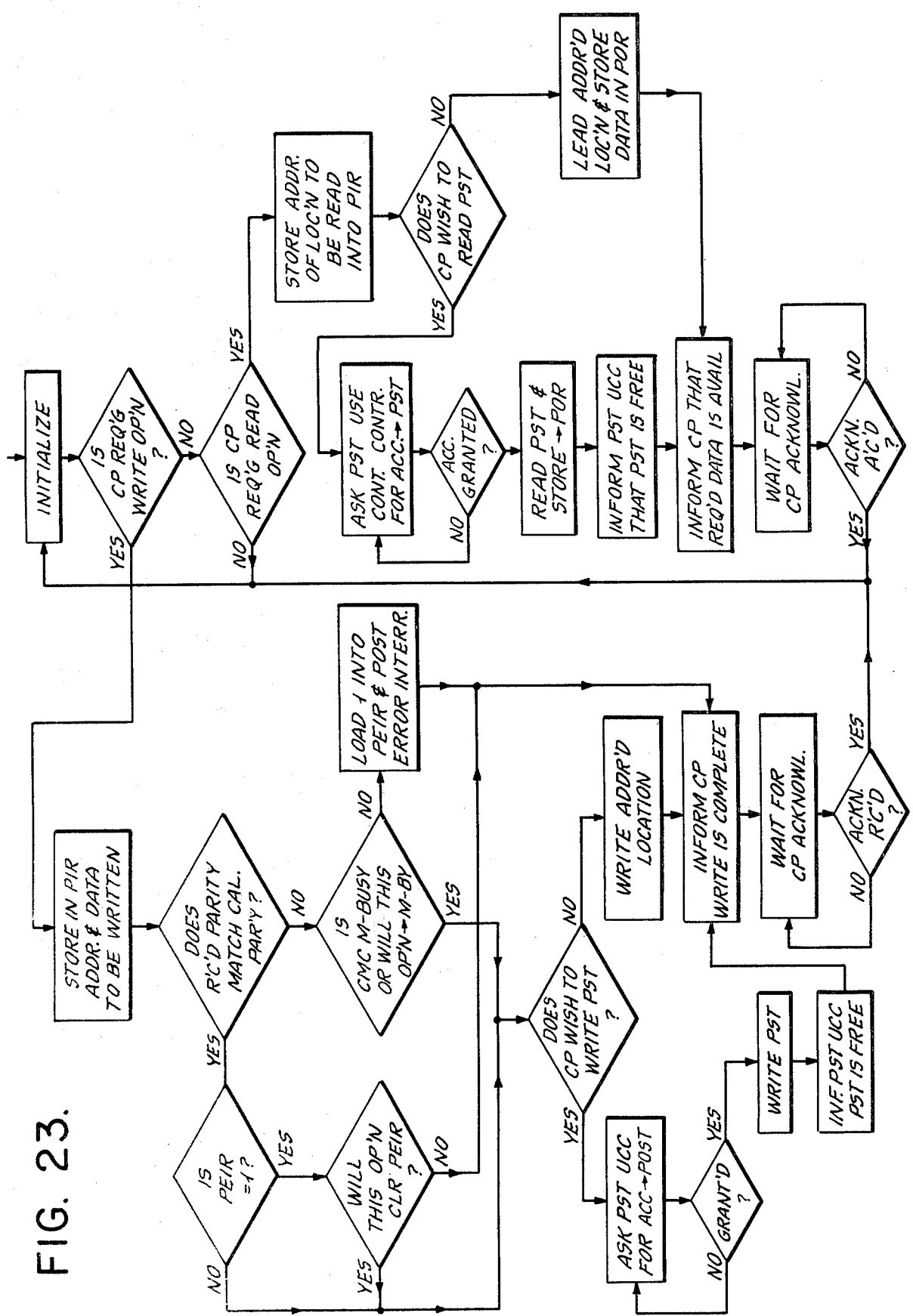
FIG. 23 is a simplified flow diagram of the CMC processor interface controller.

FIG. 23 is a flow chart of the processor interface controller 440 shown on FIG. 19.

FIG. 20, for simplification, omits the function, already described above, of sending a special kind of reset message to produce a resetting of an input/output device. If these steps had been shown in FIG. 20, there would have been interposed in the line 400 of FIG. 20, at the left near the middle of the diagram, a procedure of checking whether the port which is to receive a message leads to an input-output device and, if so, whether the CMC wants to send a reset message to that port (as indicated by a bit in the register 421, which is one of the registers on the common control board of the CMC shown in block diagram in FIG. 18). That reset procedure is a minor option and involves only auxiliary equipment outside the switching system, so that showing it in FIG. 20 would have detracted from the illustration of the main functions of the CMC.

The flow diagrams of FIGS. 20–23 have been simplified in connection with message transmission and reception sequences, since details such as, for example, the counting of received message bytes by counting down from the value given in the length byte, until a 0 count heralds the arrival of the checksum byte, have already described fully, particularly in connection with the description of the processor 312 and the memory 341 of the trunk module illustrated in FIG. 12. Furthermore, in view of what already has been described regarding the organization and the mode of operation of the CMC and its controllers, FIGS. 20–23 will be found self-explanatory, provided the following abbreviations used in the diagrams are recognized:

| Abbreviation | Meaning |
| --- | --- |
| OMB | outgoing message buffer 336 |
| OMBE | outgoing message buffer empty |
| MMREG | message mode register |
| OCETR | outgoing control board error type register 331 |
| PORT USE CONT. CONTR. | port use contention control 409 |
| SP | specified |
| PERM. | permission |
| ADDR. | address |
| PC | port counter 404 |
| MPCR | maximum port count register 405 |
| OPAR | offline port address register 407 |
| PST | port status table 402 |
| PST USE CONT. CONTR. PSTUCC | port status table use contention control 403 |
| IMB | incoming message buffer 372 |
| IMBF | incoming message buffer full |
| RM | rerouted message |
| ICETR | incoming control board error type register 361 |
| SOM | start of message (it is assumed the other one-byte messsage transfer codes will be recognized without the necessity of listing them here) |
| CKSM | checksum |
| CALC | calculate, calculated |

| Abbreviation | Meaning |
| --- | --- |
| REC | record, recorded |
| REC'D | received |
| R'C'D | received |
| W. | with |
| MSG | message |
| TRANSM. | transmit |
| PIR | processor incoming register 442 |
| POR | processor outgoing register 443 |
| PEIR | parity error interrupt register (part of 425, FIG. 18) |
| LOC'N | location |
| AVAIL. | available |
| REQ'D, REQ'G | requested, requesting |
| ACC. | access |
| OP'N | operation |
| CLR | clear |
| PAR'Y | parity |
| M-BY | maintenance busy |
| M-BUSY | |
| ACKN. | acknowledgement |
| ACKNOWL. | |

Although the invention has been described in detail with reference to a particular embodiment of a telephone exchange of large size, which represents of course, the field for which the invention is particularly well suited and for which the implementations and elaborations of the invention have been particularly designed, not only are many variations and modifications in the public telephone service field possible within the scope of the invention, such as, for example, the use of a once-repeated positive or negative acknowledgement in the message transfer sequence as has already been mentioned, but also the invention is applicable to systems other than those of public service telephone companies.

Thus, for example, in a telephone switching system serving a large industrial or commercial installation for its internal communications only, the importance of providing duplication of the switching network may be greatly diminished, because the owner of the system may find it more cost-effective to tolerate the delays of additional retries, use of other terminals of the system, or waiting for service personnel to deal with the failure than to provide duplication of the switching system so that failures in most cases will not even be noticed by the users of the system. In such a system, without duplication of the network, internal messages may generally have no alternative path and an error register will call in service personnel. Duplication can be provided simply for the signalling channel, but as the link lines are rarely important sources of failure, that is unlikely to be of practical interest. The alternate path for internal messages may accordingly, be entirely dispensed with for economic reasons and in such systems the first negative aknowledgement will be treated in the same manner as a second negative acknowledgement in the foregoing illustrative embodiment.

Duplication of the central processing unit, and/or of the central message controller might be found useful even though other components of the switching system were not duplicated.

Finally, particularly in a system in which there is no duplication of the switching network or of central message controllers, the provision of a central message controller as a unit which is as distinct from the central processing unit as in the illustrated example may not have any technical importance and the central processing unit could have a simpler interface with the network to send and receive serial data, or might even in a compact installation, for example, utilize 8-bit parallel control signal links to each of the network message controllers, still using the same basic message transfer sequences.

Finally, the invention is not limited in its application to switching systems for the handling two-way speech communication. After all, when speech is transformed into samples representing instantaneous amplitude in pulse coded form, what is present is simply digital data. Speech samples can be coded in 4-bit or 16-bit bytes, as well as in 8-bit bytes, according to the quality of the speech channel desired (with still a wider range possible requirements being imaginable for other sound transmissions). It is evident that the invention does not depend upon the byte size of the switched time-multiplexed samples; it is also evident that the invention could be used for switching of two-way time-multiplexed bytes of digital data streams in time-division switching where the data streams have some significance other than speech sounds or any sounds at all. Thus, check-clearing operations could well benefit from such a specialized switching system, if the magnitude of such operations should reach a value at which a dedicated electronic switching system for this service would be economically justified. In such financial operations the requirements of reliability for accurate transmission and accurate switching are extremely high and the technology suited for the high reliability requirements of the public telephone service is an excellent starting point for the requirements of future high-speed financial data processing. In the processing of non-speech information switching on a time-division basis in which a byte size smaller or larger than the 8-bit bytes illustrated in the foregoing description should be utilized, the particular advantages of the present invention would, as a practical matter require that the byte size of the internal messages of the system differ at most only slightly from that used for the traffic data that is being switched on a time-division basis, and, preferably, that the two byte sizes be the same.

Whether the data words used in the switching system differ from the traffic and message bytes in size by one or two or possibly more bits is also a variable and, of course, if the advantages of some aspects of the invention can be dispensed with, partial use of the invention without any additional bits is conceivable. A "bipolar violation" framing bit could feasibly be put in the signalling channel without requiring an "extra" bit outside the byte size of the switched traffic data.

On the other hand, the provision of at least one additional bit in each data word word beyond the bits required for the message or traffic data bytes is important for providing supervision through the system from peripheral module to peripheral module, which is particularly significant in systems with high reliability requirements. Furthermore, as a maintenance feature for warning of erratic behavior of hardware, a parity check bit is desirable in the data words incorporating the traffic bytes. On the other hand, in the case of non-speech data, error checking bits already in the data stream may be sufficient for detecting hardware failures in the switching system.

It has already been mentioned that some of the features of the trunk module illustrated in FIG. 12 are related to making economical use of a particular commercially available kind of processor. It is to be expected that the utilization of other components now or hereafter commercially available may require or otherwise lead to variations in implementation of the present invention. Furthermore, the users' handbooks which the manufacturers of microprocessors, memory blocks, integrated logic circuits, and the like, already by industrial custom publish, will facilitate the implementation of the present invention in forms suited to the use of various other varieties of such components as may from time to time be available.

Examples of such handbooks are the following:

The TTL Data Book, Second Edition, Texas Instruments Inc., 1976; The Linear Control Circuits Data Book, First Edition, Texas Instruments Inc., 1976; Semiconductor Data Library, Series B, 6 Volumes, Motorola Inc., 1976; Signetics Data Manual, Signetics Corp., 1976; MCS 85 User's Manual (Preliminary), Intel Corp., January 1978; Data Catalog 1978, Intel Corp.; Am 2901, Am 2909 Technical Data, Advanced Micro Devices Inc.; and Microprogram Sequencers, The Am 2909 and Am 2911, Advanced Micro Devices Inc.

What is claimed is:

1. In a time-division electronic communication switching system comprising a central processing unit, a network of time-switch containing network modules and an array of peripheral modules each serving for connecting a multiplicity of two-way communication channels with the switching system, each peripheral module being connected by at least one time-division multiplex two-way link with, respectively, at least one network module of said network, each network module having switches organized in at least one stage of incoming time-division switching and switches organized in at least one stage of outgoing time-division switching and having a peripheral side at which said multiplex two-way links are connected to switches of said incoming and outgoing switching stages and having a junctor side at which time-division multiplex junctors each interconnect switches respectively of said incoming and outgoing switching stages of said network modules, said peripheral modules being constituted to provide time-multiplexed digitally coded bytes of communication traffic of said network modules for passage through time-switched connections and to receive such bytes from said network modules after passage through time-switched connections, said switching system having the improvement which consists in that:

each said network module has a network message controller, each of which is connected through a two-way control signal link with said central processing unit and is capable of recognizing at least some defective received messages as being defective, of commanding a repetition of a message recognized as defective when first received and of repeating the sending of a message in response to an indication that it was defectively received;

said central processing unit is connected so that it exchanges signals, including system control signals, with said peripheral modules only through said network message controllers, and also so as to control said switches of said network modules through said control signal links and said network message controllers;

at least one time-division serial digital data channel in each of said multiplex links connects, in each case, the control circuits of one of said peripheral modules with one of said network message controllers for exchanging signals with said central processing unit, and each said control signal link connecting one of said network message controllers with said central processing unit serves both for transmission of signals regarding the setting of the time-switches of the network module of which said one of said network message controllers forms a part, and also for transmission of signals passing between said central processing unit and any of those of said peripheral modules that are connected to said one of said network message controllers.

2. An improvement in a time-division electronic switching system as defined in claim 1, in which said central processing unit is connected to said control signal links, for connection to the respective network message controllers of said network modules, through a central message controller provided for buffering messages and converting them between a word-sequential parallel bit mode utilized for transmission and reception by said central processing unit and a bit-sequential mode having a standard word size, which is the same as the word size used for transmitting and switching multiplexed digital data bytes of communication traffic streams switched by the system, so as to facilitate time-multiplexing, on a word basis, of message words with words containing said digital data bytes when a message to or from a central message controller passes between a network message controller and a peripheral module on any of said network links.

3. An improvement in a time-division electronic switching system as defined in claim 2, in which said standard word size is substantially smaller than the word size used in said word-sequential parallel-bit mode of transmission and reception used by said central processing unit.

4. An improvement in a time-division electronic switching system as defined in claim 2, in which said central message controller, said network message controllers and said peripheral modules are so constituted that they repetitively send either a first (IDLE) or a second (POIDL) bit sequence code requiring not more than one word to transmit, signifying an idle condition, over each network link or control signal link, as the case may be, connected to said respective central message controller, network message controller or peripheral module, at least whenever a message is not in the process of being communicated over the particular link, a message being defined as in the process of being communicated from the reception of either a third (MIS) or a fourth (IWS) bit sequence code requiring not more than one word to transmit it, signifying that a message is ready to be sent, until transmission of either a fifth (PACK) or a sixth (NACK) bit sequence code requiring not more than one word to transmit it and respectively signifying successful and unsuccessful reception of the message; and said central message controller is equipped to send either said first or second bit sequence codes repetitively when idle, and said peripheral modules are equipped only to send said first bit sequence repetitively when idle, and said network message controllers are equipped to send said second rather than said first bit sequence to said peripheral modules so long as said central message controller is sending said second rather than said first bit sequence, said central processing unit being arranged to select the sending of said second bit sequence during a period in which the switching system is subject to a predetermined load condition and said peripheral modules being equipped to inhibit at least the preparation of low-priority messages for transmission by said peripheral modules over said network links until said first rather than said second sequence code is repetitively received from a network message controller by the respective peripheral module.

5. An improvement in a time-division electronic switching system as defined in claim 4, in which said network message controllers each have multiple-message buffers respectively for messages going to or coming from said central message controller and in which said network message controllers are equipped to send said fourth rather than said third bit sequence code to said central message controller in response to initiation of a message transfer sequence by the latter when and only when the respective network message controller has a full message buffer for messages directed to the central message controller, and in which said central message controller is arranged so as to abort said initiated message transfer sequence and to receive a message from said network message controller in response to the sending of said fourth bit sequence by said network message controller.

6. An improvement in a time-division electronic switching system as defined in claim 5, in which each of said peripheral modules has multiple-message buffers respectively for messages coming to or going from said peripheral module and in which each said peripheral module is arranged to inhibit putting low-priority messages into its said buffer for outgoing messages after a predetermined proportion of said buffer for outgoing messages is full, and until said last-mentioned buffer thereafter becomes empty.

7. An improvement in a time-division electronic switching system as defined in claim 6, in which each of said peripheral modules is arranged to inhibit putting low-priority messages into its said buffer for outgoing messages so long as said peripheral module receives said second rather than said first bit sequence from one of said network message controllers and also thereafter until its last-mentioned buffer is empty if at the time it ceases receiving said second rather than said first bit sequence its last-mentioned buffer is not empty.

8. An improvement in a time-division electronic switching system as defined in claim 7, in which each of said peripheral modules also has one-message input and output buffers, and is constituted to use said input buffer as an overflow buffer for its said multiple-message buffer for incoming messages, and is further arranged to send said fourth rather than said third bit sequence in response to initiation of a message transfer sequence by one of said network message controllers so long as said last-mentioned mutiple-message buffer and said input buffer are full and there is a message in said output buffer, and in which said network message controllers are arranged to respond to said fourth bit sequence transmitted by said peripheral module by discontinuing said initiated message transfer sequence and receiving a message from said peripheral module.

9. An improvement in a time-division electronic switching system as defined in claim 2, in which
said central message controller is constituted so as to be able to receive a message from one network message controller while transmitting to another network message controller, while said network message controllers are constituted so as to be unable to send a message over a control signal link while a message is being received thereover; and
contention logic circuits are provided in said central message controllers for inhibiting the transmission of a message to a network message controller from which a message is in the process of being communicated.

10. An improvement in a time-division electronic switching system as defined in claim 2, in which
said central message controller is constituted so as to be able to receive a message from one network message controller while transmitting to another network message controller, and said network message controllers are constituted so as to be unable to send a message over a control signal link while a message is being received over the same control signal link, and
said central message controller is arranged so that when no message addressed to it is in the process of communication and any last previous received message has been relayed to said central processing unit, said central message controller receives sequentially on all control signal links in turn, progresses to the next upon reception of said first bit sequence signifying an idle state, and progresses likewise to the next in response to identification of the control signal link just reached as one in which a message is in the process of being transmitted by said central message controller.

11. An improvement in a time-division electronic switching system as defined in claim 9, in which
at least one input/output device is connected by a two-way control signal link to said central message controller for providing accessible long-term program stores for at least some of said modules of the system;
at least some of said modules of the system include a processor and associated memory, including a replaceable portion of program memory, and are arranged to respond to a reset message from said central message controller by a sequence of operations involving replacement of said replaceable portion of program memory and setting of predetermined initial operating conditions in response to subsequent messages from said central message controller; and
said central message controller and said central processing unit are arranged to be capable of causing said input/output device to deliver module program store content to said central processing unit and to retransmit it in messages to a module responding to a reset message for refreshing the replaceable program memory of said module.

12. An improvement in a time-division electronic switching system as defined in claim 10, in which
at least one input/output device is connected by a two-way control signal link to said central message controller for providing accessible long-term program stores for at least some of said modules of the system;
at least some of said modules of the system include a processor and associated memory, including a replaceable portion of program memory, and are arranged to respond to a reset message from said central message controller by a sequence of operations involving replacement of said replaceable portion of program memory and setting of predetermined initial operating conditions in response to subsequent messages from said central message controller; and
said central message controller and said central processing unit are arranged to be capable of causing said input/output device to deliver module program store content to said central processing unit and to retransmit it in messages to a module responding to a reset message for refreshing the replaceable program memory of said module.

13. An improvement in a time-division electronic switching system as defined in claim 2, in which said standard word size includes at least one bit in addition to the bits of said digital data bytes utilized over a succession of said words of standard size, for providing supervision messages from one peripheral module to another over the time-switched connection utilized by the digital data bytes of the same words rather than by relaying through said central processing unit, and in which, further, said peripheral modules include means for transmitting supervision messages by use of said bit in successive words, receiving supervision messages transmitted by use of said bit in successive words, making a comparison of a received supervision message with the supervision message last previously received over the same time-switched connection, and initiating a response to the result of said comparison.

14. An improvement in a time-division electronic switching system as defined in claim 1, in which
said communication switching system is a telephone switching system, and
said digitally coded bytes of communication traffic are PCM coded speech wave amplitude samples.

15. An improvement in a time-division electronic switching system as defined in claim 14, in which
at least some of said peripheral modules include means for converting analog speech signals into PCM coded speech wave amplitude samples and vice versa.

16. An improvement in a time-division electronic switching system as defined in claim 2, 3 or 4, in which
said communication switching system is a telephone switching system;
said digitally coded bytes of communication traffic are PCM coded speech wave amplitude samples; and
at least some of said peripheral modules include means for converting analog speech signals into PCM coded speech wave amplitude samples and vice versa.

17. An improvement in a time-division electronic switching system as defined in claim 5, 6 or 7, in which
said communication switching system is a telephone switching system;
said digitally coded bytes of communication traffic are PCM coded speech wave amplitude samples; and
at least some of said peripheral modules include means for converting analog speech signals into PCM coded speech wave amplitude samples and vice versa.

18. An improvement in a time-division electronic switching system as defined in claim 8, 9 or 10, in which
    said communication switching system is a telephone switching system;
    said digitally coded bytes of communication traffic are PCM coded speech wave amplitude samples; and
    at least some of said peripheral modules include means for converting analog speech signals into PCM coded speech wave amplitude samples and vice versa.

19. An improvement in a time-division electronic switching system as defined in claim 11, 12 or 13, in which
    said communication switching system is a telephone switching system;
    said digitally coded bytes of communication traffic are PCM coded speech wave amplitude samples; and
    at least some of said peripheral modules include means for converting analog speech signals into PCM coded speech wave amplitude samples and vice versa.

20. In a time-division telephone switching system comprising duplicate central processing units, duplicate networks of time-switch-containing network modules and an array of peripheral modules each serving for connecting a multiplicity of two-way telephone channels with the switching system,
    each peripheral module being connected by at least one time-division multiplex two-way network link with a network module of the other of said networks which is connected to the same peripheral module as said one network module of said one of said networks,
    each network module having switches organized in at least one stage of outgoing time-division switching and switches organized in at least one stage of outgoing time-division switching and having a peripheral side at which said multiplex two-way links are connected to said switches of said incoming and outgoing switching stages and having a junctor side at which time-division multiplex junctors each interconnect switches respectively of said incoming and outgoing switching stages of the network modules,
    at least some peripheral modules having means for encoding speech signals into successions of PCM codes speech samples, for decoding PCM speech sample successions into speech signals, and for time-multiplexing and demultiplexing PCM speech sample successions, so that all speech signals provided to network modules are in the form of PCM speech samples, said switching system having the improvement which consists in that: each network module has a network message controller each of which is connected through a two-way control signal link with each of said central processing units and is capable of recognizing at least some defective received messages as being defective, of commanding a repetition of a message recognized as defective when first received, and of repeating the sending of a message in response to an indication that it was defectively received;
    said central processing units are connected so that they can exchange signals, including system control signals, with said peripheral modules only through said network message controllers, and also so as to control said switches of said network modules through said control signal links and said network message controllers;
    at least one time-division serial digital data channel in each of said time-division multiplex network links connects, in each case, the control circuits of one of said peripheral modules with one of said network message controllers for exchanging signals with one of said central processing units, and
    each said control signal link connecting one of said network message controllers with one of said central processing units serves both for transmission of signals regarding the setting of the time-switches of the network module of which one of said network message controllers forms a part and also for transmission of signals passing between said one of said central processing units and any of those of said peripheral modules that are connected to said one of said network message controllers.

21. An improvement in a time-division telephone switching system as defined in claim 20, in which said peripheral modules, network modules and time-division multiplex network links are so arranged and connected that PCM coded speech samples of telephone traffic are always transmitted from a peripheral module to another over both of the duplicate networks of network modules; for each direction of transmission circuits at the receiving module determine which of the two paths will be used and when the path in use will be changed in response to detection of a transmission error, but reports, orders and other messages for operating the switching system passing between a peripheral module and a central processing unit are sent through a single network message controller selected at the message sending end and circuits are provided in each of said modules and also for said central processing units to make the determination to change the message path to the corresponding path through the other of said duplicate networks at the sending end of the path in response to a negative acknowledgment code from the receiving end signifying that the messsage was not correctly received.

22. An improvement in a time-division telephone switching system as defined in claim 21, in which said circuits for changing the message path are arranged to change said path only after a second trial transmission has been made and has resulted in the receiving of a second negative acknowledgment code.

23. An improvement in a time-division telephone switching system as defined in claim 20, in which duplicate central message controllers are provided for connecting any one of said central processing units to any of a set of said control signal links, for connection to the respective network message controllers of said network modules, said central message controllers being provided for buffering messages and converting them between a word-sequential parallel-bit mode utilized for transmission and reception by said central processing units and a bit-sequential mode having a standard word size, which is the same as the word size used for transmitting PCM encoded speech samples, so as to facilitate time multiplexing, on a word basis, of message words with speech sample words when a message to or from a central message controller passes between a network message controller and a peripheral module on any of said time-division multiplex network links.

24. An improvement in a time-division telephone switching system as defined in claim 23, in which said peripheral modules and network modules and time-division multiplex network links are so arranged and connected that PCM coded speech samples of telephone traffic are always transmitted from a peripheral module to another over both of the duplicate networks of network modules, and for each direction of transmission circuits at the receiving module determine which of the two paths will be used and when the path in use will be changed in response to detection of a transmission error, but reports, orders and other messages for operating the switching system passing between a peripheral module and a central processing unit are sent through a single network message controller selected at the message sending end and circuits are provided in each of said modules and in each of said central message controllers to make the determination to change the message path to the corresponding path through the other duplicate network at the sending end of the path in response to a negative acknowledgment code from the receiving end signifying that the message was not correctly received.

25. An improvement in a time-division telephone switching system as defined in claim 23 or 24, in which means are provided for control, by said central processing units, of whether a message sent out by a central message controller is sent simultaneously to two corresponding network message controllers respectively of said duplicate networks or is sent to only one network message controller with transmission of an idle code to the corresponding network message controller of the other of said duplicated networks, said control means being arranged to send orders regarding time-switch settings simultaneously to two corresponding network message controllers and to send messages for a peripheral module to only one network message controller.

26. An improvement in a time-division telephone switching system as defined in claim 23 or 24, in which said central message controllers, network message controllers and the peripheral modules are so constituted that they repetitively send bit sequence code requiring not more than one word to transmit, signifying an idle condition, over each network link or control signal link, as the case may be, connected to said respective central message controller, network message controller, or peripheral module, at least whenever a message is not in the process of being communicated over the particular link, a message being defined as in the process of being communicated from the time of reception of another bit sequence code requiring not more than one word to transmit it, signifying that a message is ready to be sent, until transmission of still another bit sequence code requiring not more than one word to transmit it and signifying successful or unsuccessful reception of the message; and also to send repetitively, in response to receiving said bit sequence code signifying that a message is ready to be sent, a bit sequence code requiring not more than one word to transmit it and signifying readiness for reception, for causing transmission of the message when the recipient module or controller is in fact ready to receive.

27. An improvement in a time-division telephone switching system as defined in claim 23 or 24, in which:
said central message controllers, network message controllers and the peripheral modules are so constituted that they repetitively send either a first (IDLE) or a second (POIDL) bit sequence code requiring not more than one word to transmit, signifying an idle condition, over each time-division multiplex network link or control signal link, as the case may be, connected to said respective central message controller, network message controller, or peripheral module, at least whenever a message is not in the process of being communicated over the particular link, a message being defined as in the process of being communicated from the reception of either a third (MIS) or a fourth (IWS) bit sequence code requiring not more than one word to transmit it, signifying that a message is ready to be sent, until transmission of either a fifth (PACK) or a sixth (NACK) bit sequence code requiring not more than one word to transmit it and respectively signifying successful and unsuccessful reception of the message; and
said central message controllers are equipped to send either said first or second bit sequence codes repetitively when idle and said peripheral modules are equipped only to send said first bit sequence repetitively when idle, and said central message controllers are equipped to send said second rather than said first bit sequence to said peripheral modules so long as one of said central message controllers is sending said second rather than said first bit sequence, said central processing units being arranged to select the sending of said second bit sequence during a period in which the switching system is subject to a predetermined load condition, and said peripheral modules being equipped to inhibit at least the preparation of low-priority messages for transmission by said peripheral modules over said network links until said first rather than said second sequence code is repetitively received from a network message controller by the respective peripheral module.

28. An improvement in a time-division telephone switching system as defined in claim 27, in which said network message controllers are equipped to send said fourth rather than said third bit sequence code to one of said central message controllers in response to the sending of said third bit sequence code by the latter when, and only when, the respective network message controller has a full message buffer for messages directed to the central message controller; and
said central message controllers are arranged so as to abort a message ready to be transmitted and to receive a message from said respective network message controller in response to the sending of said fourth bit sequence code by said respective network message controllers.

29. An improvement in a time-division telephone switching system as defined in claim 28, in which each of said peripheral modules has multiple message buffers respectively for messages coming to or going from said peripheral module and in which each said peripheral module is arranged to inhibit putting low-priority messages into its said buffer for outgoing messages after a predetermined proportion of said buffer for outgoing messages is full, and until said last-mentioned buffer thereafter becomes empty.

30. An improvement in a time-division telephone switching system as defined in claim 29, in which each of said peripheral modules is arranged to inhibit putting low-priority messages into its said buffer for outgoing messages so long as said peripheral module receives said second rather than said first bit sequence from one of said network message controllers and also thereafter until its last-mentioned buffer is empty if at the time it ceases receiving said second rather than said first bit sequence its last-mentioned buffer is not empty.

31. An improvement in a time-division telephone switching system as defined in claim 30, in which each of said peripheral modules also has one-message input and output buffers, and is constituted to use said input buffer as an overflow buffer for its said multi-message buffer for incoming messages, and is further arranged to send said fourth rather than said third bit sequence in response to initiation of a message transfer sequence by the sending of said third bit sequence code by one of said network message controllers, so long as said last-mentioned multiple-message buffer and said input buffer are full and there is a message in said output buffer, and in which said network message controllers are arranged to respond to said fourth bit sequence code transmitted by said peripheral module by discontinuing said initiated message transfer sequence and receiving a message from said peripheral module.

32. An improvement in a time-division telephone switching system as defined in claim 30, in which
  said central message controllers are constituted so as to be able to receive a message from one of said network message controllers while transmitting to another of said network message controllers, while said network message controllers are constituted so as to be unable to send a message over a control signal link while receiving a message thereover; and
  contention logic circuits are provided in said central message controllers for inhibiting the transmission of a message to one of said network message controllers from which a message is in the process of being communicated.

33. An improvement in a time-division telephone switching system as defined in claim 30, in which
  said central message controllers are constituted so as to be able to receive a message from one of said network message controllers while transmitting to another of said network message controllers, while said network message controllers are constituted so as to be unable to send a message over the one of said control signal links to which it is connected, so long as a message is being received thereover; and
  said central message controllers are arranged so that when no message addressed to the particular central message controller is in the process of communication to the respective central message controller, and any last previous received message has been relayed to one of said central processing units, in the process of communication to the respective central message controller, said central message controller receives sequentially on all control signal links in turn, progresses to the next upon reception of said first bit sequence code, signifying an idle state, and progresses likewise to the next in response to identification of the control signal link just reached as one in which a message is in the process of being communicated by the respective central message controller.

34. An improvement in a time-division telephone switching system as defined in claim 23 or 24, in which said standard word size is substantially smaller than the word size used in said word-sequential parallel-bit mode of transmission and reception used by said central processing unit.

35. An improvement in a time-division telephone switching system as defined in claim 25, in which said central message controllers, network controllers and peripheral modules are constituted so as to send a negative acknowledgment bit sequence code in response to reception of a message in which the presence of error is detected in reception, to respond to a first negative acknowledgment by a second attempt to transmit the message and, in the case of a message other than one sent by one of said central message controllers to two corresponding network message controllers respectively of said duplicate networks and other than a message sent by one of said network message controllers to one of said peripheral modules, to respond to a negative acknowledgment of a retried message by changing the message path to the corresponding path through the other of said duplicate networks and repeating the message transmission at least once over the changed path.

36. An improvement in a time-division telephone switching system as defined in claim 23 or 24, in which said central message controllers are two in number, each having access to and being accessible by each of said central processing units and each of said central message controllers is also connected by control signal links to all of said network message controllers of the respective network modules of both of said duplicated networks.

37. An improvement in a time-division telephone switching system as defined in claim 32, in which
  at least one input/output device is connected by a two-way control signal link to said central message controllers for providing accessible long-term program stores for at least some of said modules of the system;
  at least some of said modules of the system include a processor and associated memory, including a replaceable portion of program memory, and are arranged to respond to a reset message from one of said central message controllers by a sequence of operations involving replacement of said replaceable portion of program memory and setting of predetermined initial operating conditions in response to subsequent messages from one of said central message controllers, and
  said central message controllers and said processing units are arranged to be capable of causing said input/output device to deliver module program store content to at least one of said central processing units and to retransmit it in messages to a module responding to a reset message for refreshing the replaceable program memory of said module.

38. An improvement in a time-division telephone switching system as defined in claim 33, in which said central message controllers, network controllers and peripheral modules are constituted so as to send a negative acknowledgement bit sequence code in response to reception of a message in which the presence of error is detected in reception, to respond to a first negative acknowledgment by a second attempt to transmit the message and, in the case of a message other than one sent by one of said central message controllers to two corresponding network message controllers respectively of said duplicate networks and other than a message sent by one of said network message controllers to one of said peripheral modules, to respond to a negative acknowledgment of a retried message by changing the message path to the corresponding path through the other of said duplicate networks and repeating the message transmission at least once over the changed path.

39. An improvement in a time-division telephone switching system as defined in claim 23 or 24, in which said standard word size includes at least one bit in addition to the bits of said PCM encoded speech samples, which additional bit is utilized over a succession of said words of standard size for providing supervision messages from one peripheral module to another over the time-switched connection utilized by the speech samples of the same words, rather than by relaying through said central processing unit, and in which, further, said peripheral modules include means for transmitting supervision messages by use of said bit in successive words, for receiving supervision messages transmitted by use of said bit in successive words, for making a comparison of a received supervision message with the supervision message last previously received over the same time-switched connection, and for initiating a response to the result of said comparison.

40. An improvement in a time-division telephone switching system as defined in claim 20, 21 or 23 in which at least some of those of said peripheral modules that have said means for encoding and decoding are provided with said means in the form of a coder-decoder (CODEC), common to all time-division channels in which coded speech samples fall, associated with means for conversion between analog speech signals and PAM time-division speech samples, and are also provided with means for bypassing said coder-decoder for such of said time-division channels as may be assigned to telephone channels of said two-way telephone channels connected to the switching system that utilizes PCM instead of analog speech signals, and provided with digital bus means for connecting supervisory circuits associated with telephone channels to circuits of such respective peripheral module for sending and receiving messages to and from one of said network message controllers and for exchanging digital signals with said telephone channels and also for respectively distinguishing digital data relating to said supervisory circuits and digital signals received from or for transmission in telephone channels, said bypassing means including means for effectively connecting said digital bus means with circuits connected to the PCM side of said coder-decoder during time slots within which PCM speech samples appear on said digital bus means and also including time delay means, interposed in said connecting means for providing time delays in the respective directions of transmission equivalent to the respective delays produced by the functioning of said coder-decoder.

* * * * *